(12) United States Patent
Kawaguchi

(10) Patent No.: US 11,928,775 B2
(45) Date of Patent: Mar. 12, 2024

(54) APPARATUS, SYSTEM, METHOD, AND NON-TRANSITORY MEDIUM WHICH MAP TWO IMAGES ONTO A THREE-DIMENSIONAL OBJECT TO GENERATE A VIRTUAL IMAGE

(71) Applicant: Keiichi Kawaguchi, Kanagawa (JP)

(72) Inventor: Keiichi Kawaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 8 days.

(21) Appl. No.: 17/534,464

(22) Filed: Nov. 24, 2021

(65) Prior Publication Data

US 2022/0165021 A1   May 26, 2022

(30) Foreign Application Priority Data

Nov. 26, 2020 (JP) ................. 2020-195719
Oct. 15, 2021 (JP) ................. 2021-169222

(51) Int. Cl.
*G06T 15/20* (2011.01)
*G06T 3/00* (2006.01)

(52) U.S. Cl.
CPC .......... *G06T 15/205* (2013.01); *G06T 3/0018* (2013.01); *G06T 3/005* (2013.01)

(58) Field of Classification Search
None
See application file for complete search history.

(56) References Cited

U.S. PATENT DOCUMENTS

| 10,171,738 | B1 * | 1/2019 | Liang ................. | H04N 23/6811 |
| 2012/0169842 | A1 | 7/2012 | Chuang et al. | |
| 2014/0176542 | A1 | 6/2014 | Shohara et al. | |
| 2016/0050369 | A1 | 2/2016 | Takenaka et al. | |
| 2016/0063765 | A1 | 3/2016 | Yoshida et al. | |
| 2016/0212336 | A1 | 7/2016 | Takenaka et al. | |
| 2016/0234438 | A1 | 8/2016 | Satoh | |
| 2018/0061000 | A1 | 3/2018 | Kawaguchi et al. | |

(Continued)

FOREIGN PATENT DOCUMENTS

| JP | 7-093526 | 4/1995 |
| JP | 11-508384 | 7/1999 |

(Continued)

OTHER PUBLICATIONS

European Search Report dated May 19, 2022, in corresponding European Patent Application 21209603.6.

*Primary Examiner* — Aaron M Richer
(74) *Attorney, Agent, or Firm* — XSENSUS LLP

(57) ABSTRACT

An apparatus includes circuitry configured to: select, from at least two images captured in different image-capturing directions and with image-capturing ranges overlapping with each other, an image to be at foreground as viewed from a virtual camera based on an orientation or an angle of view of the virtual camera and the image-capturing directions of the at least two images; map the at least two images onto a three-dimensional object to generate a virtual image, in which the at least two images overlap with each other, having a wider angle of view than the at least two images; and perform perspective projection on the virtual image using the virtual camera, to generate a plane image, based on the selected image to be at the foreground, as a display image.

12 Claims, 31 Drawing Sheets

(56) References Cited

U.S. PATENT DOCUMENTS

| | | | |
|---|---|---|---|
| 2018/0181358 A1 | 6/2018 | Asai et al. | |
| 2018/0182065 A1 | 6/2018 | Yoshida et al. | |
| 2018/0184001 A1 | 6/2018 | Yoshida et al. | |
| 2018/0184072 A1* | 6/2018 | Yoshimura | G06T 7/292 |
| 2018/0270417 A1 | 9/2018 | Suitoh et al. | |
| 2018/0332221 A1 | 11/2018 | Takenaka et al. | |
| 2019/0124274 A1 | 4/2019 | Naitoh et al. | |
| 2019/0289203 A1 | 9/2019 | Suitoh et al. | |
| 2019/0289206 A1 | 9/2019 | Kawaguchi et al. | |
| 2019/0306334 A1 | 10/2019 | Katoh et al. | |
| 2019/0340737 A1 | 11/2019 | Kawaguchi et al. | |
| 2019/0347766 A1 | 11/2019 | Kawaguchi et al. | |
| 2019/0347775 A1 | 11/2019 | Suitoh et al. | |
| 2019/0391778 A1 | 12/2019 | Asai et al. | |
| 2020/0007763 A1 | 1/2020 | Takenaka et al. | |
| 2020/0068188 A1* | 2/2020 | Maeda | H04N 13/282 |
| 2020/0211153 A1 | 7/2020 | Kawaguchi | |
| 2020/0236277 A1 | 7/2020 | Odamaki et al. | |
| 2020/0280669 A1 | 9/2020 | Kawaguchi et al. | |
| 2021/0375044 A1* | 12/2021 | George | G06T 15/04 |
| 2022/0239949 A1* | 7/2022 | Hannuksela | H04N 19/169 |

FOREIGN PATENT DOCUMENTS

| | | |
|---|---|---|
| JP | 2000-242773 | 9/2000 |
| JP | 2001-148779 | 5/2001 |
| JP | 2006-340091 | 12/2006 |
| JP | 2007-000267 | 1/2007 |
| JP | 2009-042942 | 2/2009 |
| JP | 2009-044612 | 2/2009 |
| JP | 2013-009050 | 1/2013 |
| JP | 2014-127001 | 7/2014 |
| JP | 2014-165710 | 9/2014 |
| JP | 2015-046044 | 3/2015 |
| JP | 2015-046051 | 3/2015 |
| JP | 2016-006674 | 1/2016 |
| JP | 2016-048456 | 4/2016 |
| JP | 2016-053978 | 4/2016 |
| JP | 2016-096487 | 5/2016 |
| JP | 2016-110639 | 6/2016 |
| JP | 2016-149734 | 8/2016 |
| JP | 2016-149736 | 8/2016 |
| JP | 2017-010461 | 1/2017 |
| JP | 2018-022519 | 2/2018 |
| JP | 2018-026642 | 2/2018 |
| JP | 2018-037786 | 3/2018 |
| JP | 2018-109740 | 7/2018 |
| JP | 2018-109946 | 7/2018 |
| JP | 2018-109971 | 7/2018 |
| JP | 2018-110375 | 7/2018 |
| JP | 2018-110384 | 7/2018 |
| JP | 2018-157538 | 10/2018 |
| JP | 2018-169601 | 11/2018 |
| JP | 2019-053758 | 4/2019 |
| JP | 2019-057264 | 4/2019 |
| JP | 2019-057903 | 4/2019 |
| JP | 2019-075766 | 5/2019 |
| JP | 2019-080174 | 5/2019 |
| JP | 2019-082768 | 5/2019 |
| JP | 2019-087984 | 6/2019 |
| JP | 2019-117330 | 7/2019 |
| JP | 2019-164782 | 9/2019 |
| JP | 2019-164783 | 9/2019 |
| JP | 2019-176471 | 10/2019 |
| JP | 2020-109955 | 7/2020 |
| JP | 2020-174363 | 10/2020 |
| WO | WO97/01241 A1 | 1/1997 |

\* cited by examiner

COMPARATIVE EXAMPLE

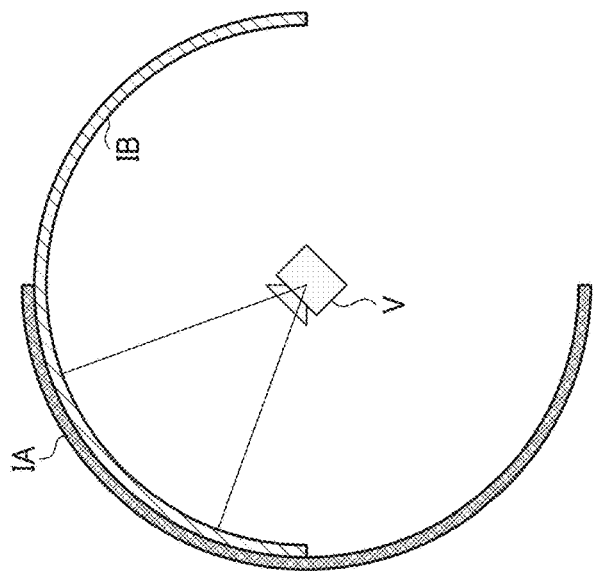
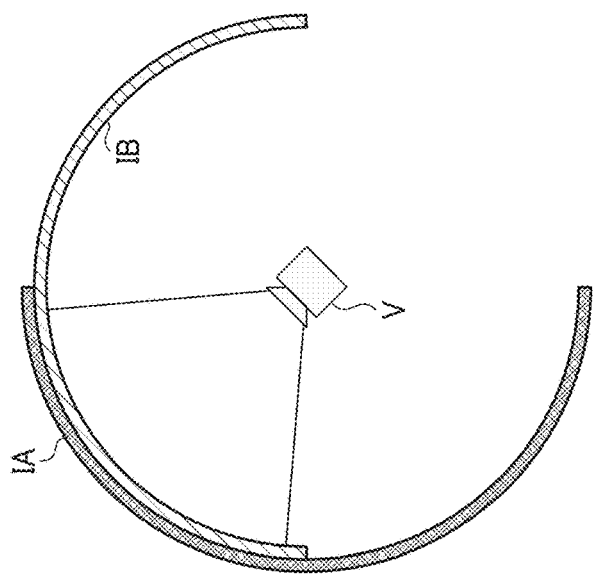
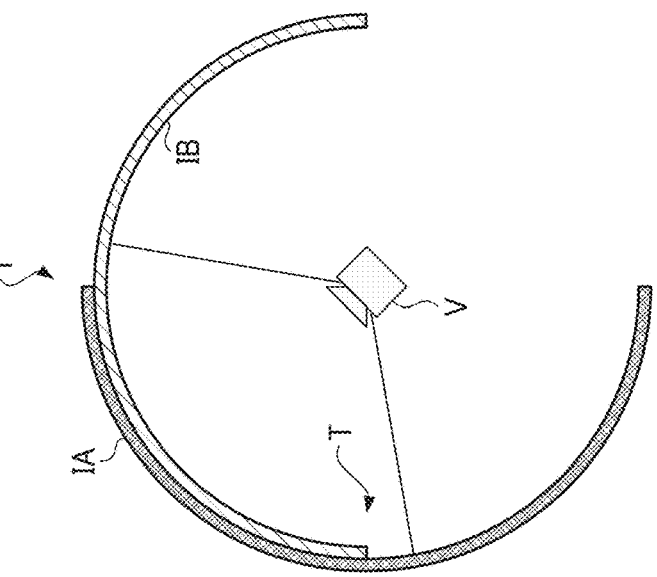

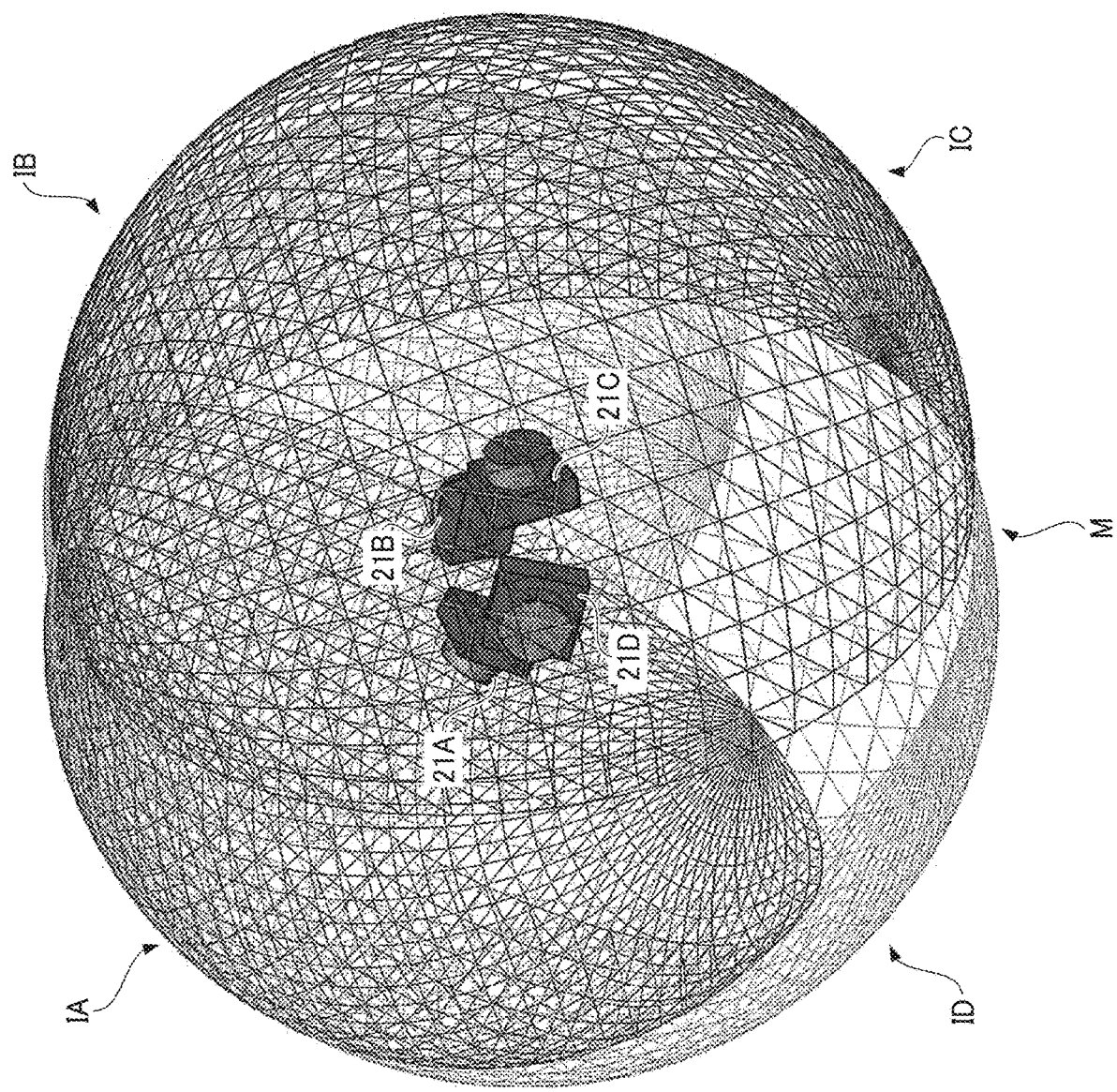

APPARATUS, SYSTEM, METHOD, AND NON-TRANSITORY MEDIUM WHICH MAP TWO IMAGES ONTO A THREE-DIMENSIONAL OBJECT TO GENERATE A VIRTUAL IMAGE

CROSS-REFERENCE TO RELATED APPLICATIONS

This patent application is based on and claims priority pursuant to 35 U.S.C. § 119(a) to Japanese Patent Application No. 2020-195719, filed on Nov. 26, 2020 and Japanese Patent Application No. 2021-169222, filed on Oct. 15, 2021 and, in the Japan Patent Office, the entire disclosure of which is hereby incorporated by reference herein.

BACKGROUND

Technical Field

The present disclosure relates to an image processing technology, and more particularly, to an apparatus, a system, a method, and a non-transitory medium storing program.

Related Art

A technique for generating a spherical image by combining multiple images captured by multiple imagers is known. For example, an apparatus includes a camera body, a memory, and a joining device, to capture a spherical image. The camera body includes a first lens and a second lens facing each other, each lens having a field of view of 180° or greater. The camera body forms a spherical image by combining an image captured by the first lens and an image captured by the second lens, the images captured by the first lens and the second lens partly overlapping with each other.

SUMMARY

An apparatus includes circuitry configured to: select, from at least two images captured in different image-capturing directions and with image-capturing ranges overlapping with each other, an image to be at foreground as viewed from a virtual camera based on an orientation or an angle of view of the virtual camera and the image-capturing directions of the at least two images; map the at least two images onto a three-dimensional object to generate a virtual image, in which the at least two images overlap with each other, having a wider angle of view than the at least two images; and perform perspective projection on the virtual image using the virtual camera, to generate a plane image, based on the selected image to be at the foreground, as a display image.

A method includes selecting, from at least two images captured in different image-capturing directions and with image-capturing ranges overlapping with each other, an image to be at foreground as viewed from a virtual camera based on an orientation or an angle of view of the virtual camera and the image-capturing directions of the at least two images; mapping the at least two images onto a three-dimensional object to generate a virtual image, in which the at least two images overlap with each other, having a wider angle of view than the at least two images; and performing perspective projection on the virtual image using the virtual camera, to generate a plane image, based on the selected image to be at the foreground, as a display image.

A non-transitory recording medium storing a plurality of instructions which, when executed by one or more processors, cause the processors to perform a method, including: selecting, from at least two images captured in different image-capturing directions and with image-capturing ranges overlapping with each other, an image to be at foreground as viewed from a virtual camera based on an orientation or an angle of view of the virtual camera and the image-capturing directions of the at least two images; mapping the at least two images onto a three-dimensional object to generate a virtual image, in which the at least two images overlap with each other, having a wider angle of view than the at least two images; and performing perspective projection on the virtual image using the virtual camera, to generate a plane image, based on the selected image to be at the foreground, as a display image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 23A, 23B, and 23C are illustrations of how a display image appears in a display region with a change in displaying angle of view, according to the first variation;

FIG. 25 is a three-dimensional illustration of image-capturing ranges of multiple imagers, according to a second variation of an embodiment;

Figure 1:
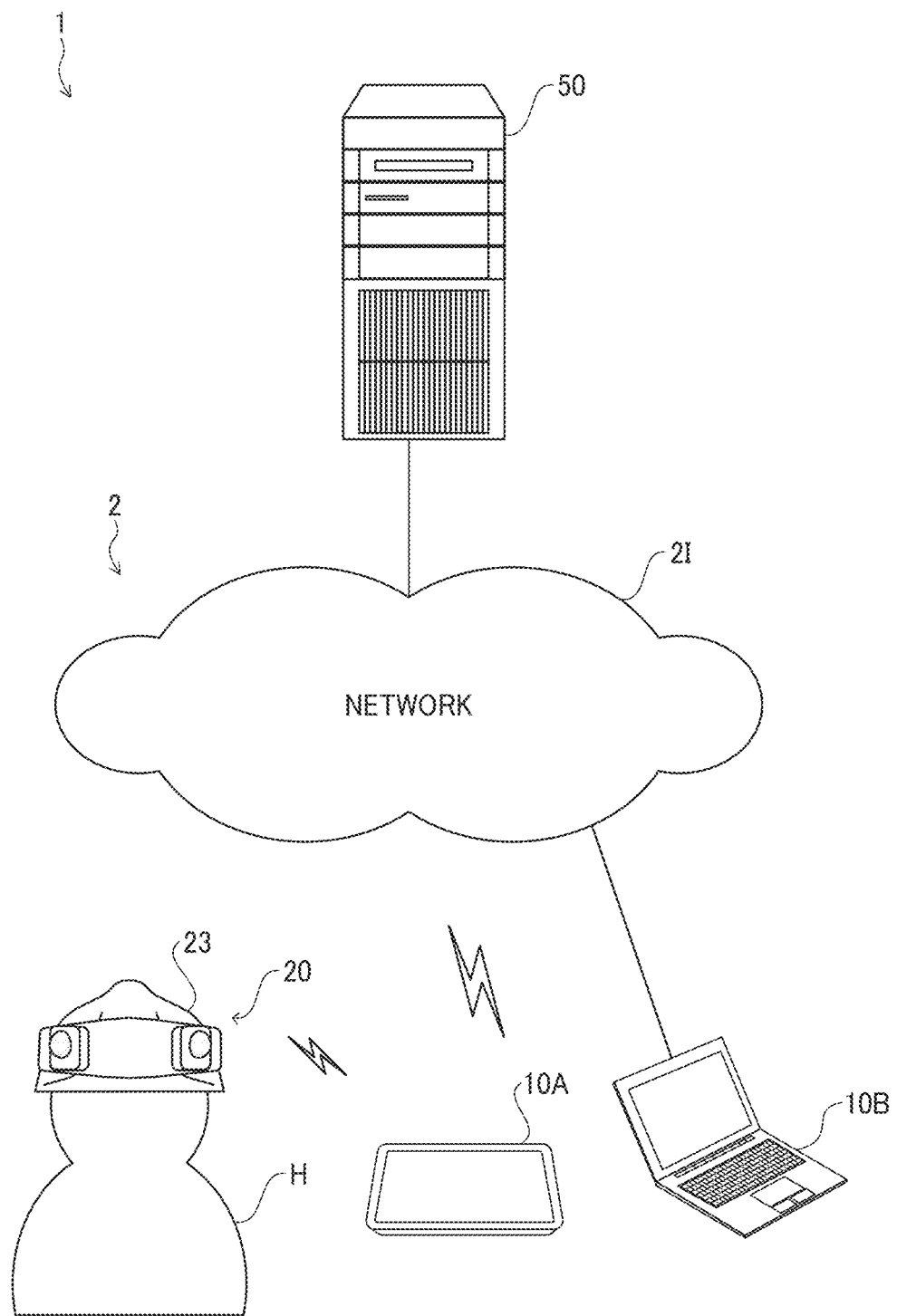
FIG. 1 is an illustration of an overall configuration of an image-capturing display system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure enable browsing of a collective image formed by combing multiple images without image processing.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. The following embodiments describe an information processing terminal (an apparatus) connected to a spherical-image capturing apparatus including four imagers as an example of the apparatus, and an image-capturing display system (a system) including the spherical image-capturing apparatus and the information processing terminal.

FIG. 1 is an illustration of an overall configuration of an image-capturing display system 1 according to an embodiment of the present disclosure. As illustrated in FIG. 1, the image-capturing display system 1 includes information processing terminals 10A and 10B, a spherical-image capturing device 20, and a management system 50. Hereinafter, the information processing terminals 10A and 10B may be collectively referred to as an information processing terminal 10.

The information processing terminal 10 is an information processing apparatus having an image processing capability and a communication capability. Examples of the information processing terminal 10 include a smart device such as a tablet, a smartphone, a single-board computer, and smart glasses, and a personal computer (PC).

The spherical-image capturing device 20 is mounted on, for example, a hard hat (helmet) 23 a worker H is wearing, and has an image capturing capability, an image processing capability, and a communication capability. An object on which the spherical-image capturing device 20 is mounted is not limited to the hard hat 23, and may be a flying object such as a drone, a vehicle such as a passenger car, a truck, and a construction machine, or a machine such as a robot.

The management system 50 is an information processing apparatus having a communication capability and an image processing capability. The management system 50 serves as a Web server that transmits an image to the information processing terminal 10 in response to a request from the information processing terminal 10.

The information processing terminal 10 and the spherical-image capturing device 20 are connected by wireless communication such as Wi-Fi (registered trademark) or Bluetooth (registered trademark) or wired communication via a universal serial bus (USB) cable. The information processing terminal 10 is connected to Internet 21 via a wireless local area network (LAN), via a base station, or via a wired LAN. This establishes communication between the information processing terminal 10 and the management system 50 on the Internet 21. Hereinafter, the Internet 21, the LAN, and various wired and wireless communication paths are referred to as network 2.

In FIG. 1, an image captured by the spherical-image capturing device 20 is transmitted to the information processing terminal 10 through wired or wireless communication. Then, the information processing terminal 10 generates, based on the captured image, an image to be displayed, and displays the generated image on a display device included in the information processing terminal 10. In some examples, the image captured by the spherical-image capturing device 20 is transmitted to the management system 50 through one information processing terminal 10 (e.g., 10A) directly connected to the spherical-image capturing device 20 via the network 2. In response to a request from the information processing terminal 10, the management system 50 generates an image to be displayed, and transmits the generated image to the other information processing terminal 10 (e.g., 10B) connected to the management system 50 through the network 2. The other information processing terminal 10A displays the received image on its own display device. Alternatively, the management system 50 transmits, to the other information processing terminal 10 (e.g., 10B), the received image as is. The other information processing terminal 10 generates, based on the received image, an image to be displayed, and displays the generated image on its own display device included in the other information processing terminal 10. Still alternatively, the spherical-image capturing device 20 generates, based on the captured image, an image to be displayed, and displays the generated image on its own display device included in the spherical-image capturing device. Further alternatively, the spherical-image capturing device 20 transmits an image to the information processing terminal 10 including its own display device after generating the image based on the captured image. In this case as well, the spherical-image capturing device 20 may be directly connected to the network 2.

Figure 2A:
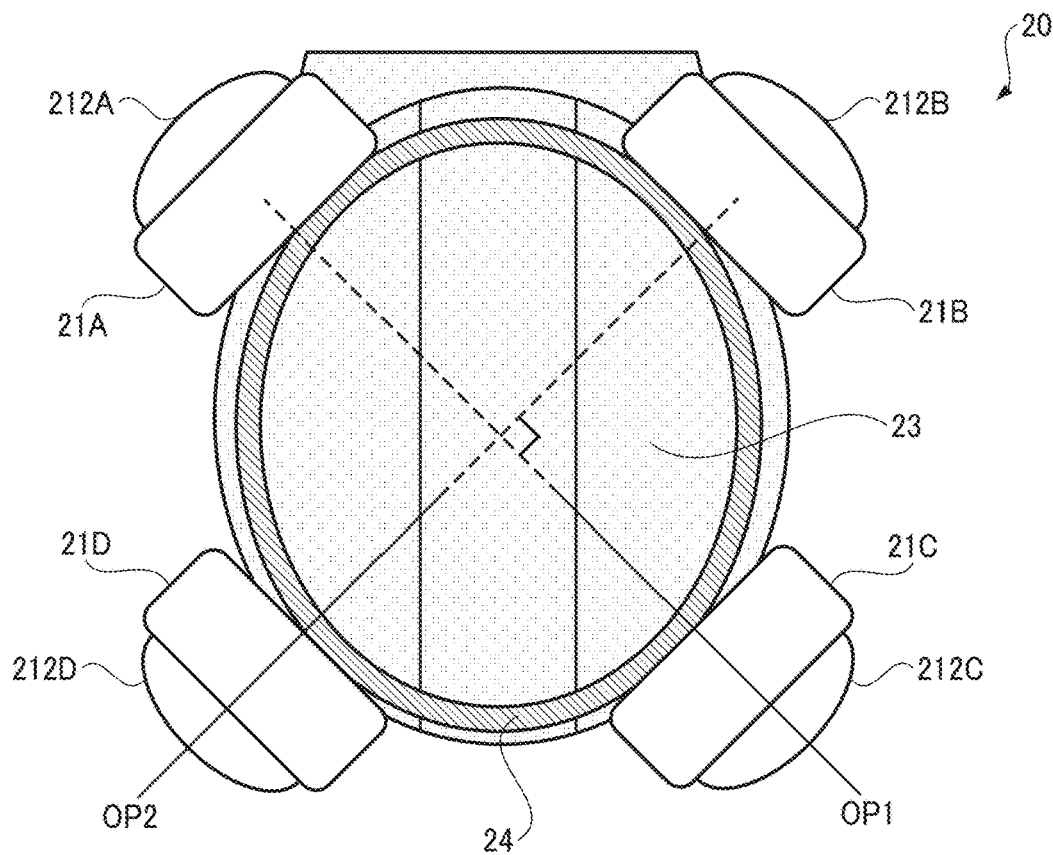
FIGS. 2A and 2B are illustrations of an overall configuration of a spherical-image capturing device according to an embodiment.
Figure 2B:
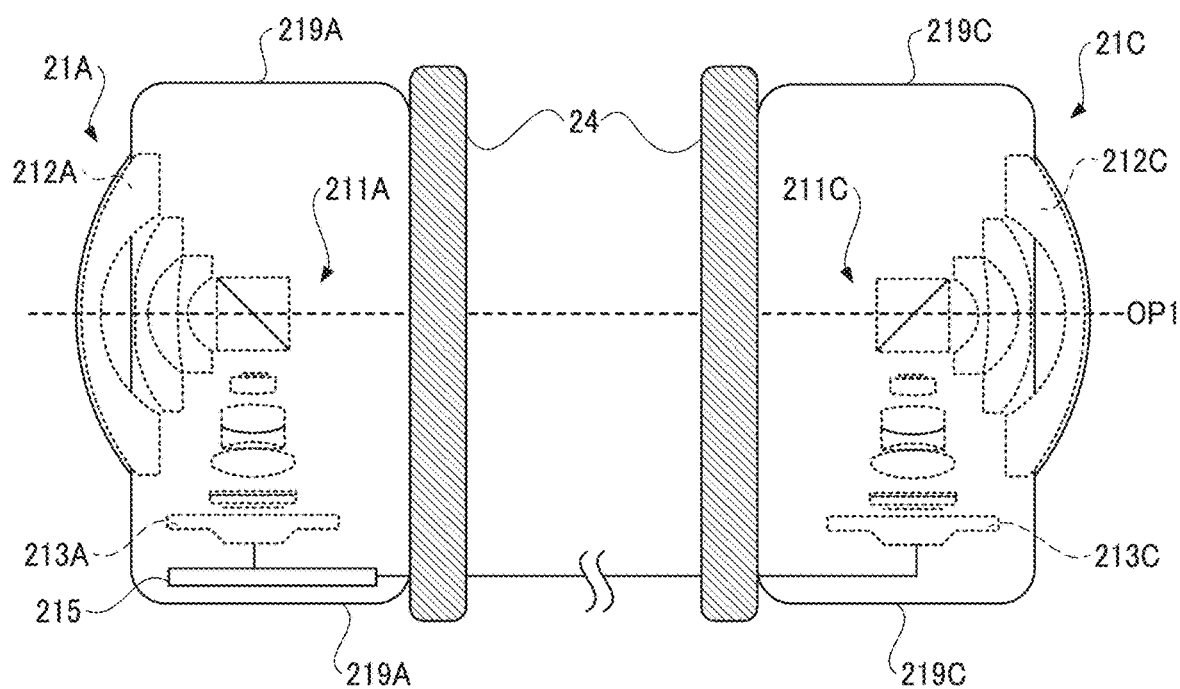

FIGS. 2A and 2B are illustrations of an overall configuration of the spherical-image capturing device 20 according to an embodiment. The spherical-image capturing device 20 includes multiple imagers 21 and a fixing frame 24 to be fixed to the hard hat 23. In FIGS. 2A and 2B, four imagers 21A, 21B, 21C, and 21D are illustrated. The imagers 21A, 21B, 21C, and 21D may be collectively referred to as an imager 21.

In FIG. 2A, the four imagers 21A, 21B, 21C, and 21D are arranged around the outer periphery of the hard hat 23 at intervals of 90° with respect to the top of the hard hat 23, which is the center of the hard hat 23, each facing in a different direction. The image-capturing directions of the four imagers 21A, 21B, 21C, and 21D are outward, that is, spread toward an object. Each pair of imagers 21, which are diagonally opposite to each other, (i.e., a pair of the imagers 21A and 21c or a pair of the imagers 21B and 21D) is arranged facing in the substantially opposite directions. FIG. 2A is a top view of the spherical-image capturing device 20 with the four imagers 21 fixed to the hard hat 23. FIG. 2B is a cross-sectional view of the spherical-image capturing device 20 taken along a line (e.g., a central axis OP1) passing through two diagonally-opposite imagers (e.g., the imagers 21A and 21C) among the four imagers 21.

The imagers 21A, 21B, 21C, and 21D include casings 219A, 219B, 219C, and 219D, and imaging bodies 211A, 211B, 211C, and 211D, respectively. In FIG. 2A, the imager 21A further includes other components including a controller 215 and a battery. In FIG. 2B, the imagers 21A and 21C are illustrated as a representative. The same configuration applies to the other imagers 21B and 21D but unless otherwise specified. Hereinafter, the imaging bodies 211A, 211B, 211C, and 211D may be collectively referred to as an imaging body 211.

In FIG. 2B, the controller 215 is included in the imager 21A, and the other imagers 21B, 21C, and 21D include no controller. The images captured by the other imagers 21B, 21C, and 21D are input through a cable to the controller 215 of the imager 21A. However, no limitation is intended thereby. In some examples, each of the imagers 21A, 21B, 21C, and 21D includes a controller to process an image captured by a corresponding imager 21A. Alternatively, none of the imagers 21A, 21B, 21C, and 21D include a controller, and a controller unit separate from the imagers 21A, 21B, 21C, and 21D controls the imagers 21A, 21B, 21C, and 21D. In FIGS. 2A and 2B, multiples imagers 21 are fixed to the fixing frame 24 to be fixed to the hard hat 23. Alternatively, the multiple imagers 21 may be integrated with the fixing frames 24 as a single unit.

The imaging bodies 211A, 211B, 211C, and 211D further include image-forming optical systems 212A, 212B, 212C, and 212D, and image sensors 213A, 213B, 213C, and 213D such as charge coupled device (CCD) sensors and complementary metal oxide semiconductor (CMOS) sensors. Hereinafter, the image sensors 213A, 213B, 213C, and 213D may be collectively referred to as an image sensor 213. Each of the image-forming optical systems 212A, 212B, 212C, and 212D is configured as a fish-eye lens composed of seven lenses in six groups. The fish-eye lens has a full angle of view of greater than 180 degrees, which is equal to 360 degrees/n where n is the number of optical systems and is 2). Preferably, the fish-eye lens has an angle of view of 185 degrees or greater, and more preferably of 190 degrees or greater.

The relative positions of the optical elements (lenses, prisms, filters, and aperture stops) of the four image-forming optical systems 20A and 20B are determined with reference to the four image sensors 213A, 213B, 213C, and 213D. More specifically, positioning is made such that the optical axis of the optical elements of each of the image-forming optical systems 212A, 212B, 212C, and 212D is positioned at the central part of the light receiving area of corresponding one of the image sensors 213A, 213B, 213C, and 213D orthogonally to the light receiving area, and such that the light receiving area serves as the imaging plane of corresponding one of the fish-eye lenses. Preferably, the imager 21 includes a circular fish-eye lens whose image circle fits within the light receiving area of the image sensor 213.

The image-forming optical systems 212A, 212B, 212C, and 212D has the same specification. The diagonally opposite imagers are physically fixed to the hard hat 23 using the fixing frame 24, each facing in the opposite directions so as to allow the central axes OP of the diagonally opposite imagers to match each other. In FIG. 2B, OP1 denotes the central axis, or the optical axis of the outermost lenses of the diagonally opposite imagers 21A and 21C, and OP2 denotes the central axis, or the optical axis of the outermost lenses of the diagonally opposite imagers 21B and 21D. Notably, since the hard hat 23 such as a helmet is not perfectly circle but elliptical as viewed from above, the optical axes of the imagers 21 arranged around such an elliptical outer periphery of the hard hat 23 through the fixing frame 24 at intervals of 90° with respect to its vertex, each imager facing in a different direction may not intersect at one point. With the front-to-back direction (i.e., up-to-down direction or the vertical axis in FIG. 2) coincident with the major axis of the elliptical shape of the hard hat 23, the imagers 21A and 21B at the front side of the hard hat 23 have their optical axes intersecting with each other at an angle of 90°, and the other imagers 21C and 21D at the rear side of the hard hat 23 have their optical axes intersecting with each other at an angle of 90°. Such an intersection of the optical axes will be described in detail later with reference to FIG. 31.

The image sensors 213A, 213B, 213C, and 213D convert the received light with a light distribution into image signals, and sequentially output image frames to an image processor in the controller 215. Images captured by the image sensors 213A, 213B, 213C, and 213D are stored in a storage device (e.g., a DRAM 272 in FIG. 5) included in the controller 215 or transmitted to the external information processing terminal 10 or the management system 50.

Figure 3:
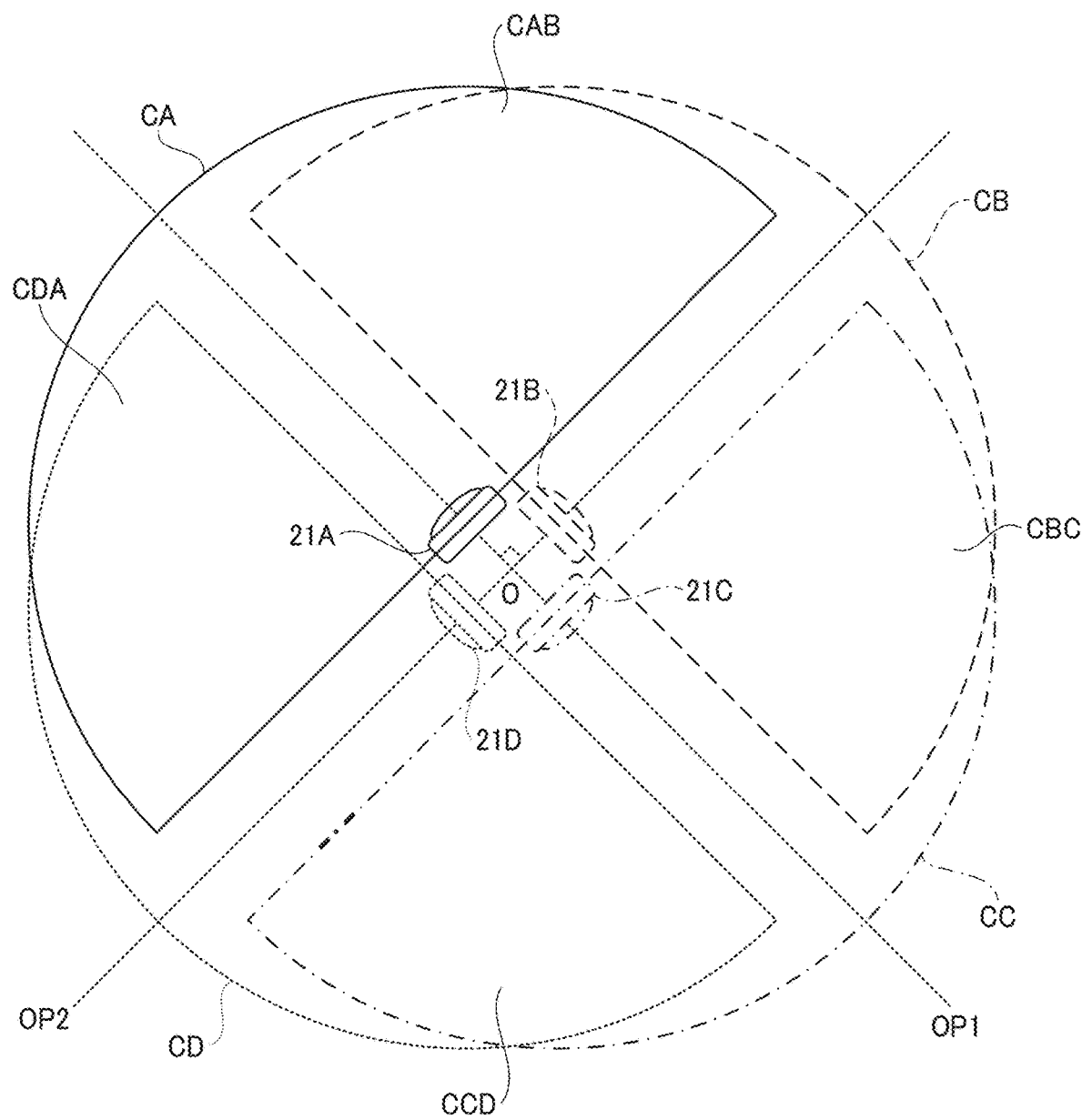
FIG. 3 is a plan view of image-capturing ranges of the spherical-image capturing device in FIGS. 2A and 2B according to an embodiment.

FIG. 3 is a plan view of image-capturing ranges of the spherical-image capturing device 20 according to an embodiment. In FIG. 3, the four imagers 21A, 21B, 21C, and 21D are arranged in a circle around a prescribed center O (or in a radial manner) to be apart from the center O by a prescribed distance within a horizontal plane (i.e., the drawing sheet in which FIG. 3 is illustrated). The imagers 21A, 21B, 21C, and 21D are arranged at intervals of an angle of 90° with respect to the center O, facing in different directions. The imagers 21A, 21B, 21C, and 21D are configured to capture images of hemispherical ranges CA, CB, CC, and CD, respectively, according to the sizes of the angles of view.

In FIG. 3, a range CAB is an overlap between an image-capturing range CA (indicated by solid line) of a first imager 21A and an image-capturing range CB (indicated by broken line) of a second imager 21B adjacent to the first imager 21B. Similarly, a range CBC is an overlap between the image-capturing range CB (indicated by broken line) of the second imager 21B and an image-capturing range CC (indicated by dot-and-dash line) of a third imager 21C adjacent to the second imager 21B. A range CCD is an overlap between the image-capturing range CC (indicated by dot-and-dash line) of the third imager 21C and an image-capturing range CD (indicated by dotted line) of a fourth imager 21D adjacent to the third imager 21C. A range CDA is an overlap between the image-capturing range CD (indicated by dotted line) of the fourth imager 21D and an image-capturing range CA (indicated by solid line) of the first imager 21A. The central axes OP1 of the imagers 21A and 21C coincide with each other, and the central axes OP2 of the imagers 21B and 21D also coincide with each other.

The spherical-image capturing device 20 with such a configuration enables capturing of images in substantially all directions around the spherical-image capturing device 20. The expression "all the direction" refers to a predetermined range to be captured and recorded according to the application. The range in all direction is preferably a substantially full spherical image-capturing range that can be displayed as a full spherical image in the display processing operation to be described later. However, the range in all the direction may be a range of a panoramic image in which an upper portion or a lower portion is missing, and may include a blind spot. In other words, the range in all directions may not be of 47c steradians (full sphere).

In an embodiment to be described, the four imagers 21A, 21B, 21C, and 21D are apart from the center by a prescribed distance and arranged at intervals of an angle of 90° with respect to the center of the hard hat 23 on which the imagers are mounted (FIG. 2A), facing in different directions within the horizontal plane. However, no limitation is intended thereby. For example, all or some of the imagers 21 may be arranged facing in an oblique direction or upward. Alternatively, all or some of the imagers 21 may face downward and upward alternately. Still alternately, all or some of the imagers 21 may be offset from horizontal plane. In an embodiment to be described below, a fish-eye lens having an angle of view of 180° is assumed to be used, and each image-capturing range of the imagers 21 is hemispherical. However, the image-capturing range may be a spherical cap larger or smaller than the hemisphere depending on the angle of view of the lens. The number of imagers 21 depends on the angle of view of the optical system (e.g., the image-forming optical system 212) and a desired image-capturing range of the spherical-image capturing device 20. Any number of imager (e.g., two or more imagers) may be incorporated in the spherical-image capturing device 20. In some embodiments, each of the multiple imagers 21 has a field of view partly overlapping with a field of view of at least one another imager to capture an image partly overlapping with at least one another image captured by at least one another imager.

Figure 4:
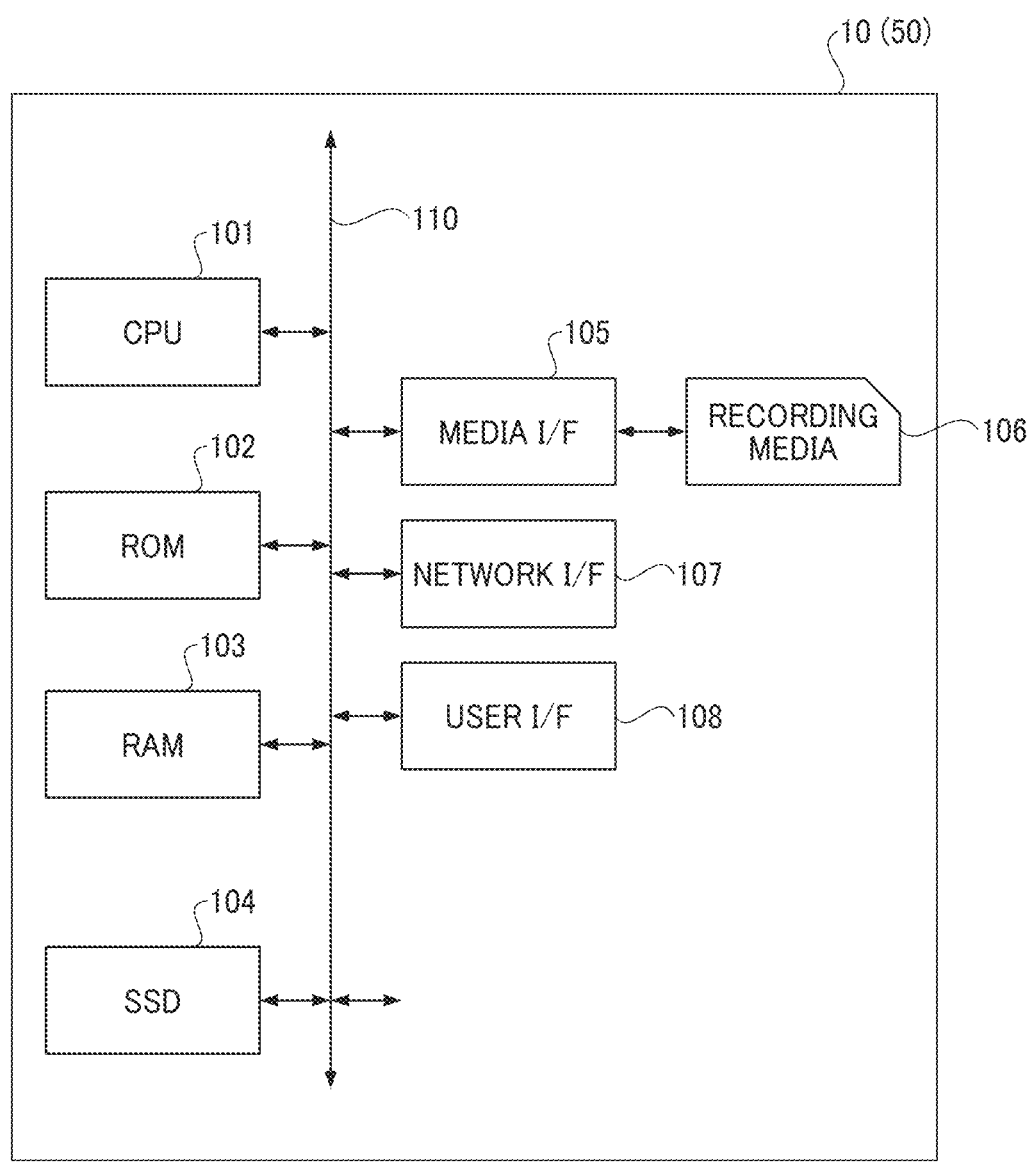
FIG. 4 is a hardware block diagram of an information processing terminal according to an embodiment.

FIG. 4 is a hardware block diagram of an information processing terminal 10 according to an embodiment. The following describes the hardware configuration of the information processing terminal 10 with respect to FIG. 4. The hardware configuration of the information processing terminal 10 is the same as that of a general-purpose information processing apparatus.

The information processing terminal 10 includes a central processing unit (CPU) 101, a read only memory (ROM) 102, a random access memory (RAM) 103, a solid state disk (SSD) 104, a media interface (I/F) 105, a network I/F 107, a user I/F 108, and a bus line 110.

The CPU 101 controls the overall operation of the information processing terminal 10. The ROM 102 stores various programs operating on the information processing terminal 10. The RAM 103 is used as a work area in which the CPU 101 executes a program. The SSD 104 stores various programs such as an operating system and applications, and information used in the various programs. The SSD 104 may be replaced with any non-volatile storage device such as a hard disk drive (HDD). The medium I/F 105 is an interface for reading information stored in a recording medium 106 such as an external memory and writing information into the recording medium 106. The network I/F 107 is an interface for communicating with an external device via the network 2.

The user I/F 108 is an interface for providing image information to a user and receiving an operation input from the user. The user I/F 108 may include, for example, a display device such as a liquid crystal display or an organic electroluminescence (EL) display, and an input device such as a keyboard, a button, a mouse, or a touch panel provided on the display device. The bus line 110 is an address bus or a data bus for electrically connecting the above-described components with each other.

Although detailed description is omitted, the hardware configuration of the management system 50 may be the same as the hardware configuration of the information processing terminal 10. Although the information processing terminal 10 has been described as a general-purpose information processing apparatus such as a smart device or a PC, the information processing terminal 10 may be configured as a dedicated device, and may be configured by adding or deleting hardware to or from the configuration illustrated in FIG. 4 as appropriate.

Figure 5:
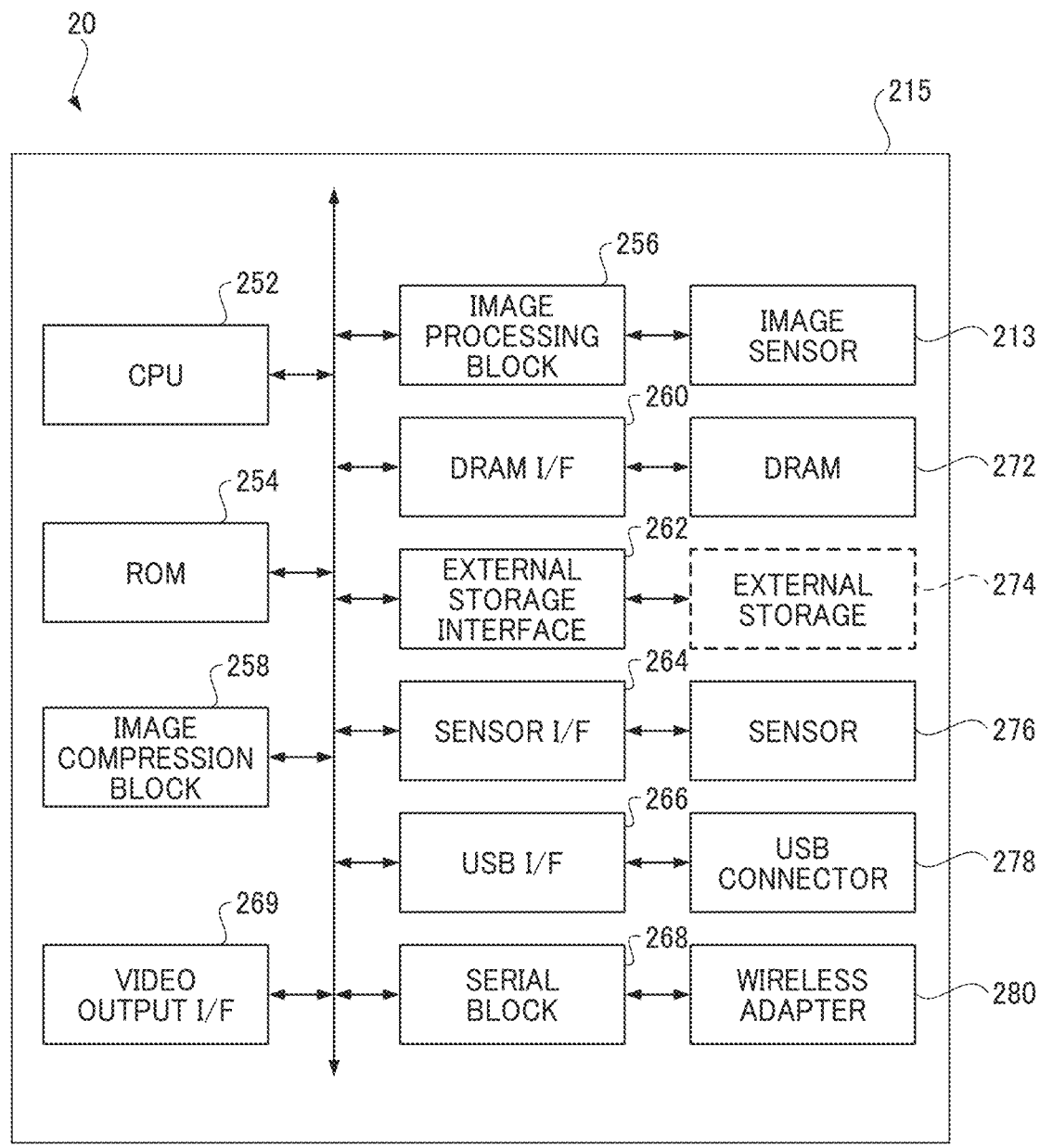
FIG. 5 is a hardware block diagram of the spherical-image capturing device in FIGS. 2A and 2B according to an embodiment.

FIG. 5 is a hardware block diagram of the spherical-image capturing device 20 according to an embodiment. The controller 215 of the spherical-image capturing device 20 includes a CPU 252, a ROM 254, an image processing block 256, an image compression block 258, a DRAM 272 connected through a DRAM I/F 260, a sensor 276 (e.g., an acceleration sensor) connected through an external sensor I/F 264.

The CPU 252 controls the operations of the units of the spherical-image capturing device 20. The ROM 254 stores a control program described in a code readable by the CPU 252 and various kinds of parameters. The image processing block 256 is connected to an image sensor 213 and receives an image signals of an image captured by the image sensor. The image processing block 256 includes, for example, an image signal processor (ISP), and performs, for example, shading correction, Bayer interpolation, white balance correction, and gamma correction on the image signal received from the image sensor 213. Although FIG. 5 illustrates the example including only one image sensor 213, the configuration is modified as appropriate depending on the arrangement of the controller 215 and the imager 21. For example where multiple imagers 21 includes multiples controllers 215, respectively, each controller 215 includes one image sensor 213. For another example where the spherical-image capturing device 20 as a whole includes one controller, the same number of image sensors 213 as the number of the imagers 21 are incorporated in the spherical-image capturing device 20.

The image compression block 258 is a codec block configured to compress and decompress, for example, a still image in a joint photographic experts group format and a video in a moving picture experts group (MPEG)-4 advanced video coding (AVC)/H.264 format. The DRAM 272 provides a storage area for temporarily storing data therein to perform various types of signal processing and image processing. The sensor 276 detects acceleration components of three axes, which are used to detect the vertical direction to perform zenith correction on the spherical image. In another example, in addition to the sensor 276 such as an acceleration sensor, a gyroscope sensor and an electronic compass may be included.

The imager 21 further includes an external storage I/F 262, a USB I/F 266, a serial block 268, and a video output I/F 269. The external storage I/F 262 is connected to an external storage 274. The external storage I/F 262 controls reading and writing of data from and to the external storage 274 such as a memory card inserted in a memory card slot. The USB I/F 266 is connected to a USB connector 278. The USB I/F 126 controls USB communication with an external device such as a PC connected via the USB connector 278. The serial block 268 controls serial communication with an external device such as a smartphone or a PC and is connected to a wireless adapter 280. The video output I/F 269 is an interface for connecting with an external display or other apparatuses.

Figure 6:
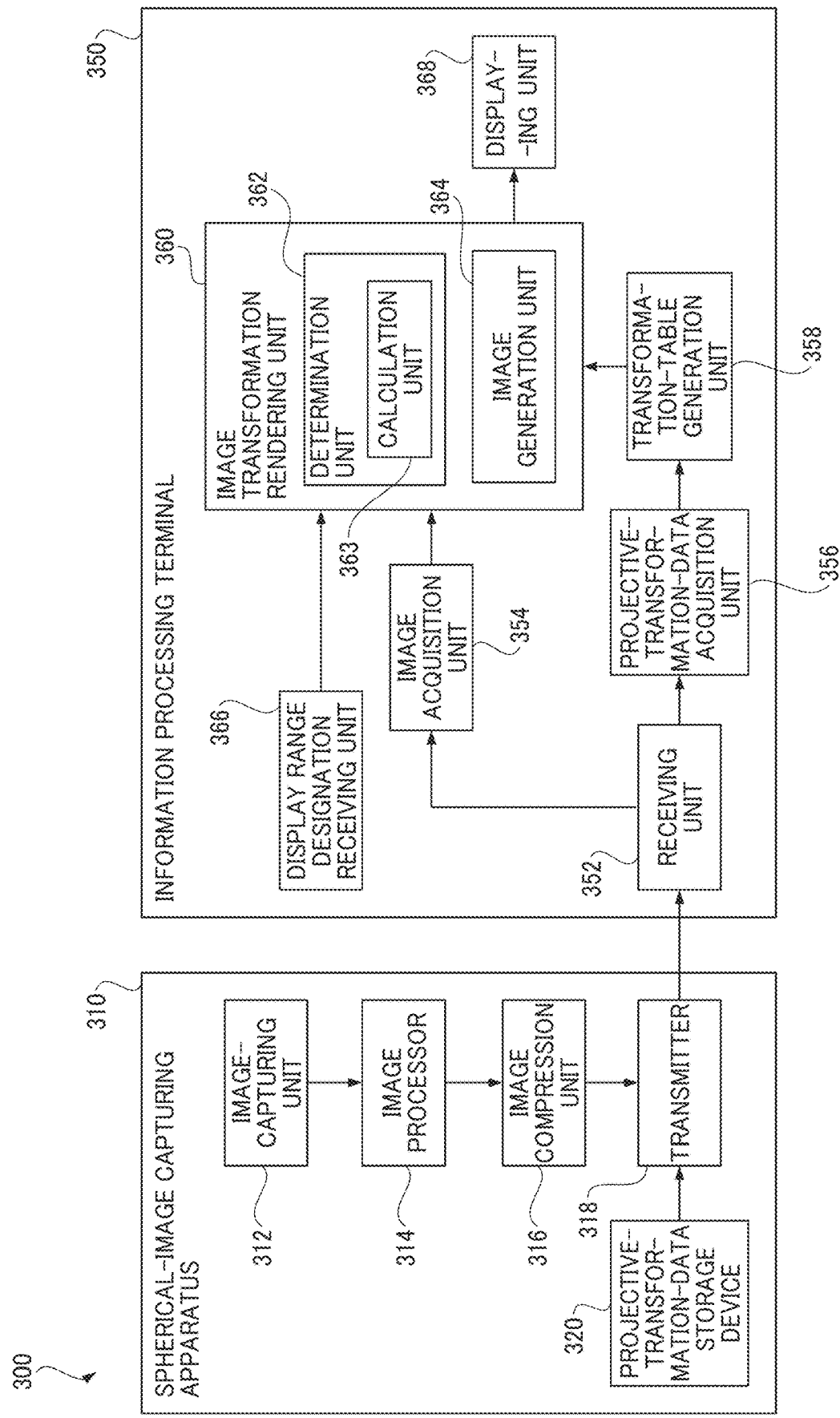
FIG. 6 is a functional block diagram of image capturing and display functions implemented by an image-capturing display system, according to an embodiment.

A description is given below of a functional configuration of the information processing system 1, according to an embodiment. FIG. 6 is a functional block diagram of image capturing and display functions implemented by an image-capturing display system 10, according to an embodiment.

When the spherical-image capturing device 20 is powered on, a camera control program is loaded into a main memory. The CPU 252 controls operation of each hardware component of the spherical-image capturing device 20 according to the control program loaded into the main memory, while temporarily storing data used for the control in the memory. Thus, the spherical-image capturing device 20 implements functional units and operations described below.

In FIG. 6, the functional block 310 of the spherical-image capturing device 20 includes an image-capturing unit 312, an image processor 314, an image compression unit 316, and a transmitter 318. The spherical-image capturing device 20 includes a projective-transformation-data storage device 320 implemented by the ROM 254, the DRAM 272, or the external storage 274.

The image-capturing unit 312 captures a still image or a moving image using multiple imagers 21. The image-capturing unit 312 generates multiple images, which are captured by the multiple imagers 21, and outputs the generated images to the image processor 314. In the present embodiment, multiple (more specifically four) fish-eye images are acquired. In the following embodiment, processing for a still image is described. For a moving image, the same processing applies to each frame of the moving image.

The image processor 314 performs, for example, shading correction, Bayer interpolation, white balance correction, and gamma correction on the captured image, using the image processing block 256.

The image compression unit 316 compresses the captured image using the image compression unit 316, and outputs image data to the transmitter 318. Examples of a data format of the still image include, but not limited to, JPEG, portable network graphics (PNG), and bitmap (BMP). Examples of a data format of the moving image includes a MPEG-4AVC/H.264.

The projective-transformation-data storage device 320 stores information for projective transformation that transforms an image (a fish-eye image) acquired by each imager 21 into a spherical image (hemispherical image), and outputs the projective-transformed data to the transmitter 318. More specifically, the projective transformation data may include various sets of information such as image-capturing-direction data indicating physical relative positions of lenses of the imagers 21; projective data indicating the relation between an image height of a captured image and an incident angle at a fish-eye lens; a direction of a fish-eye image arranged in an image frame; center coordinates of the fish-eye image; an effective radius of the fish-eye image; lens optical characteristics; and lens assembly errors. As described above, since multiple imagers 21 are physically fixed in position on the fixed frame 24, the image-capturing-direction data may be given in advance as a vector array representing the image-capturing direction of each imager 21 in a prescribed coordinate system.

In response to a request from the external apparatus (e.g., the information processing terminal 10), the transmitter 318 packetizes and transmits data including image data and projective-transformation data to the external apparatus as a request source. Notably, what the transmitter 318 transmits may be a compilation of image data and projective transformation data or may be each individual set of image data and projective transformation data, which are associated with each other. Instead of transmitting data via network, data may be recorded in a storage medium (the external storage 274 in FIG. 5) such as a memory card. Further, image data may be one sheet of image data formed by joining tiled multiple images captured by multiple imagers 21, or may be individual pieces of image data for the multiple images.

The following describes the configuration of the information processing terminal 10 with reference to FIG. 6. When the information processing terminal 10 is powered on, the operating system stored in the SSD 104 starts up. In response to an operation from a user to invoke the image viewer application for the spherical-image capturing device 20 after the start-up, an application program is loaded into the main memory. The CPU 101 controls operation of each hardware element of the information processing terminal 10 according to the program loaded into the main memory, while temporarily storing data for the control, in the memory. Thus, the information processing terminal 10 implements functional units and operations described below.

The functional block 350 of the information processing terminal 10 includes a receiving unit 352, an image acquisition unit 354, a projection-transformation-data acquisition unit 356, a transformation-table generation unit 358, an image transformation rendering unit 360 (a reception unit), a display range designation receiving unit 366, and a displaying unit 368.

The receiving unit 352 receives a packet transmitted from the spherical-image capturing device 20 and outputs the received data to the image acquisition unit 354 and the projection-transformation-data acquisition unit 356. In some examples in which data is recorded in a storage medium such as a memory card instead of being transmitted via a network, the receiving unit 352 reads data from the storage medium instead of receiving data via network.

The image acquisition unit 354 decodes the image data using a predetermined codec corresponding to the compressed image data included in the received data, and acquires multiple images, outputting the images to the image transformation rendering unit 360. Each of the multiple images acquired by the image acquisition unit 354 partly overlaps with at least one another image (i.e., each captured image has at least one overlapping area between images). In the following embodiment, multiple fish-eye images (e.g., four fish-eye images in the present embodiment) are captured.

The projection-transformation-data acquisition unit 356 extracts projective transformation data included in the received data, and outputs the projective data and the image-capturing-direction data to the transformation-table generation unit 358. As described above, the image-capturing-direction data includes information on an image-capturing direction of each image.

Based on the projective data and the image-capturing-direction data, the transformation-table generation unit 358 generates a table for transforming an image (e.g., a fish-eye image) directly acquired by each imager 21 into a spherical image (e.g., a hemispherical image). The transformation table generated by the transformation-table generation unit 358 is output from the transformation-table generation unit 358 to the image transformation rendering unit 360.

The image viewer application for the spherical-image capturing device 20 is designed to allow a user to optionally change a display range to display a spherical image covering all directional views around the spherical-image capturing device (a spherical image virtually formed by multiple (four) images). In response to an operation from the user, the display range designation receiving unit 366 receives designation of a display range within a spherical image (i.e., a display range of an image to be displayed, or a display range for the display image). The display range is designated with a line-of-vision direction (pan, tilt) in which a spherical image is observed from the center and a zoom magnification. In other words, the change in display range is a change in the orientation of the virtual camera or the angle of view of the virtual camera. Such line-of-vision direction and zoom magnification are designated within a prescribed range by a user as appropriate, and the designated line-of-vision direction and zoom magnification power is output from the display range designation receiving unit 366 to the image transformation rendering unit 360.

The operation from the user is not particularly limited, but may include operating graphical user interfaces (GUIs) (e.g., keys for changes in pan, tilt, and zoom) on an application screen to receive a change in display range, by using a mouse, a keyboard, and a touch panel; and directly operating a displayed image by pinching, swiping, and flicking.

Based on the transformation table output from the transformation-table generation unit 358 and the line-of-vision direction and zoom magnification output from the display range designation receiving unit 366, the image transformation rendering unit 360 generates, from multiple captured images output from the image acquisition unit 354, an output image to be displayed, whose display range is designated by a user operation. In the present embodiment, the image transformation rendering unit 360 serves as an generation unit that generates a display image (i.e., the output image to be displayed).

The displaying unit 368 includes a display device, and outputs a display image generated by the image transformation rendering unit 360 from the display device. Thus, the image viewer application displays an image with a certain field of view of a spherical image, which is designated by a user. The displaying unit 368 serves an output unit in the present embodiment.

The following describes in detail image transformation drawing processing performed by the image transformation rendering unit 360, with reference to FIGS. 6 to 14.

Figure 7:
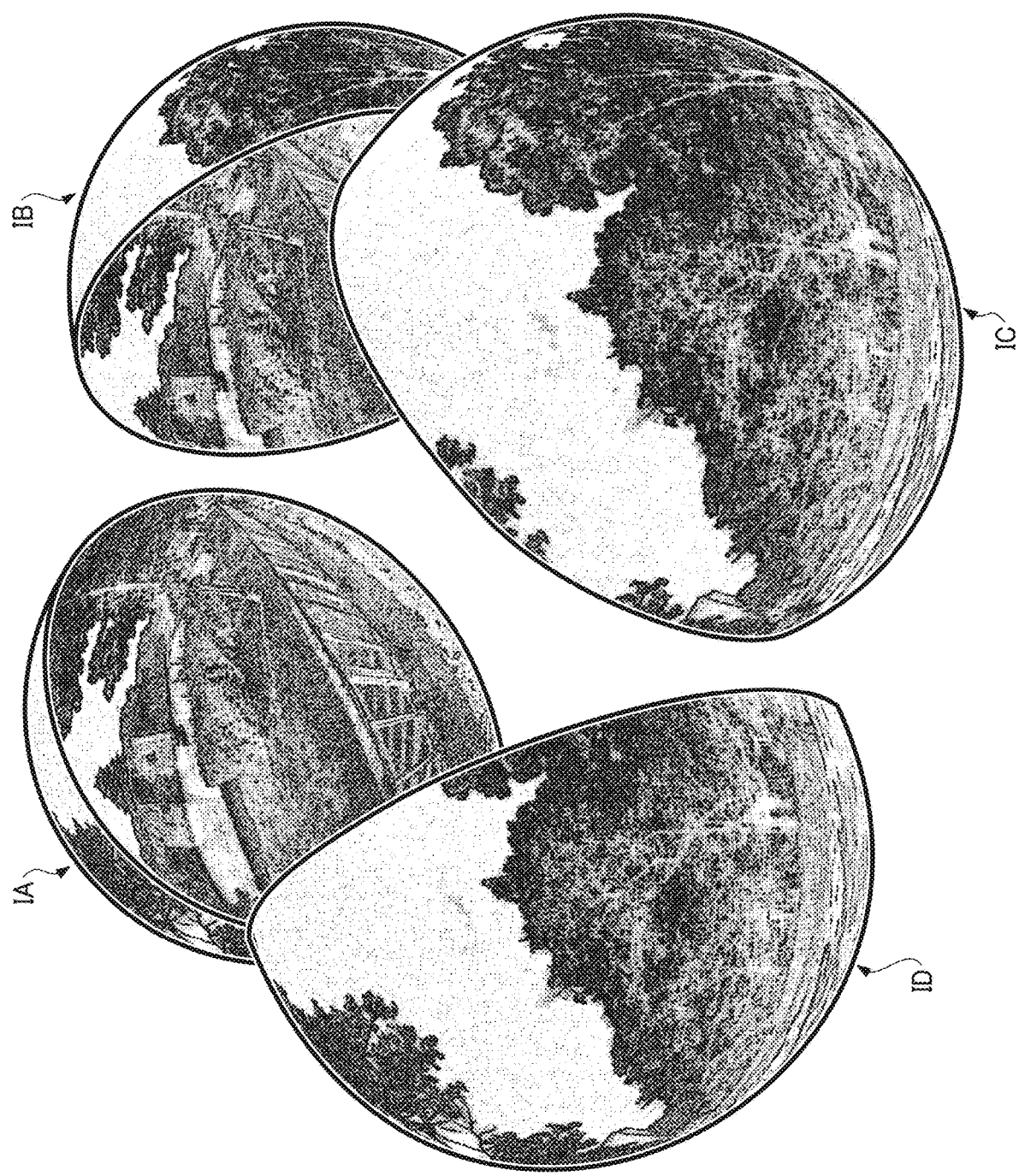
FIG. 7 is a three-dimensional illustration of image-capturing ranges of and hemispherical images captured by multiple imagers, according to an embodiment.
Figure 8:
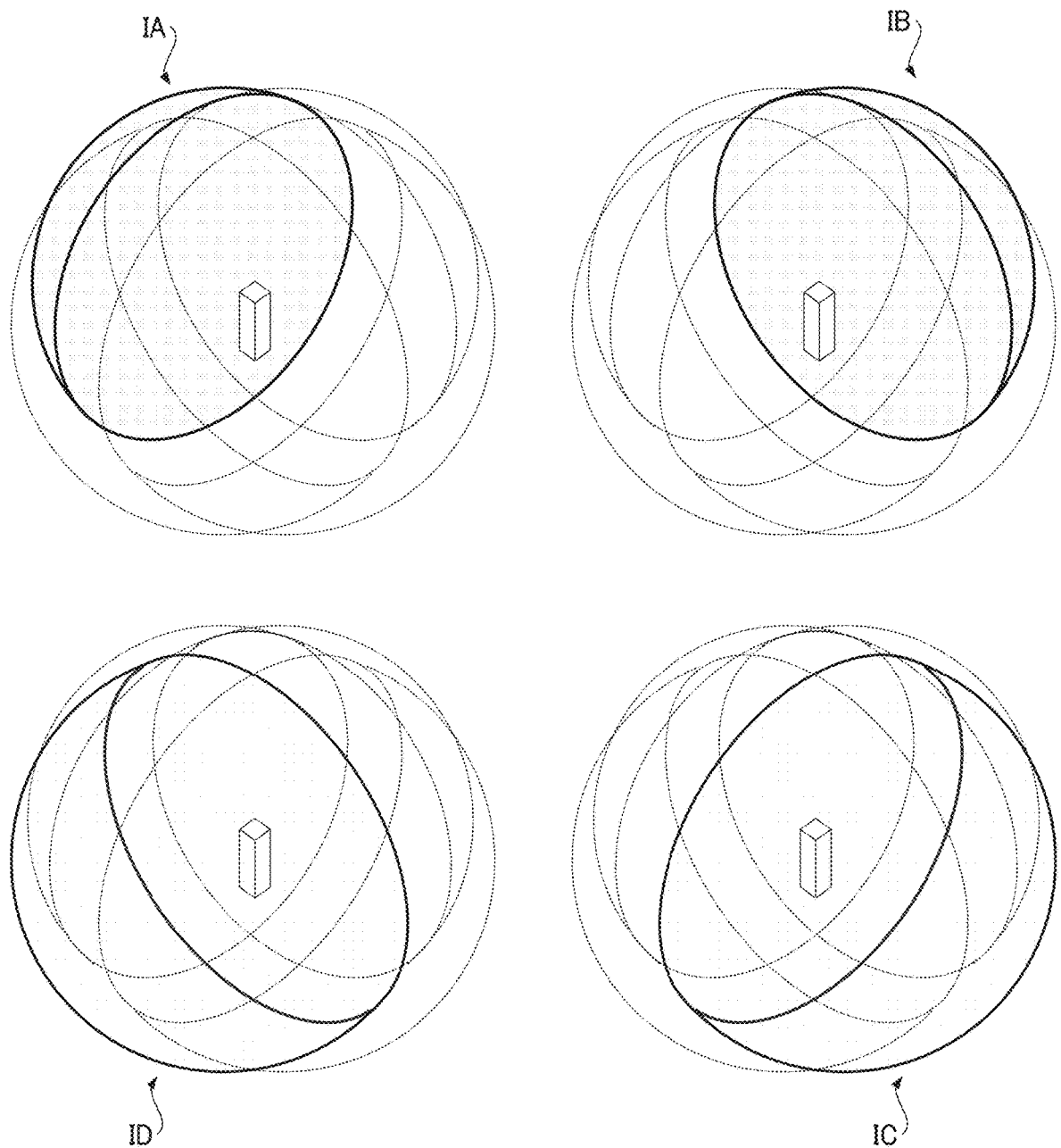
FIG. 8 is a three-dimensional illustration of image-capturing ranges of multiple imagers according to an embodiment.

FIGS. 7 and 8 are three-dimensional illustrations of image-capturing ranges of and images captured by multiple imagers 21, according to an embodiment. FIGS. 7 and 8 schematically illustrate images IA, IB, IC, and ID captured by the multiple imagers 21 according to an embodiment. In the present embodiment, the imagers 21 each have a fish-eye lens with an angle of view of 180° and generate an image whose projection plane is hemispherical. With the fish-eye lens having an angle of view of above 180°, the image captured by the fish-eye lens forms a spherical cap larger than the hemisphere. With the fish-eye lens having an angle of view of below 180°, the image captured by the fish-eye lens forms a spherical cap smaller than the hemisphere. Notably, the four imagers 21A, 21B, 21C, and 21D are apart from the center by a prescribed distance and arranged at intervals of an angle of 90° with respect to the center of the hard hat 23 on which the imagers are mounted (FIG. 2A), each facing in a different direction within a horizontal plane. Such imagers 21A, 21B, 21C, and 21D capture images at different image-capturing positions, in different image-capturing directions, and with image-capturing ranges each partly overlapping with those of adjacent imagers.

Figure 9B:
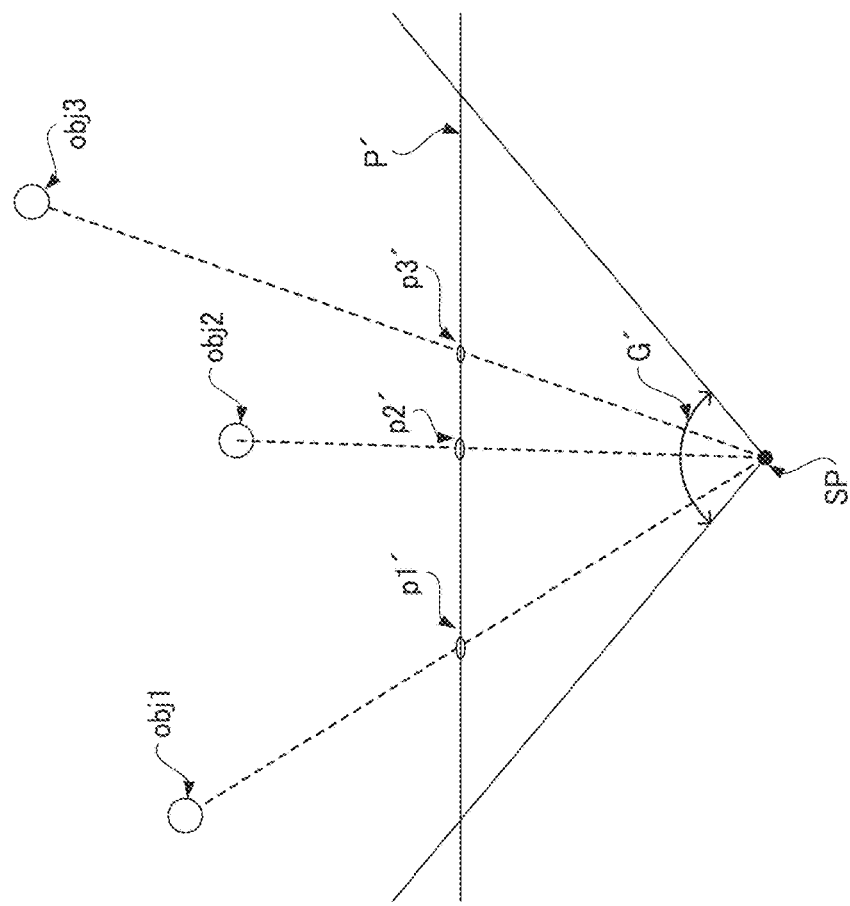
FIGS. 9A and 9B are illustrations of image capturing of objects using a fish-eye lens.
Figure 9A:
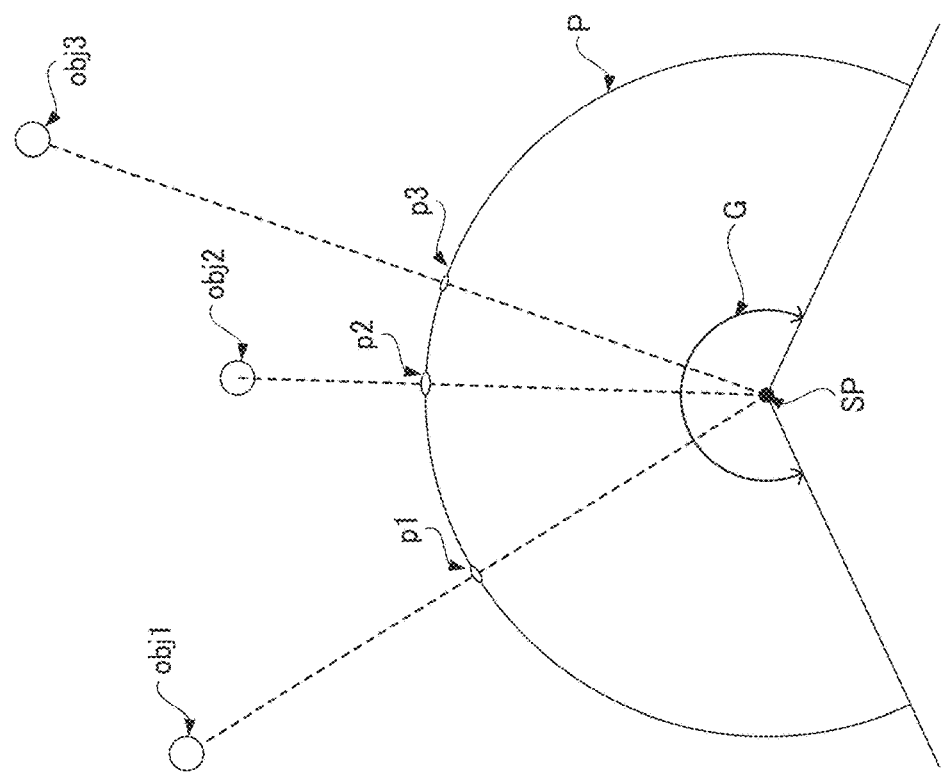

FIGS. 9A and 9B are illustrations of image capturing of objects using a fish-eye lens. FIG. 9A is an illustration of image capturing of objects by the equidistant projection using a fish-eye lens, according to an embodiment of the present disclosure. FIG. 9B is an illustration of image capturing of objects by the perspective projection (central projection) using a typical lens (standard lens), according to a comparative example. In FIG. 9A, the fish-eye lens has an angle of view G of greater than 180° and captures an image whose projection plane P forms a spherical cap larger than the hemisphere. Objects obj1 to obj3 outside the spherical-image capturing device 20 are recorded as images p1 to p3 on the projection plane P, which are intersections between the projection plane P and lines connecting a viewpoint SP of an imager 21 and the positions of the objects obj1 to obj3. Although the projection plane forms a spherical plane or a spherical cap in FIG. 9A, an actually captured image is a flat image obtained by two-dimensionally expanding the spherical plane or the spherical cap.

In FIG. 9B for the perspective projection using a typical lens, according to a comparative example, a projection plane P' is a flat plane. Objects obj1 to obj3 are recorded as images p1' to p3' on the projection plane P', which are intersections between the projection plane P' and lines connecting a viewpoint SP of an imager 21 and the positions of the objects obj1' to obj3'. In the perspective projection, the viewpoint SP is on the projection plane P' when the angle of view is 180°, meaning that the angles of view G' is to be below 180° in the perspective projection.

In the present embodiment, the image transformation rendering unit 360 generates a virtual image having a wider angle of view wider than multiple images captured by the imagers 21, by mapping the captured images onto a three-dimensional object, or a spherical object based on their image-capturing directions. The image transformation rendering unit 360 further generates a plane image as an output image to be displayed, which is extracted from the virtual image mapped on the spherical object through the perspective projection (projection processing) using a virtual camera. Notably, although the images captured by the imagers 21 differ in image-capturing position and image-capturing direction, the images are mapped onto the three-dimensional object assuming that the image-capturing position is stationary between those images (i.e., the images are captured by the image-capturing apparatus at a stationary position).

Figure 10A:
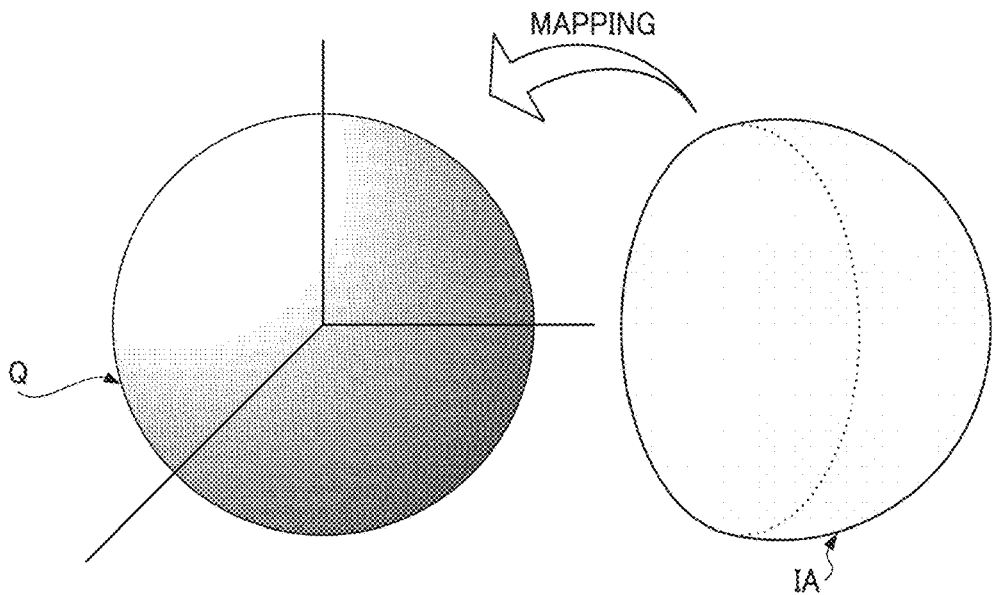
FIGS. 10A and 10B are illustrations of mapping of hemispherical images onto a spherical object.
Figure 10B:
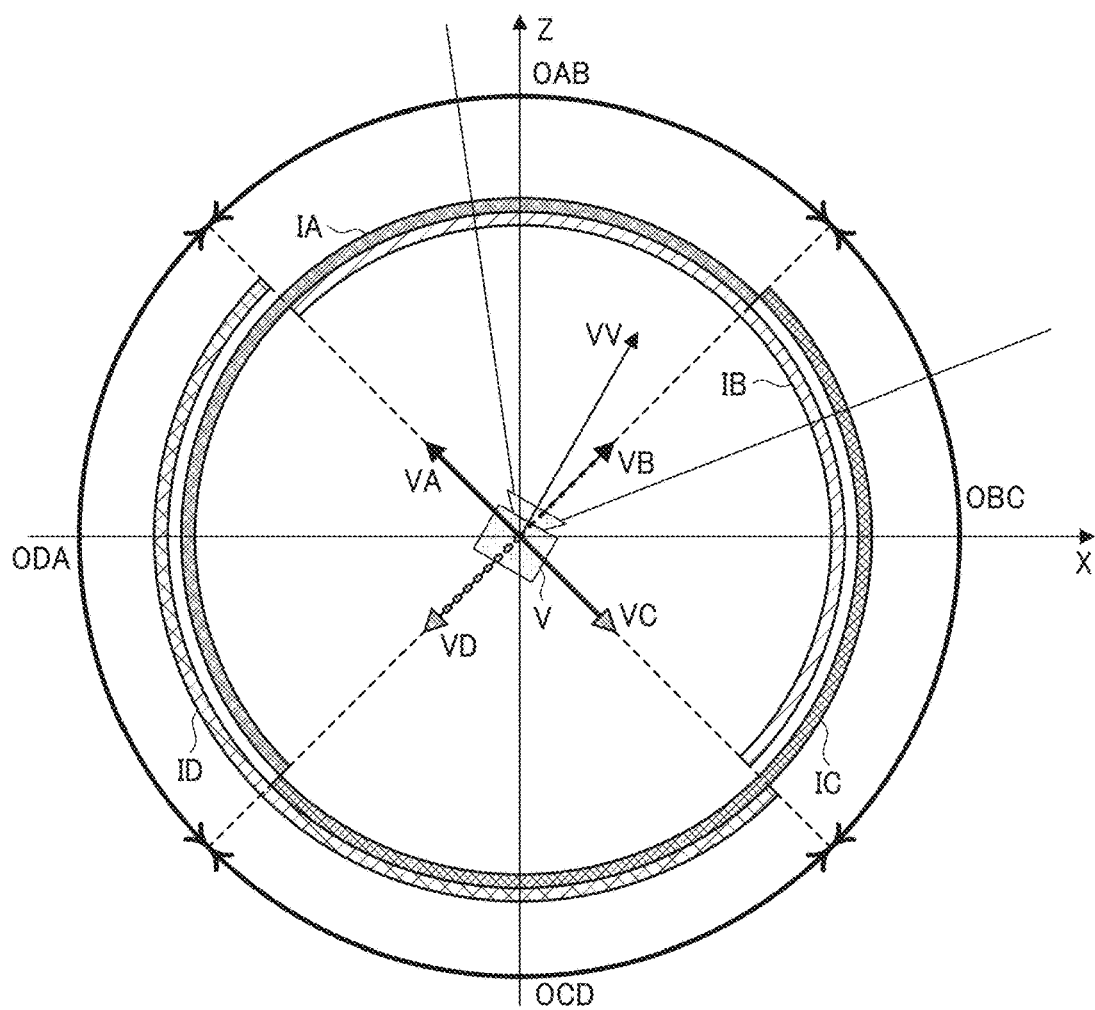

FIGS. 10A and 10B are illustrations of mapping of hemispherical images onto a spherical object. FIG. 10A is an illustration of mapping of one hemispherical image IA onto a spherical object Q. As described above, a disparity occurs between the imagers 21, which actually means that the image-capturing position differs between the imagers 21. In the present embodiment, multiple spherical images are mapped onto the same spherical object.

FIG. 10B is a plan view of one sphere onto which four hemispherical images are mapped with the same image-capturing position between four image-capturing ranges of the hemispherical images. In FIG. 10B, the image IA captured by the first imager 21A is indicated by a black circular arc, an image IB captured by the second imager 21B is indicated by a hatched circular arc, an image IC captured by the third imager 21C is indicated by a dark-colored hatched circular arc, and an image ID captured by the fourth imager 21D is indicated by a light-colored hatched circular arc. Each image-capturing range of the imagers 21 has overlapping areas each corresponding to an angle of view of 90° because the imagers 21 have an angle of view of 180° and are arranged at intervals of an angle of view of 90° facing in different directions. In viewing a displayed image, an output image to be displayed is extracted from the images mapped onto the spherical body (the spherical object Q) by the perspective projection using the virtual camera V and displayed as a display image. Although the images IA to ID are actually mapped onto the same spherical body, the spherical images are illustrated to be offset from each other in the radial direction in FIG. 10B.

Figure 11:
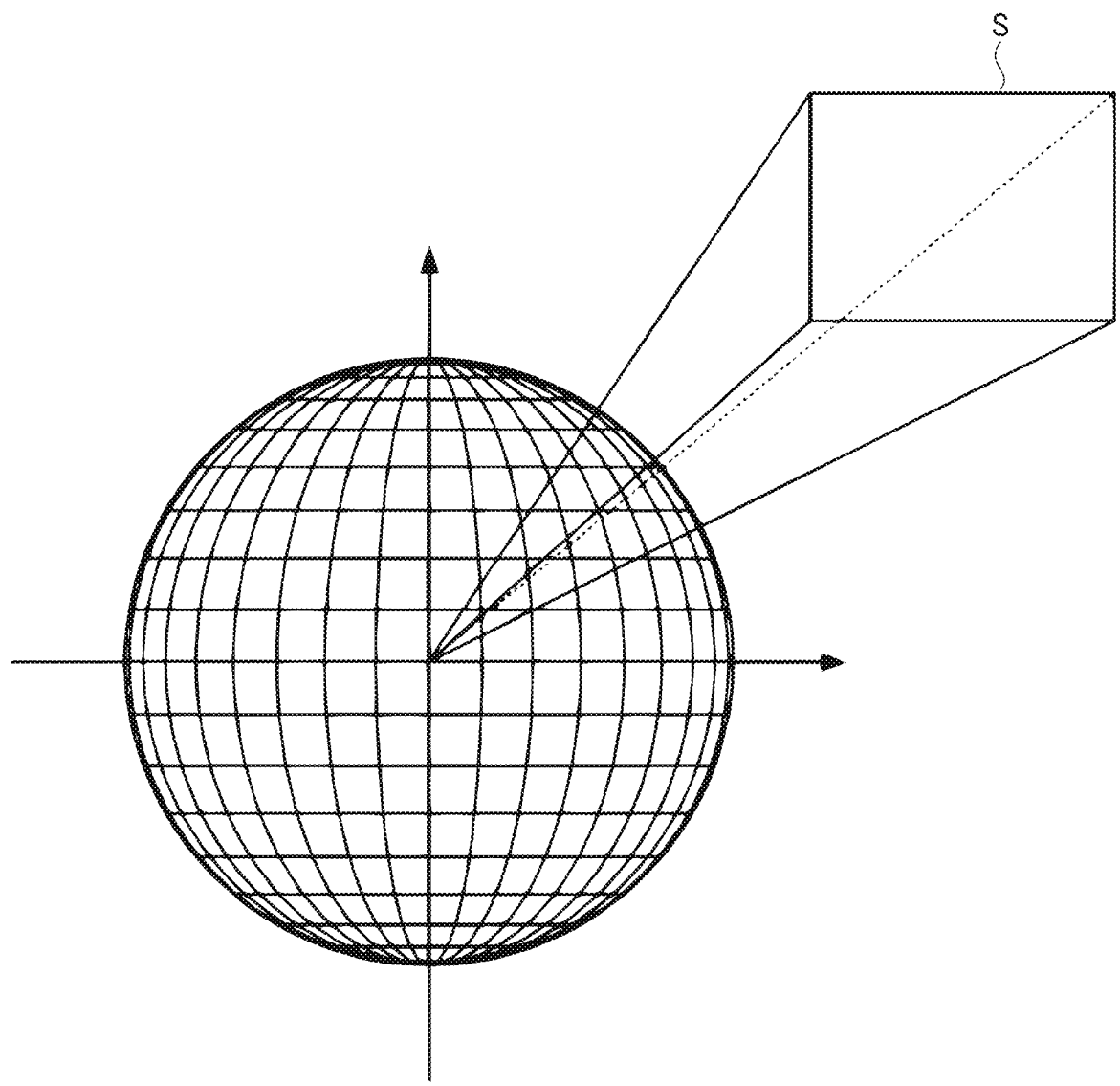
FIG. 11 is an illustration of perspective projection for three-dimensional graphics display.

FIG. 11 is an illustration of perspective projection for three-dimensional graphics display. As illustrated in FIG. 11, the image transformation rendering unit 360 generates an output image as a plane image by performing perspective projection on a three-dimensional model in which hemispherical images are mapped onto the inner surface of a spherical body. Image generation parameters used for the perspective projection are determined in accordance with the user operation as described above. Examples of the image generation parameters may include, in certain embodiments, a direction (v) and a viewing angle (Θ) of the virtual camera.

The output image S is an image obtained by extracting an image to be observed, which is within a specific viewing angle (Θ) and according to the shape of a display region, from the three-dimensional model when the three dimensional model is viewed from the center of the spherical body in a prescribed latitude-longitude direction (v). The direction (v) of the virtual camera V is related to the viewing direction of the display area, and the viewing angle (Θ) is related to the zoom magnification. Although the direction (v) and the viewing angle (Θ) of the virtual camera V are exemplified as the parameters, the parameters are not limited thereto in other embodiments. For example, the parameters may include the viewpoint position (d) of the virtual camera V, which can be a factor to change an effective angle of view to change the zoom magnification by moving the virtual camera toward or away from the center of the spherical body.

Figure 12B:
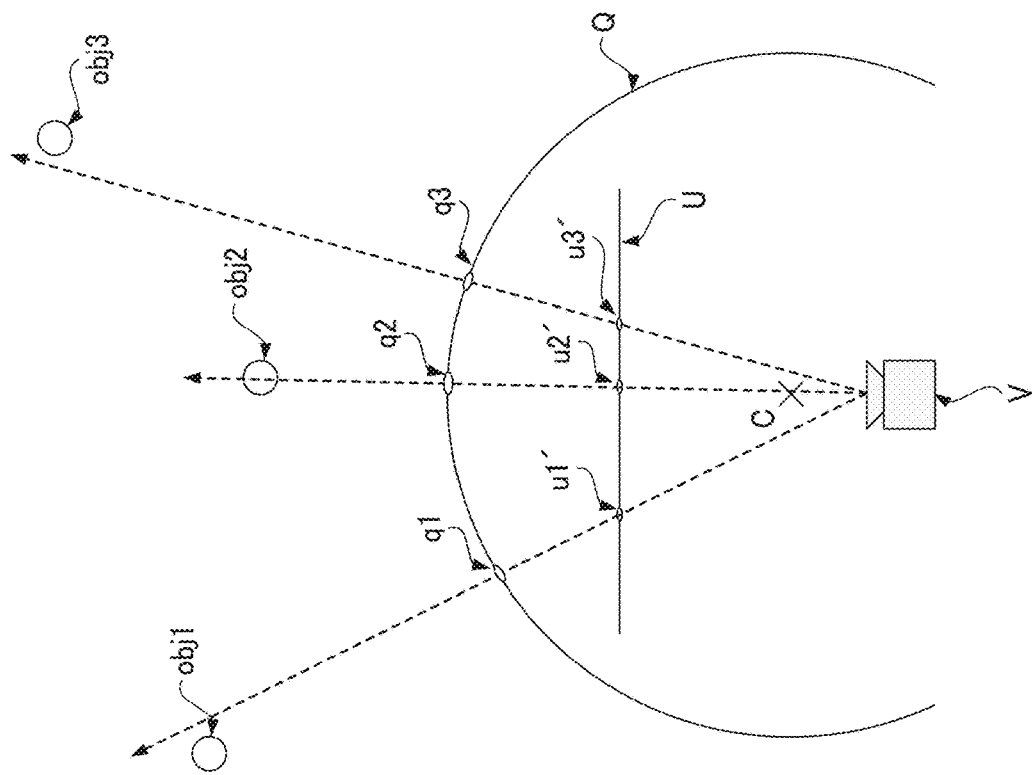
FIGS. 12A and 12B are illustrations of appearance of objects in an output image with a change in the position of the viewpoint of a virtual camera.
Figure 12A:
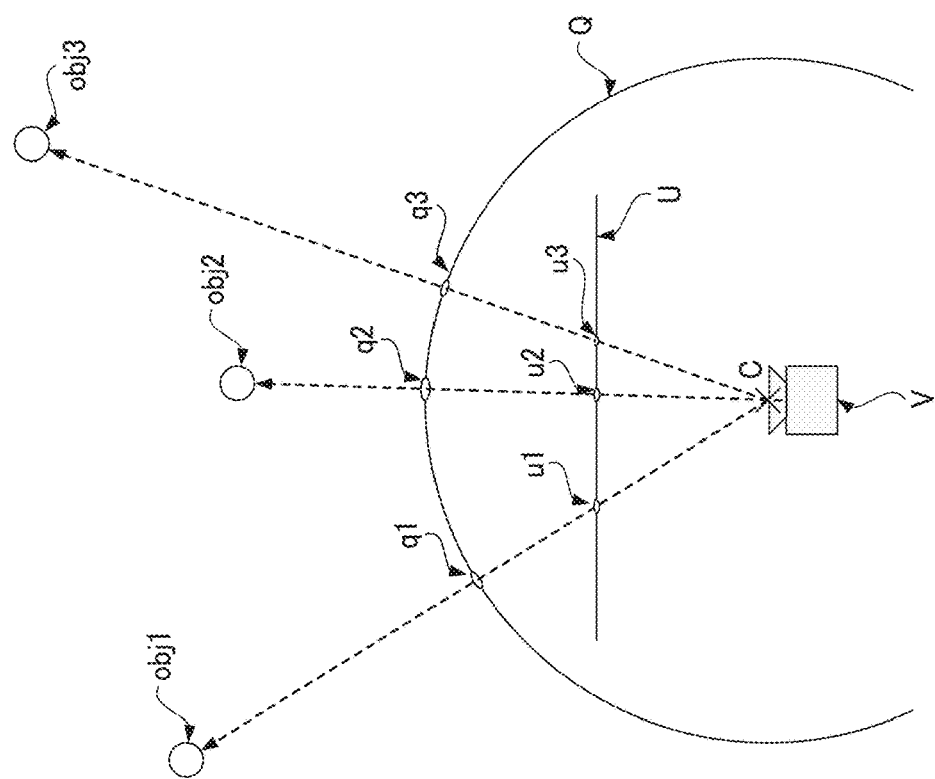

FIGS. 12A and 12B are illustrations of appearance of objects in an output image with a change in the position of the viewpoint of a virtual camera V. FIGS. 12A and 12B are also plan views of perspective projection of a spherical object Q onto which one hemispherical image is mapped. FIG. 12A is an illustration of a case in which the virtual camera V is at the center C of the spherical object Q. FIG. 12B is an illustration of a case in which the virtual camera V is farther from the objects than the center C of the spherical object Q. In FIGS. 12A and 12B, the viewpoint SP of the imager 21 during capturing of image is assumed to be coincide with the center C of the spherical object Q for purposes of simplification to describe differences due to different positions of viewpoint of the virtual camera V. FIGS. 12A and 12B also indicate the positions of the objects obj1 to obj3 at the time of capturing an image.

In FIG. 12A in which the virtual camera V is at the center C of the spherical object Q, images q1 to q3 on the spherical object Q for the objects obj1 to obj3 are formed as images u1 to u3 on an image plane U corresponding to an output image. In this case, the objects obj1 to obj3 appear as if they are at their original positions because an object objx (x=1 to 3), an image qx, an image ux, and the viewpoint position C of the virtual camera V are aligned. In FIG. 12B in which the virtual camera V is farther from the objects obj1 to obj3 than the center C of the spherical object Q, the images q1 to q3 on the spherical object Q for the objects obj1 to obj3 are formed as images u1' to u3' offset from the positions of the images u1 to u3 in FIG. 12A on the image plane U corresponding to an output image. In this case, an object objx (x=1 to 3), an image qx, an image ux, and the viewpoint position C of the virtual camera V are misaligned, and the objects obj1 to obj3 appear distorted as if they are at different positions from their original positions depending on their locations. To view an image without any distortion, the viewpoint position (d) of the virtual camera V is to be fixed at the center of the spherical object Q.

As described above, disparity occurs between multiple imagers 21. To deal with such disparity between the imagers 21, the ultra-small binocular bending optical technology is used to reduce the disparity between the imagers 21 to sufficiently small level. The reduction in disparity to sufficiently small level enables a relatively natural-looking image formed by stitching multiple images (joining process). Further, a more natural-looking image may be obtained by finely adjusting each joint between the images by pattern matching for each joint. However, for the case in FIGS. 2A and 2B in which multiple imagers 21 are arranged around the outer periphery of the hard hat 23 facing in different directions, the disparity occurs by orders of dimensions (head length, head width) of the head of a person wearing the hard hat 23, and stitching is difficult to perform.

Figure 13B:
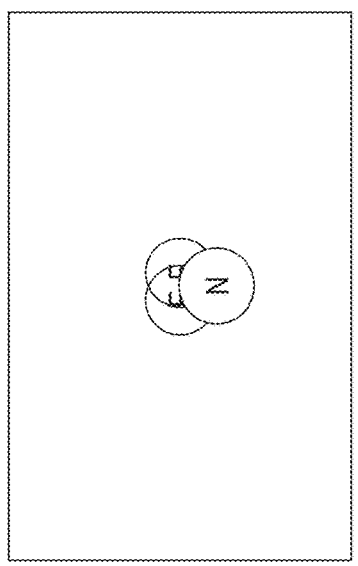
FIGS. 13A, 13B, 13C, and 13D are illustrations of a stitching process of images captured by two imagers between which disparity occurs.
Figure 13D:
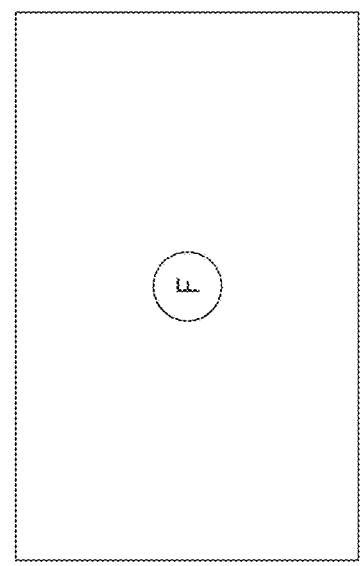
Figure 13A:
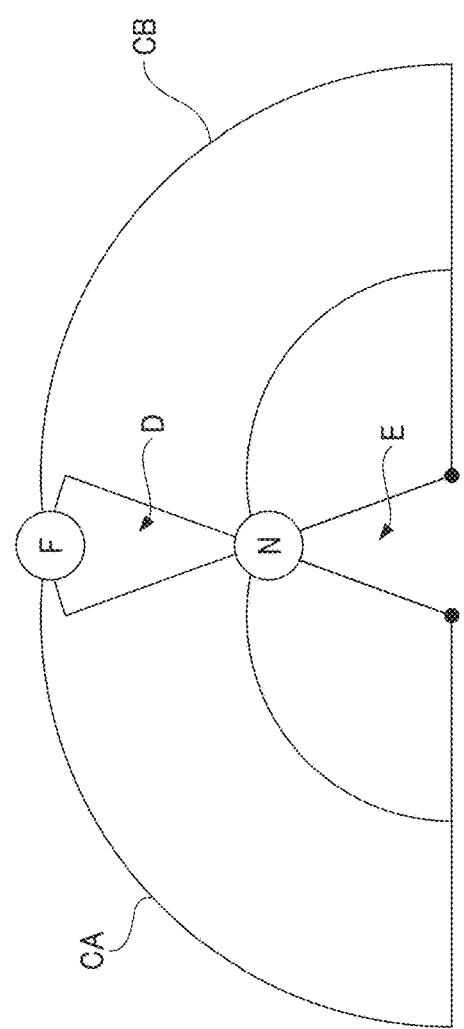
Figure 13C:
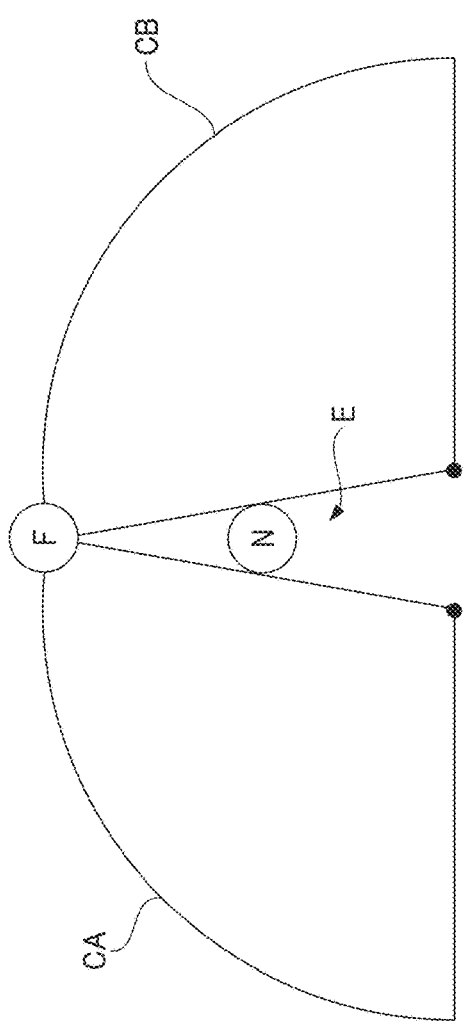

FIGS. 13A, 13B, 13C, and 13D are illustrations of a stitching process of images captured by two imagers between which disparity occurs. In FIG. 13A, two images captured by two imagers 21 are stitched with reference to an image of an object N at a near distance (i.e., the foreground)

in an overlapping area between the image-capturing ranges of the two imagers 21. FIG. 13B is an illustration of images stitched by the stitching process in FIG. 13A. In FIG. 13C, two images captured by two imagers 21 are stitched with reference to an image of an object F at a long distance (i.e., the background) in an overlapping area between the image-capturing ranges of the two imagers 21. FIG. 13 D is an illustration of images stitched by the stitching process in FIG. 13C.

As illustrated in FIGS. 13A and 13B, stitching the images with reference to the image of the object N at a near distance, rather than the object N, may cause double images of the object F at a long distance to appear. In FIGS. 13A and 13C, a double-image area D is an area farther than the object N, in which double images appear. Further, a disappearance area E is an area closer than the object N with reference to which the images has been stitched and in which any objects disappear after combining the images. On the other hand, as illustrated in FIGS. 13 *c* and 13 *d*, when stitching is performed in accordance with the object F in the distant view, the object F in the distant view is favorably connected, but the object N in the closer view than the object F enters the widened disappearance region E and may disappear from the combined image. Either stitching of FIGS. 13A and 13B may cause an unnatural-looking image because of different image-capturing positions and image-capturing directions between the two images. As described above, increasing disparity between multiple images hampers proper stitching of the images more significantly.

In view of such circumstances, the present embodiment avoids combining multiple fish-eye images captured by multiple imagers 21 to generate one spherical image, and further generating an output image S using the generated one spherical image. To deal with the issues, the image transformation rendering unit 360 involves switching at least a main image to be used (i.e., a hemisphere image in a line-of-vision direction as viewed from the virtual camera, which occupies the largest area of the display range) between multiple images captured by multiple imagers 21, to generate an output image S. Thus, the output image S is generated according to the display range designated in the spherical image.

If an output image S is generated using only the main image, a region outside the main image may be included in a wide display range. To avoid such a situation, the image transformation rendering unit 360 more preferably maps multiple images captured by multiple imagers 21 onto a spherical object while overlapping the multiple images in a prescribed order. This enables another image other than the main image to appear in the region outside the main area. In this case, an image is overlapped on another image that has been rendered onto the spherical object earlier in an overlapping area between two images, meaning that in the overlapping area, a lastly rendered image, i.e., an image closest to the virtual camera (i.e., an image at the foreground) as viewed from the virtual camera is mainly observed from the virtual camera V. The present embodiment determines or switches the rendering order according to the display range and determines the lastly rendered image as the main image.

FIG. 6 indicates more specific configuration of the image transformation rendering unit 360. In the present embodiment as illustrated in FIG. 6, the image transformation rendering unit 360 includes a determination unit 362 and an image generation unit 364. The determination unit 362 determines the rendering order and which image to select as the main image to be lastly rendered. The image generation unit 364 generates an output image S based on the determined rendering order.

The determination unit 362 selects, from the captured multiple images, at least an image to be used for display based on the designated display range (in particular, the line-of-vision direction) and the image-capturing direction of each of the images, which is transformation data based on the image-capturing direction data output from the transformation-table generation unit 358. More specifically, the determination unit 362 identifies which hemispherical image the virtual camera V is facing (the line-of vision direction) based on the image-capturing direction and the display range, and determines the rendering order of the multiple images to allow the hemispherical image the virtual camera V is facing to be rendered in the last place.

More specifically, the determination unit 362 includes a calculation unit 363. The calculation unit 363 calculates an inner product of an image-capturing direction vector based on the image-capturing direction of each of the multiple images and an orientation vector of the virtual camera that defines a display range (noticeably, a line-of-vision direction). The rendering order depends on the magnitude of the inner product calculated for each of the multiple images.

The image generation unit 364 transforms each image data (i.e., each fish-eye image) into a spherical image based on the transformation table and the designated display range, and subjects a three-dimensional object in which at least images to be used (e.g., hemispherical images) are mapped to projection processing, generating an output image to be displayed. During this process, the image generation unit 364 renders the hemispherical images as the three-dimensional object in the rendering order determined by the determination unit 362. Preferably, the three-dimensional object is a spherical object, onto which images are mapped. However, this is only one example, and the three-dimensional object may be an ellipsoidal object, a polyhedral object, or a more complex shaped object.

In the above-described embodiment, the image compression unit 316 of the spherical-image capturing device 20 compresses a fish-eye image as is, and the transmitter 318 transmits its image data representing the fish-eye image as is to the information processing terminal 10. In this configuration, the image transformation rendering unit 360 of the information processing terminal 10 transforms each image acquired by the image acquisition unit 354 into an image in a spherical-image format (Equirectangular format) based on the transformation table generated by the transformation-table generation unit 358. The image in the spherical-image format includes pixel values only in a hemispherical portion and may be regarded as a hemispherical image. Each image generated in the spherical-image format is mapped onto a spherical object. Unlike such a configuration in which the spherical-image capturing device 20 transmits a captured fish-eye image as is to the information processing terminal 10, in some examples, the image processor 314 of the spherical-image capturing device 20 transforms an image captured by each imager 21 into an image in a spherical-image format (Equirectangular format) using projective data representing the relation between the image height of an image and the incident angle of the fish-eye lens, the lens optical characteristics, and lens assembly errors, and transmits the images generated in the spherical-image format to the information processing terminal 10. In this configuration, the image generation unit 364 maps the images in the spherical-image format onto a spherical object and subjects the spherical object to the perspective projection transformation to generate an output image S to be displayed. Alternatively, without transformation of the fish-eye images into images in the spherical-image format, the fish-eye images may be directly mapped onto a three-dimensional object after calculation of a texture image of the spherical surface.

Since mapping a fish-eye image or a spherical image onto a spherical object is a known technique, the detailed description will be omitted.

Figure 14A:
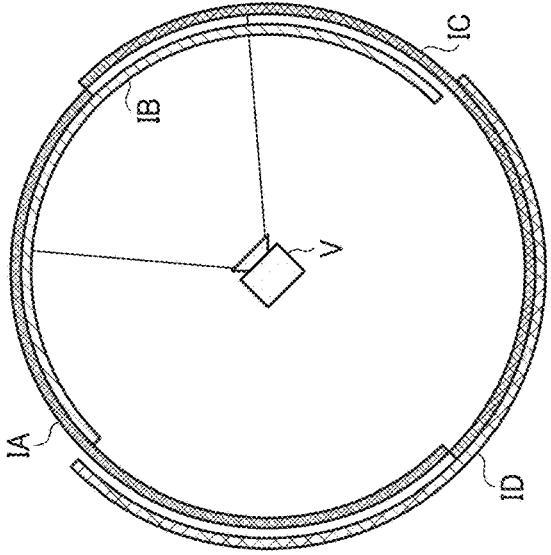
FIGS. 14A, 14B, and 14C are illustrations of advantageous effects of a change in the rendering order of hemispherical images, performed by an image transformation rendering unit, according to an embodiment.
Figure 14B:
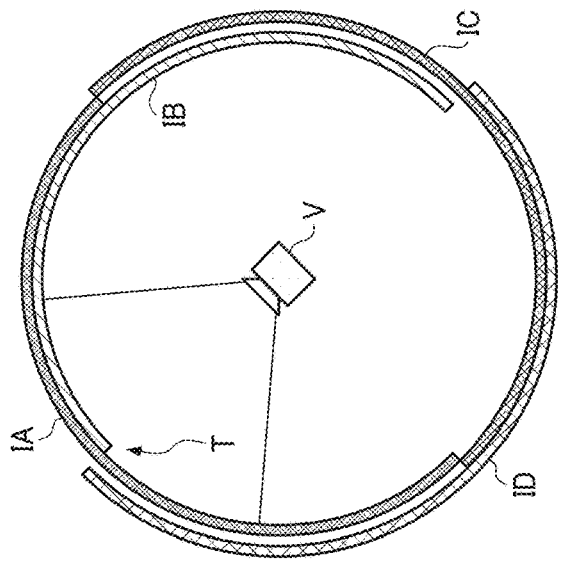
Figure 14C:
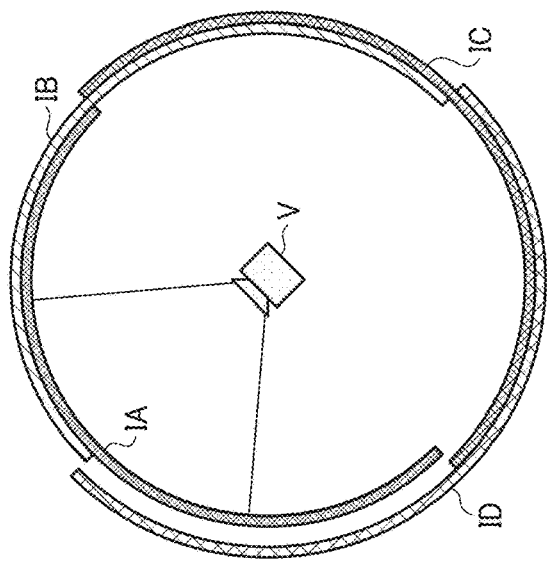

FIGS. 14A, 14B, and 14C are illustrations of advantageous effects of a change in the rendering order of hemispherical images, performed by the image transformation rendering unit 360. In three-dimensional computer graphics, Z-buffer is known to render an object at the back hidden by an object at the front regardless of the rendering order. However, the present embodiment controls the foreground and the background in accordance with the rendering order, to overlap multiple hemispherical images on top of one another and generate one spherical body, without using Z-buffer. Notably, as described above for FIG. 10B, FIGS. 14A, 14B, and 14C are illustrations of the spherical images offset from each other in the radial direction (i.e., each spherical image has a different radius) although they are actually mapped onto the same spherical body.

FIG. 14A is an illustration of a fourth hemispherical image ID, a third hemispherical image IC, a first hemispherical image IA, and a second hemispherical image IB rendered in this order. When the spherical object onto which the hemispherical images are rendered in that rendering order is viewed from the center of the spherical object by the virtual camera V, only the second hemispherical image IB is within the entire field of view of the virtual camera V, which allows display of an image without any joint.

FIG. 14B is an illustration of the hemispherical images IA, IB, IC, and ID rendered in the same rendering order as in FIG. 14A and with the orientation of the virtual camera V changed in response to the user's operation. In FIG. 14B, the change in the orientation of the virtual camera V causes the boundary T, which is the edge of the second hemispherical image IB, between the second hemispherical image IB and the first hemispherical image IA to be included in the field of view of the virtual camera V.

Figure 18A:
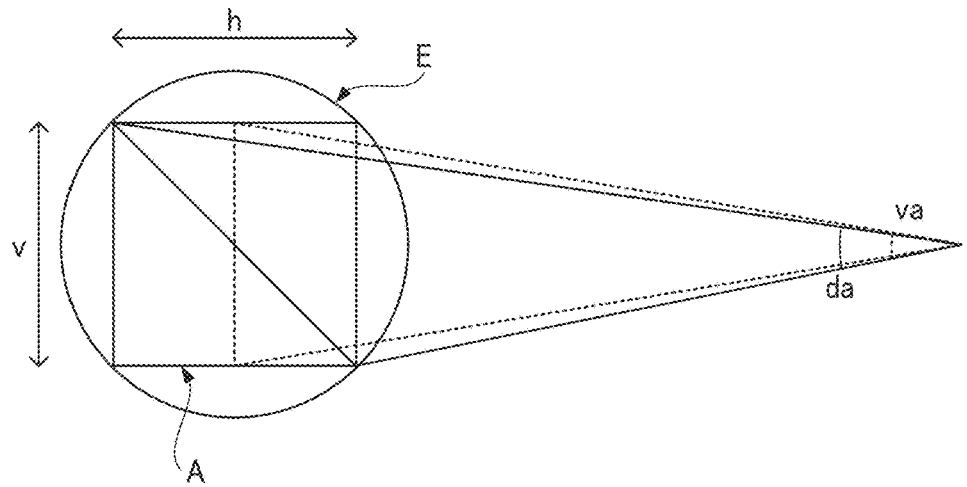
FIGS. 18A and 18B are illustrations of a limited display range, according to another embodiment.
Figure 18B:
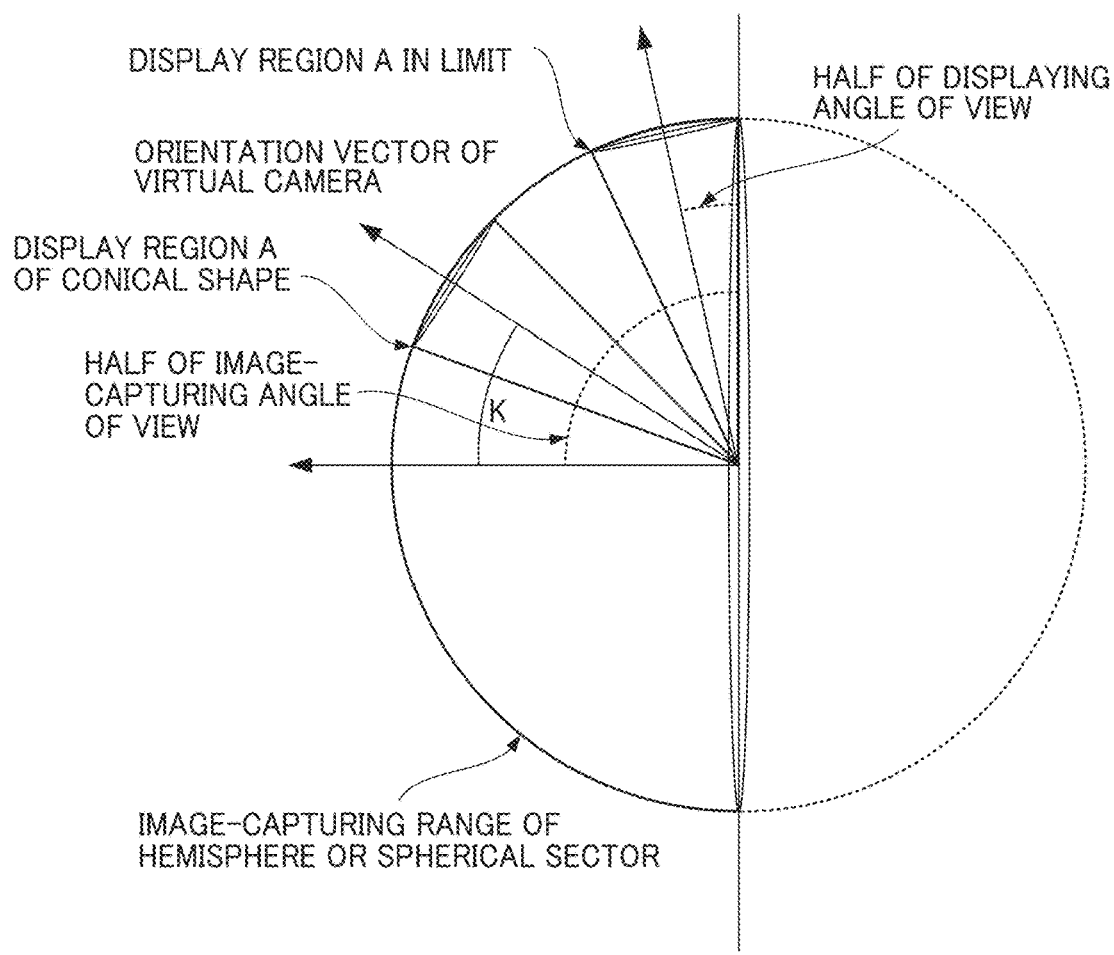

FIG. 14C is an illustration of the hemispherical images IA, IB, IC, and ID rendered in another rendering order changed from that of FIGS. 14A and 14B and with the orientation of the virtual camera V changed from that of FIG. 14A (or the same orientation of the virtual camera V as in FIG. 18B). In the rendering order in FIG. 14C, the order of the first hemispherical image IA and the second hemispherical image IB is switched, and the fourth hemispherical image ID, the third hemispherical image IC, the second hemispherical image IB, and the first hemispherical image IA are rendered in this order. Switching the rendering order of the hemispherical images allows only the first hemispherical image IA to be within the entire field of view of the virtual camera V, and enables display of an image without any joint. In this configuration, a hemispherical image closest to the front of the virtual camera among the captured hemispherical images is determined according to the direction of the virtual camera, which is changed in response to an operation from a user. The hemispherical image closest to the front of the virtual camera is lastly rendered to a spherical body to prevent the edge of one hemispherical image, or the boundary between two different hemispherical images from being included in the field of view of the virtual stereo camera.

In the above-described configuration, the information processing terminal 10 generates an output image S to be displayed. Alternatively, the spherical-image capturing device 20 or the management system 50 may generate an output image S to be displayed, and transmits the generated output image S to the information processing terminal 10. Then, the information processing terminal 10 causes a display device to display the received output image S as is. In this alternative configuration, the spherical-image capturing device 20 or the management system 5 includes the image acquisition unit 354, the projection-transformation-data acquisition unit 356, the image transformation rendering unit 360, and the display range designation receiving unit 366, which are illustrated in FIG. 6.

Figure 15:
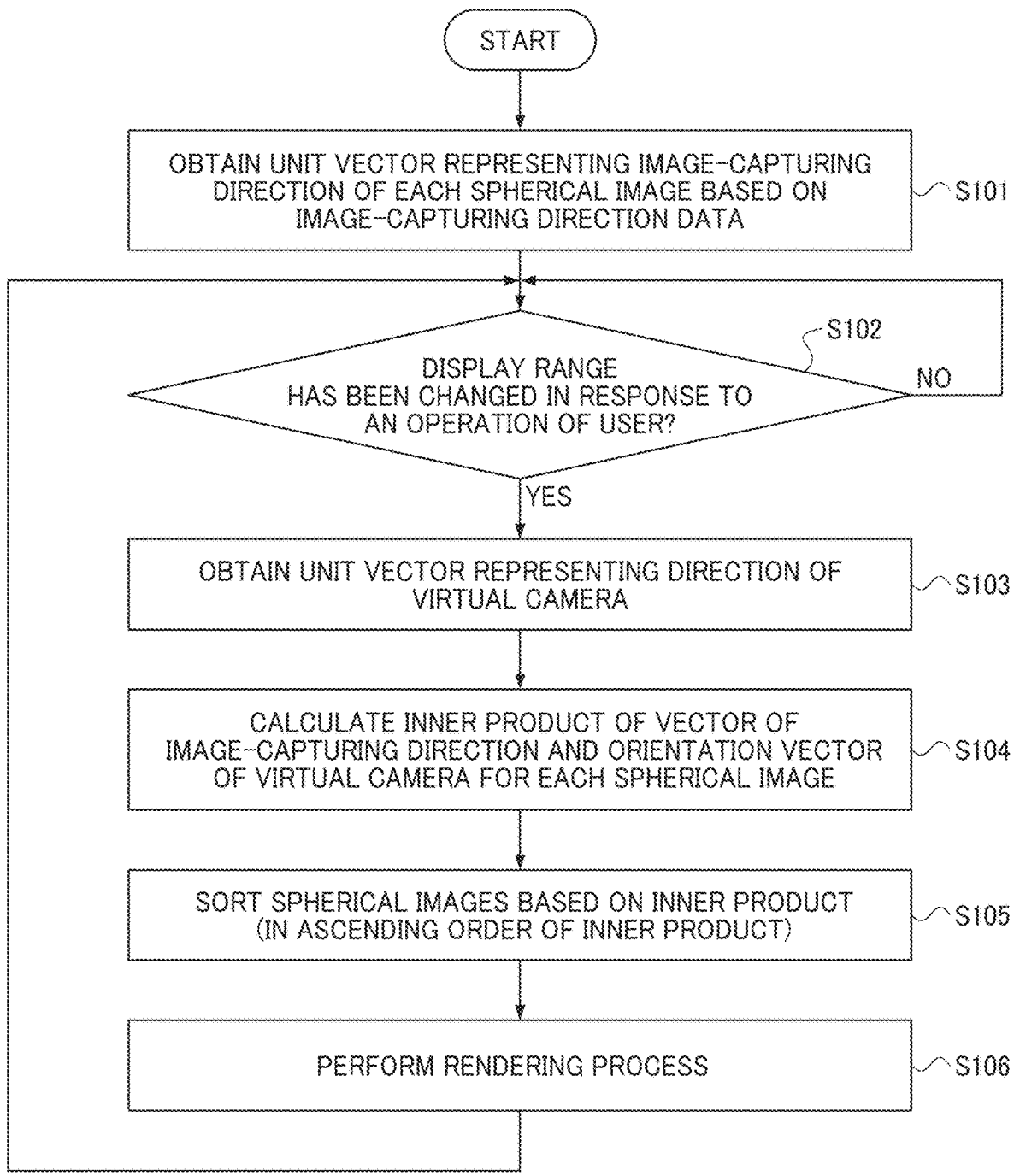
FIG. 15 is a flowchart of a process of displaying an image, performed by the information processing terminal, according to an embodiment.

Hereinafter, a process of displaying an image according to an embodiment will be described in detail with reference to FIGS. 10B, 15, and 16. FIG. 15 is a flowchart of a process of displaying an image, performed by the information processing terminal, according to an embodiment.

The process in FIG. 15 starts, for example, upon start-up of the image viewer application for the spherical-image capturing device. In step S101, the information processing terminal 10 determines the image-capturing direction of each hemispherical image based on the image-capturing direction data. Since the image-capturing direction of each hemispherical image is determined by the arrangement of a corresponding imager 21 during image-capturing, the image-capturing direction is first obtained in this process.

Figure 16:
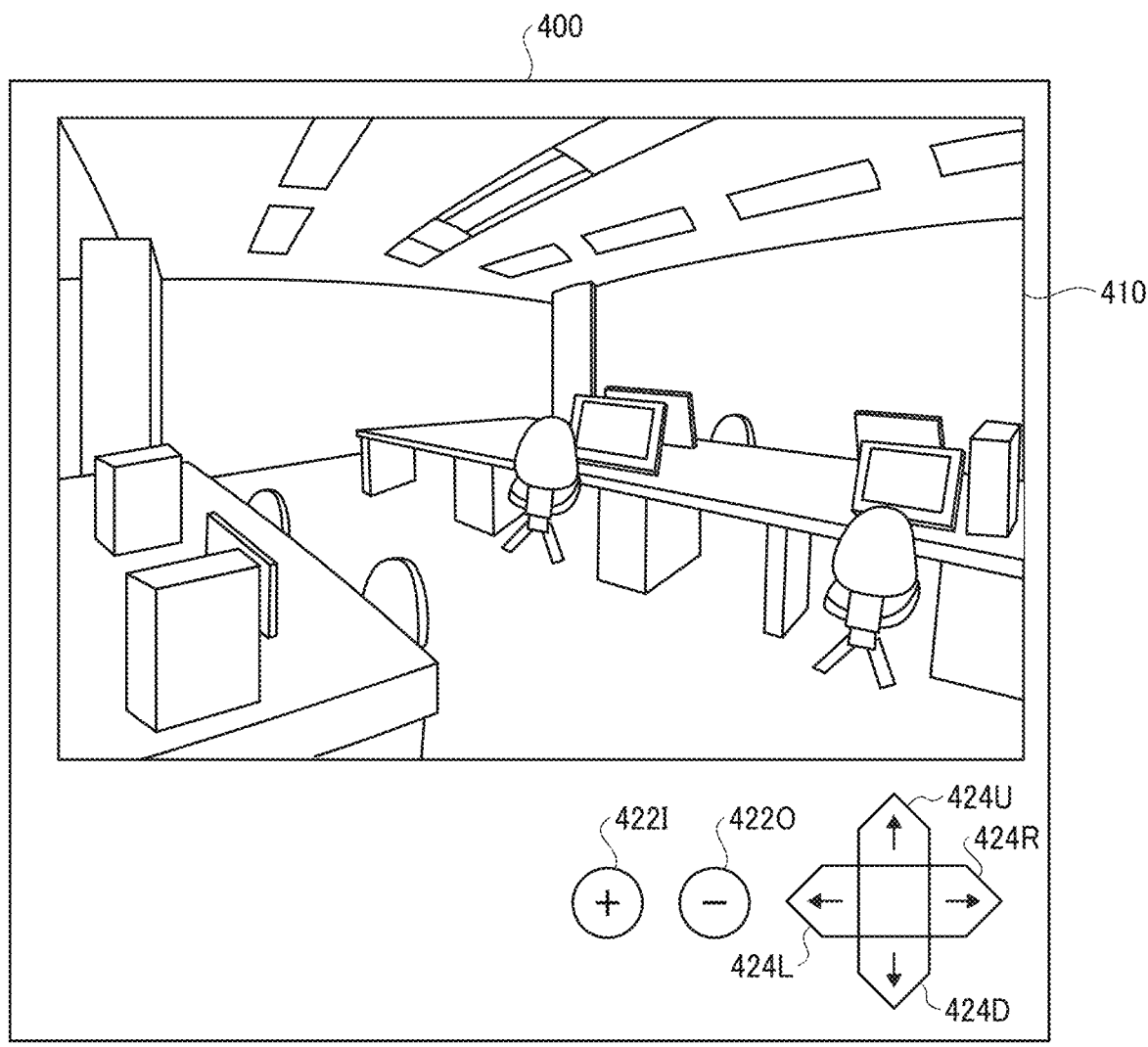
FIG. 16 is an illustration of an image viewer screen that displays a spherical image of a prescribed display range, according to an embodiment.

FIG. 16 is an illustration of an image viewer screen that displays a spherical image of a prescribed display range, according to an embodiment. A user changes the display range via the user interface (UI). An image viewer screen 400 in FIG. 16 includes an image display area 410 and GUI components 422 and 424 used to change the display range of a display image displayed or to be displayed in the image display area 410. The displaying unit 368 causes the image display area 410 to display an output image S with a display range in accordance with a currently designated display range, generated by the image transformation rendering unit 360.

In step S102, the information processing terminal 10 determines whether the display range designation receiving unit 366 has received an operation requesting a change in the display range from a user. In other words, the information processing terminal 10 determines whether the display range has been changed in response to an operation from the user. The display range designation receiving unit 366 detects the operation requesting a change in the display range from a user operating the GUI components 422 and 424 for different operations, in response to the occurrence of event: a click or a flick of the GUI components 422 and 424. The image viewer screen 400 in FIG. 16 includes a GUI component 422I and a GUI component 422O, which are operated by a user to change a specified zoom value. The GUI component 422I receives a zoom-in instruction, and the GUI 422O receives a zoom-out instruction. The image viewer screen 400 further includes a left button 424L and a right button 424R to change a specified pan value, and an up button 424U and a down button 424D to change a specified tilt value. The left button 424L and right button 424R receive a leftward or rightward pan instruction. The up button 424U and down button 424D receive a upward or downward tilt instruction.

In addition to the operation of the GUI components, the display range designation receiving unit 366 detects the operation requesting a change in display range, in response to the occurrence of event: an operation of a shortcut key, a gesture operation, or a multi-touch operation. Examples of the shortcut key include a "+" button and a "−" button on a keyboard to give zoom-in and zoom-out instructions. Further, key operations on the left and right arrow buttons and the up and down arrow buttons for instructing left and right panning and up and down tilting may be used as shortcut keys. Multi-touch operations may include pinch-in and pinch-out associated with zoom operations.

In step S102, the information processing terminal 10 waits until the user inputs an operation requesting a change in display range by operating the above-described user interface. When the information processing terminal 10 determines that the user has input an operation requesting a change in display range (i.e., the display range has been changed in response to an operation from the user) (YES in step S102), the process proceeds to step S103. In step S103, the information processing terminal 10 obtains a unit vector representing the direction of the virtual camera V using an updated parameter output from the display range designation receiving unit 366 to the image transformation rendering unit 360.

FIG. 10B indicates a unit vector (the orientation vector of the virtual camera) representing the direction of the virtual camera V and a unit vector (the image-capturing direction vector) representing the direction of the center of each hemispherical image, which are used to determine the rendering order of hemispherical images. The image-capturing direction vectors VA, VB, VC, and VD of the images IA, IB, IC, and ID are usually along the optical axes of the imagers 21, respectively, and are obtained from the image-capturing direction data included in the projective transformation data. Since the image-capturing direction vectors are set by the direction of the apparatus during the image-capturing, the image-capturing direction vectors may be first obtained once at the time of browsing in step S101. Further, since the orientation vector VV of the virtual camera V that defines the display range is dynamically changeable with the user's operation, the orientation vector VV is to be obtained for each user's operation that may change at least a direction (v) of the virtual camera. Notably, although FIG. 10B two-dimensionally illustrates the virtual camera V for convenience, the actual unit vectors are three-dimensional vectors to allow pan and tilt of the virtual camera.

Referring back to FIG. 15, in step 104, the information processing terminal 10 calculates an inner product of the orientation vector VV of the virtual camera V and each of the image-capturing direction vectors VA, VB, VC, and VD of multiple (four) hemispherical images. In step S105, the information processing terminal 10 sorts the multiple (four) hemispherical images in ascending order of inner product. The inner product of the unit vectors becomes +1.0 when the unit vectors are in the same direction and becomes −1.0 when the unit vectors are in the opposite directions. In other words, sorting the hemispherical images in ascending order of inner product (i.e., a smaller value is shifted leftward on the number line) is equivalent to sorting the hemispherical images in order of the degree of difference in direction between the orientation vector VV of the virtual camera V and the image-capturing direction vector VA, VB, VC, or VD of a hemispherical image. In step S106, based on the sorting results, the information processing terminal 10 renders a hemispherical image, whose image-capturing direction is farther from the orientation of the virtual camera, more earlier, and renders a hemispherical image, whose image-capturing direction is closer to the orientation of the virtual camera, later. This configuration prevents the boundary between the captured images from being rendered within the angle of view of the display range (i.e., a displaying angle of view) smaller than the overlapping area between the captured images. Further, such a configuration minimizes the amount of the boundary rendered within the angle of view of the display range larger than the overlapping area between the captured images. After step S106, the process returns to step S102 again.

The above-described embodiments enable browsing of an image (a virtual image) having a wider angle of view, which is generated by combining multiple images without image processing.

Displaying images captured in all directions may involve generating a spherical image from multiple images captured by multiple imagers before mapping the spherical image onto a three-dimensional object to obtain an output image. Particularly, spherical images intended to be used by individuals involve visibility. To generate a natural-looking image with higher visibility, generating one spherical image by combining multiple fish-eye images may involve: (1) stitching—joining multiple images captured by multiple imagers to align joining positions of objects at the foreground and at the background in overlapping areas between the image-capturing ranges of the imagers due to disparity between the imagers; and (2) averaging—blending overlapping areas between images captured by the imagers to combine the images into one image. For another example (3), a comparative example transforms at least one image into an image with a reduced angle of view to eliminate a blind spot.

The above-listed examples (1) to (3) of the image processing may cause the following issues: Alignment of joining positions may adversely shift the position of a part of an object included in captured images, i.e., change the position of the object. Blending involving mixing pixel values of two captured images may cause a double object. The above-described image transformation with a change in angle of view may adversely change the position or scale of an object in another image. Notably, transformation of a fish-eye image into a hemispherical image is excluded from examples of the image processing not to be applied because such an image transformation involves correcting lens distortion to merely change how to express the image.

Further, individually browsing images captured by multiple imagers causes difficulty observing the relative position of objects included in the captured images between the captured images. In view of this, applications such as construction sites where an image is to be displayed as is demand increasing browsability of a spherical image covering all directional views, which is formed by combining multiple images captured in all directions without the image processing.

Further, the arrangement of multiple cameras is restricted to cause difficulty reducing disparity, depending on the application. Further, large disparity may cause difficulty aligning the joining positions of objects as described above. For example, the construction sites have difficulties mounting multiple imagers at one position such as the top of the hard hat, which allows observation of all-around views, because of their limited space and small distance between the sinciput and the ceiling. For this reason, multiple imagers are to be mounted on the outer periphery of the hard hat (the temporal). This adversely increases disparity to the extent of the size of the head of a person, thus hampering alignment of joining position as described above.

The above-described embodiments enable a wide angle of view of each imager 21 and a large overlapping area between captured images, which are sufficient degrees to achieve intended performance. When viewing a spherical image generated from captured images, the present embodiment determines the rendering order of the captured images or determines an image in the foreground, i.e., an image closest to the virtual camera, according to the designated display range, without alignment of joining position and blending. This configuration enables display/recording of an image as is, without any artifacts (e.g., errors or image distortion due to image processing), and also prevents boundary between the captured images from being included in the display range, or reduces the degree of inclusion of the boundary within the display range, thus allowing browsing of a natural-looking image. This configuration achieves display of a spherical image generated from multiple captured images even with large disparities therebetween.

In the embodiments described with reference to FIGS. 1 to 16, rendering of boundary between captured hemispherical images is prevented as much as possible by changing the rendering order of the hemispherical images or an image closest to the virtual camera, or at the foreground according to the direction (orientation) of the virtual camera. However, the boundary might appear within the display range depending on the line-of-vision direction or the displaying angle of view (the angle of view of the display range). To avoid such a situation, another embodiment of the present disclosure restricts the direction, or orientation of the virtual camera (pan and tilt) and a displaying angle of view (zoom magnification) to proper ranges to achieve intended performance. The following describes this embodiment with reference to FIGS. 17 to 19.

Figure 17:
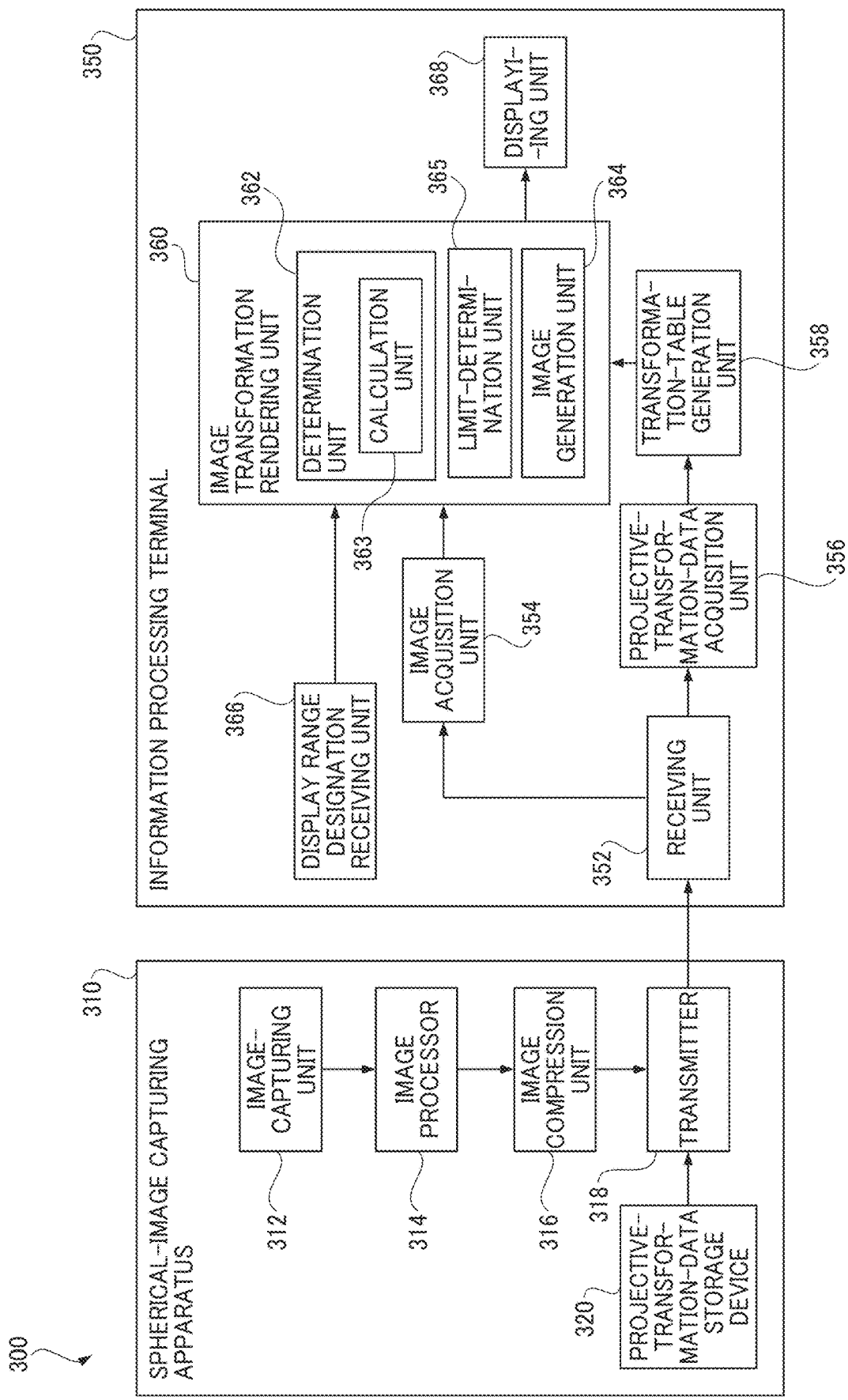
FIG. 17 is a functional block diagram of image capturing and display functions implemented by the image-capturing display system, according to another embodiment.

FIG. 17 is a functional block diagram of image capturing and display functions implemented by an image-capturing display system 1, according to another embodiment. The functional block 300 in FIG. 17 is substantially the same as that in FIG. 6, except a limit-determination unit 365 of the image transformation rendering unit 360 of the information processing terminal 10. The same components are denoted by the same reference numerals, and the following description focuses on differences from FIG. 6.

In another embodiment, the display range is defined by the direction of the virtual camera and the displaying angle of view similarly to the above-described embodiments. The calculation unit 363 calculates an inner product of an image-capturing direction vector of each of the multiple images and an orientation vector of the virtual camera, similarly to the above-described embodiments. Based on the obtained inner product for each image, the limit-determination unit 365 determines whether a designated display range is within a display-limit range. More specifically, in response to a change in the display range, the limit-determination unit 365 determines whether the display range is within the display-limit range based on the displaying angle of view of the display range and the image-capturing angle of view of each image (the image-capturing angle of view of the image determined to be at the foreground, or closest to the front of the virtual camera). When the display range is not within the display limit range, at least the display range is corrected to be shifted toward the display limit range, or corrected to be within the display limit range.

In another embodiment described below, the imagers 21 each include a circular fish-eye lens whose image circle fits within the light receiving area of the image sensor 213. This is because an image captured by the circular fish-eye lens can be matched with the image-capturing range used in a process of limiting the display range to be described later without excess or deficiency.

FIGS. 18A and 18B are illustrations of a limited display range according to another embodiment. FIG. 18A is an illustration of a display region A observed by the virtual camera. The aspect ratio of the virtual camera changes with the application or the display device. In FIG. 18A, the display region A is indicated in a circumcircle E (i.e., an image circle), which is a circle circumscribed about a rectangular or square. In the computer graphics, a vertical angle of view is typically designated as an angle of view. In an embodiment to be described, a diagonal angle of view da is calculated using conditional expression 1 below, which is based on the Pythagorean theorem and the definition of the tangent, where va denotes the vertical angle of view, h/V denotes the aspect ratio (v:h) of the display region A. The display region A observed by the virtual camera is regarded as a cone having a diagonal angle of view da.

[Conditional Expression 1]

FIG. 18B is an illustration of an image-capturing range of an imager 21, a display region A, and its limit. The image-capturing range, which is represented by a spherical sector, has an angle that matches the angle of view of the lens. In an embodiment to be described, the image-capturing range is hemispherical because a fish-eye lens being used has an angle of view of 180°.

FIG. 18B also indicates the limit of the display range (i.e., the display-limit range) that allows no boundary between the hemispherical images to appear within the display region A. To enable no boundary between the hemispherical images to appear within the display region A, the display region A of the virtual camera is to fall within the image-capturing range of a hemispherical image whose image-capturing direction is closest to the current orientation of the virtual camera. In FIG. 18B, the limit of the display range is defined by an angle K between the image-capturing direction vector of the hemispherical image and the orientation vector of the virtual camera, satisfying the following conditional expression 2.

[Conditional Expression 2]

$$K \leq (\text{Image-capturing angle of view} - \text{Diagonal angle of view})/2 \quad (2)$$

In other words, conditional expression (3) below is to be satisfied where VX denotes the image-capturing direction vector of the hemispherical image whose image-capturing direction is closest to the current orientation of the virtual camera, X denotes the hemispherical image or its corresponding imager whose inner product is the greatest among A, B, C, and D, and VV denotes the orientation vector of the virtual camera:

[Conditional Expression 3]

$$VX \cdot VV \geq \cos((\text{Image-capturing angle of view} - \text{Diagonal angle of view})/2) \quad (3)$$

Figure 19:
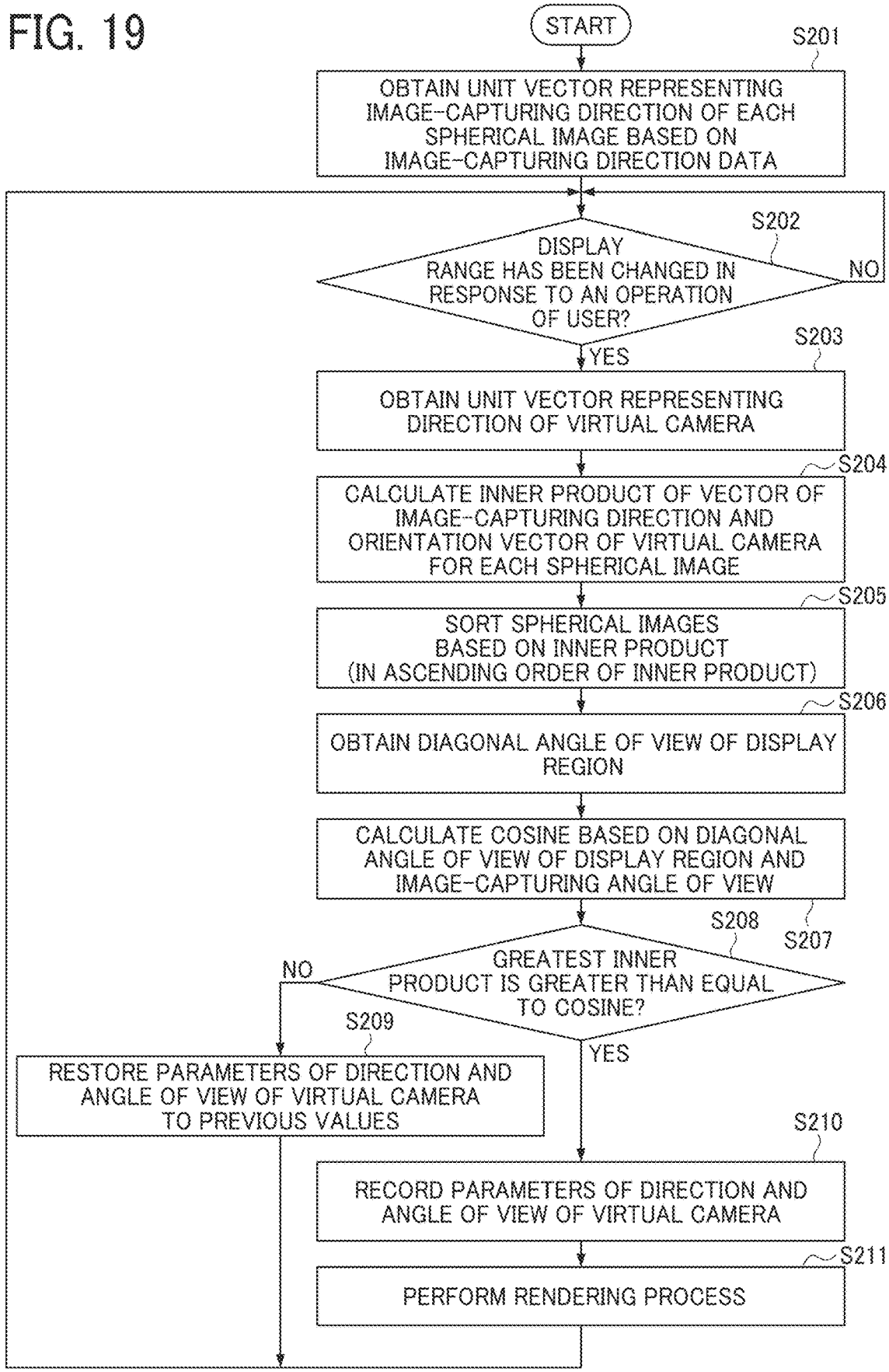
FIG. 19 is a flowchart of a process of displaying an image, performed by the information processing terminal, according to another embodiment.

FIG. 19 is a flowchart of a process of displaying an image, performed by the information processing terminal, according to another embodiment. Same as in FIG. 15, the process in FIG. 19 starts, for example, upon start-up of the image viewer application for the spherical-image capturing device. In step S201, the information processing terminal 10 determines the image-capturing direction of each hemispherical image based on the image-capturing direction data.

In step S202, the information processing terminal 10 determines whether the display range designation receiving unit 366 has received an operation requesting a change in the display range from a user. In other words, the information processing terminal 10 determines whether the display range has been changed in response to an operation from the user. In step S202, the information processing terminal 10 waits until the user inputs an operation requesting a change in display range by operating the above-described user interface. When the information processing terminal 10 determines that the user has input an operation requesting a change in display range (i.e., the display range has been changed in response to an operation from the user) (YES in step S202), the process proceeds to step S203.

In step S203, the information processing terminal 10 obtains the direction vector of the virtual camera using updated parameters. In step 204, the information processing terminal 10 calculates an inner product of the orientation vector VV of the virtual camera V and each of the image-capturing direction vectors VA, VB, VC, and VD of multiple (four) hemispherical images. In step S205, the information processing terminal 10 sorts the multiple (four) hemispherical images in ascending order of inner product. In step S206, the information processing terminal 10 obtains a diagonal angle of view of the display region. In step S207, the information processing terminal 10 calculates a cosine value (the left side of conditional expression (3)) based on the image-capturing angle of view and the diagonal angle of view of the display range. Notably, since the diagonal angle of view da changes with zoom magnification, step S206 and S207 may be omitted when the zoom magnification is not changed.

In step S208, the information processing terminal 10 compares the greatest inner product VX·VV among the inner products of the image-capturing direction vectors VA, VB, VC, and VD of the hemispherical images and the orientation vector VV, with the cosine value obtained in step S207. When the greatest inner product VX·VV is greater than or equal to the cosine value (YES in S208), the process proceeds to step S210, and the information processing terminal 10 stores or records parameters changed by the current operation. When the greatest inner product VX·VV is not greater than or equal to the cosine value (NO in S208), the process proceeds to step S209, and the information processing terminal 10 restores the parameters to the stored parameter, or previous values, skipping rendering of the images. This limits changes in display range that cause the boundary between the images to appear in the display region. After step S211 and step S209, the process returns to step S202 again.

Hereinafter, various variations of an embodiment will be described with reference to FIGS. 20 to 31. In the following various variations, the same components as those of the above-described embodiments are denoted by the same reference numerals as those of the above-described embodiments, and the following description focuses on differences from the above-described embodiments.

First Variation Hereinafter, a first variation of an embodiment will be described with reference to FIGS. 20 to 23. In the above-described embodiments, the spherical-image capturing device 20 is configured to capture an image covering all-directional views of a substantially sphere (including the entire sphere or a portion of the entire sphere having a blind spot) around the spherical-image capturing device 20. However, the spherical-image capturing device 20 is not limited to such an image-capturing device that captures an image of a substantially sphere depending on the application. As described above, the number of imagers 21 is not limited to four. The number of imagers 21 depends on the angle of view of and a desired image-capturing range of each imager 21. Any number of imagers (e.g., two or more imagers) may be incorporated in the spherical-image capturing device 20. In FIGS. 20 to 23, a spherical-image capturing device 20 includes two imagers 21 and has an image-capturing range in which a quarter of an entire sphere is missing.

Figure 20:
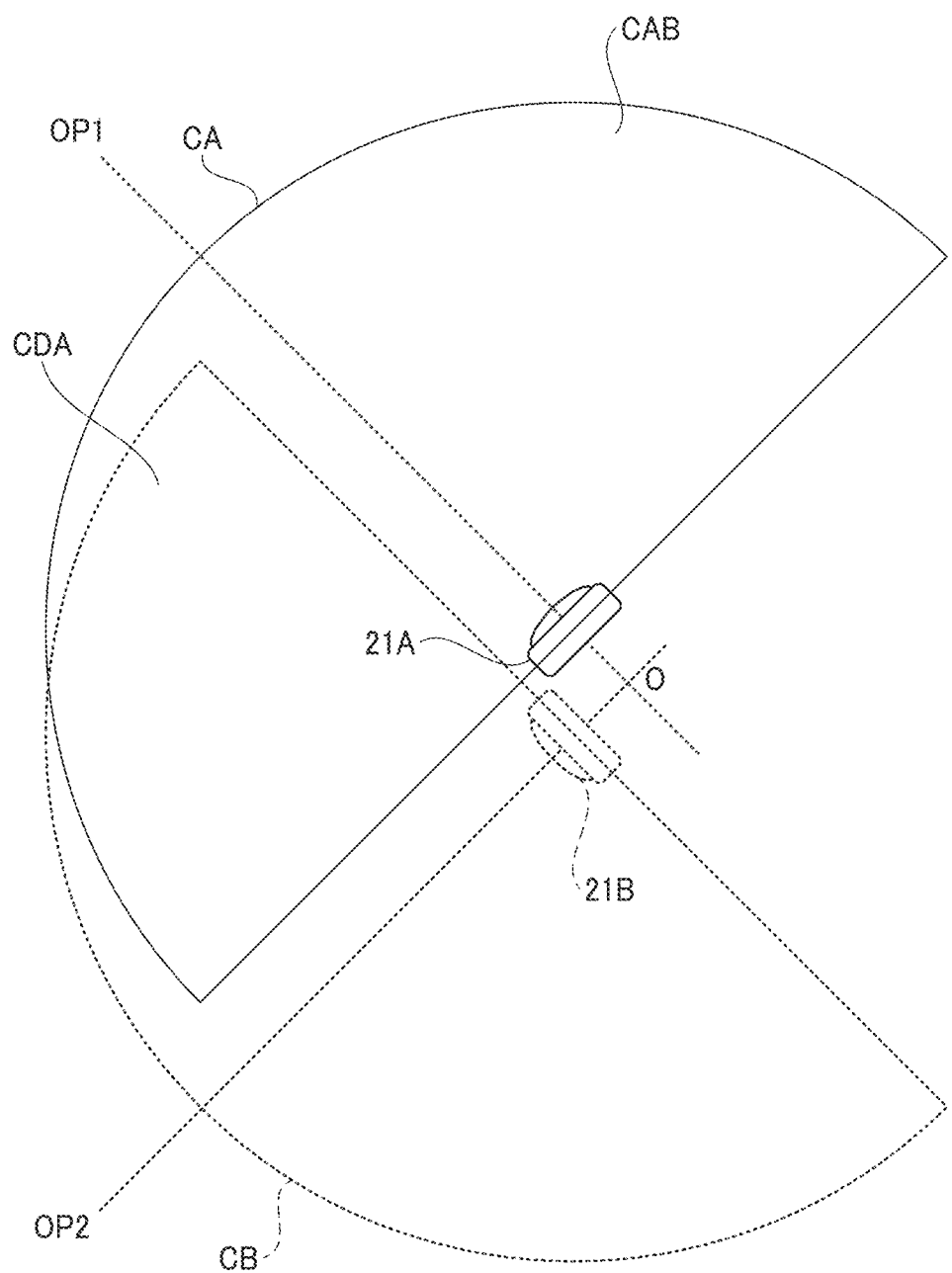
FIG. 20 is a plan view of an image-capturing range of each of imagers in a spherical-image capturing device according to a first variation of an embodiment.

FIG. 20 is a plan view of an image-capturing range of each of two imagers 21 in a spherical-image capturing device 20 according to a first variation of an embodiment. The spherical-image capturing device 20 includes two adjacent imagers alone (e.g., a set of adjacent imagers 21A and 21B, a set of adjacent imagers 21B and 21C, a set of adjacent imagers 21C and 21D, or a set of adjacent imagers 21D and 21A) among the four imagers 21A, 21B, 21C, and 21D in FIG. 2 (the remaining two imagers are excluded). For example, similarly to FIG. 2, the two imagers 21A and 21B are arranged around a prescribed center O (the top of the hard hat 23) to be apart from the center O by a prescribed distance within a horizontal plane (i.e., the drawing sheet in which FIG. 3 is illustrated). The imagers 21A and 21B are arranged at an interval of an angle of 90° with respect to the center O, facing in different directions. The image-capturing directions of the two imagers 21A and 21B are outward. The imagers 21A and 21B are configured to capture images of hemispherical ranges CA and CB, respectively, according to the respective sizes of the angles of view. In FIG. 20, a range CDA is an overlap between the image-capturing range CB (indicated by dotted line) of the second imager 21B and the image-capturing range CA (indicated by solid line) of the first imager 21A. The remaining portion of the image-capturing range CB does not overlap with the imager 21A, and the remaining portion of the image-capturing range CA does not overlap with the imager 21B. For the imager 21A and 21B each having an angle of view of 180°, their image-capturing range as a whole has an angle of view of 270° in the horizontal plane.

Figure 21:
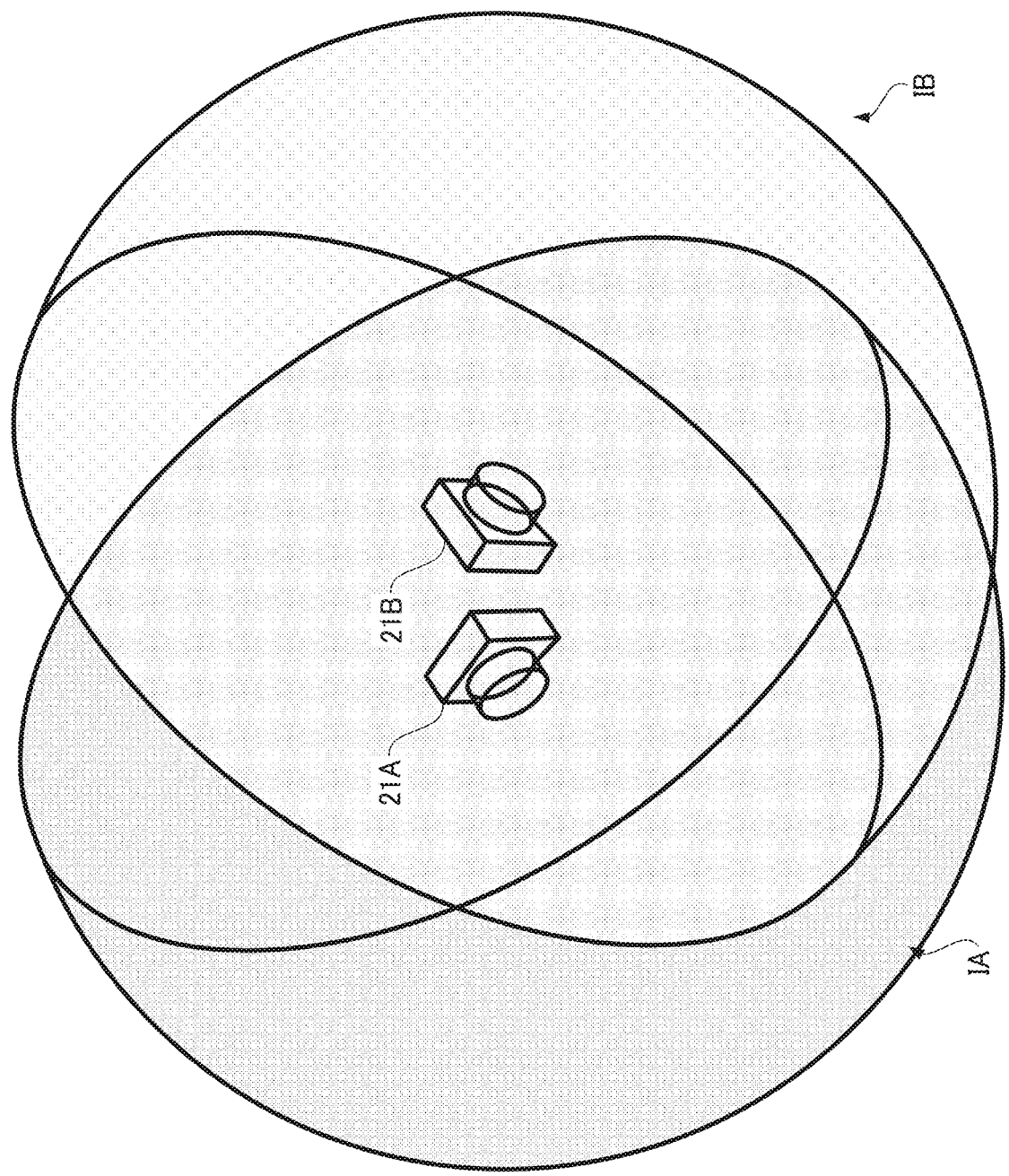
FIG. 21 is a three-dimensional illustration of image-capturing ranges of and images captured by multiple imagers, according to a first variation of an embodiment.
Figure 22A:
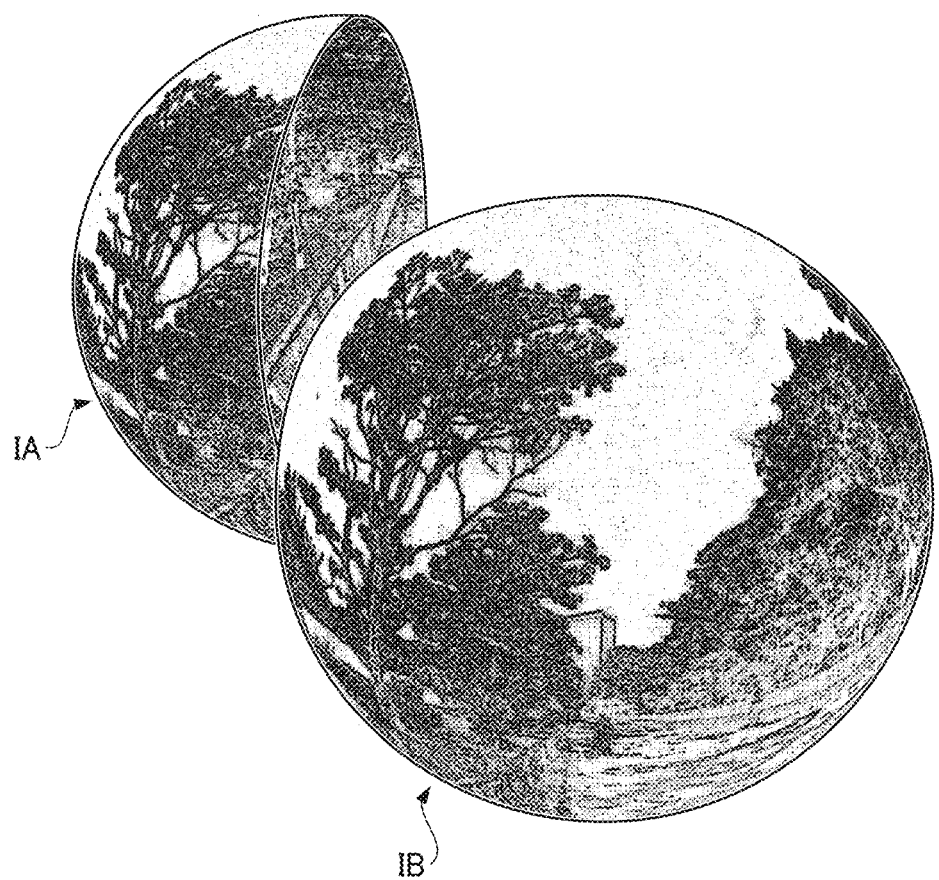
FIGS. 22A, and 22B are three-dimensional illustrations of image-capturing ranges of and hemispherical images captured by multiple imagers, according to the first variation of an embodiment.
Figure 22B:

FIGS. 21, 22A, and 22B are three-dimensional illustrations of image-capturing ranges of and images captured by two imagers 21A and 21B, according to the first variation of an embodiment. FIGS. 22A and 22B are illustrations of two image-capturing ranges and images captured in two different image-capturing directions. FIGS. 21, 22A, and 22B are illustrations of images IA and IB captured by the two imagers 21 according to the first variation of an embodiment. The imagers 21 each have a fish-eye lens with an angle of view of 180° and generate an image whose projection plane is hemispherical as illustrated in FIGS. 21, 22A, and 22B.

In the first variation as well, the image transformation rendering unit 360 maps images captured by two imagers 21A and 21B onto a three-dimensional object, or a spherical object, and extracts an image to be displayed, from the images mapped onto the spherical body by perspective projection using the virtual camera, thus generating an output image to be displayed. Similarly with the above-described embodiments, the image transformation rendering unit 360 involves switching at least a main image to be used between multiple images captured by the two imagers 21A and 21B, to generate an output image S. Further, the image transformation rendering unit 360 more preferably maps the images captured by the two imagers 21A and 21B onto a spherical object by overlapping the multiple images on top of another in a prescribed order. In the predetermined order, the main image is lastly rendered onto the spherical object. This configuration determines or switches the rendering order according to the display range and determines the lastly rendered image as the main image.

However, unlike the above-described embodiments, the boundary between the images may appear within the display region when the angle of view of the display range (the displaying angle of view) is wider than the overlapping area between the images, because of the use of fewer imagers 21, i.e., two imagers 21 in the first variation. FIGS. 23A, 23B, and 23C are illustrations of how a display image appears in the display region with a change in displaying angle of view, according to the first variation in which two imagers 21 are used. Notably, although the captured images are illustrated to be offset from each other in the radial direction for explanatory convenience, the images are actually mapped onto the same spherical body.

FIG. 23A is an illustration of extraction of an image to be displayed with a small displaying angle of view, from the spherical body onto which the first hemispherical image IA and the second hemispherical image IB are rendered in that order. When the spherical object onto which the hemispherical images are rendered in that rendering order is viewed from the center of the spherical object by the virtual camera V with a sufficiently small angle of view, only the second hemispherical image IB is within the entire field of view of the virtual camera V, which allows display of an image without any joint.

FIG. 23B is an illustration of the images IA and IB rendered in the same rendering order as in FIG. 23A with the displaying angle of view significantly changed in response to the user's operation. In FIGS. 23A and 23B, the boundary between the images IA and IB is not within the display region. FIG. 23C is an illustration of the displaying angle of view more significantly changed. In FIG. 23C, the boundary T between the images IA and IB appears in the display region. With such a displaying angle of view, switching the rendering order to render the second hemispherical image IB and the first hemispherical image IA in this order still causes another boundary T' on the opposite side to appear within the display region.

To avoid appearance of either boundaries T and T' in the display region, the displaying angle of view may be restricted to angles of view that allow no appearance of the boundaries T and T' during its change. Alternatively, the browsing direction (i.e., the direction, or orientation of the virtual camera V) may be restricted to directions that allow no appearance of the boundaries T and T' during its change. Still alternatively, the displaying angle of view may be reduced to angles of view that allow no appearance of the boundaries T and T'.

Second Variation

Figure 26:
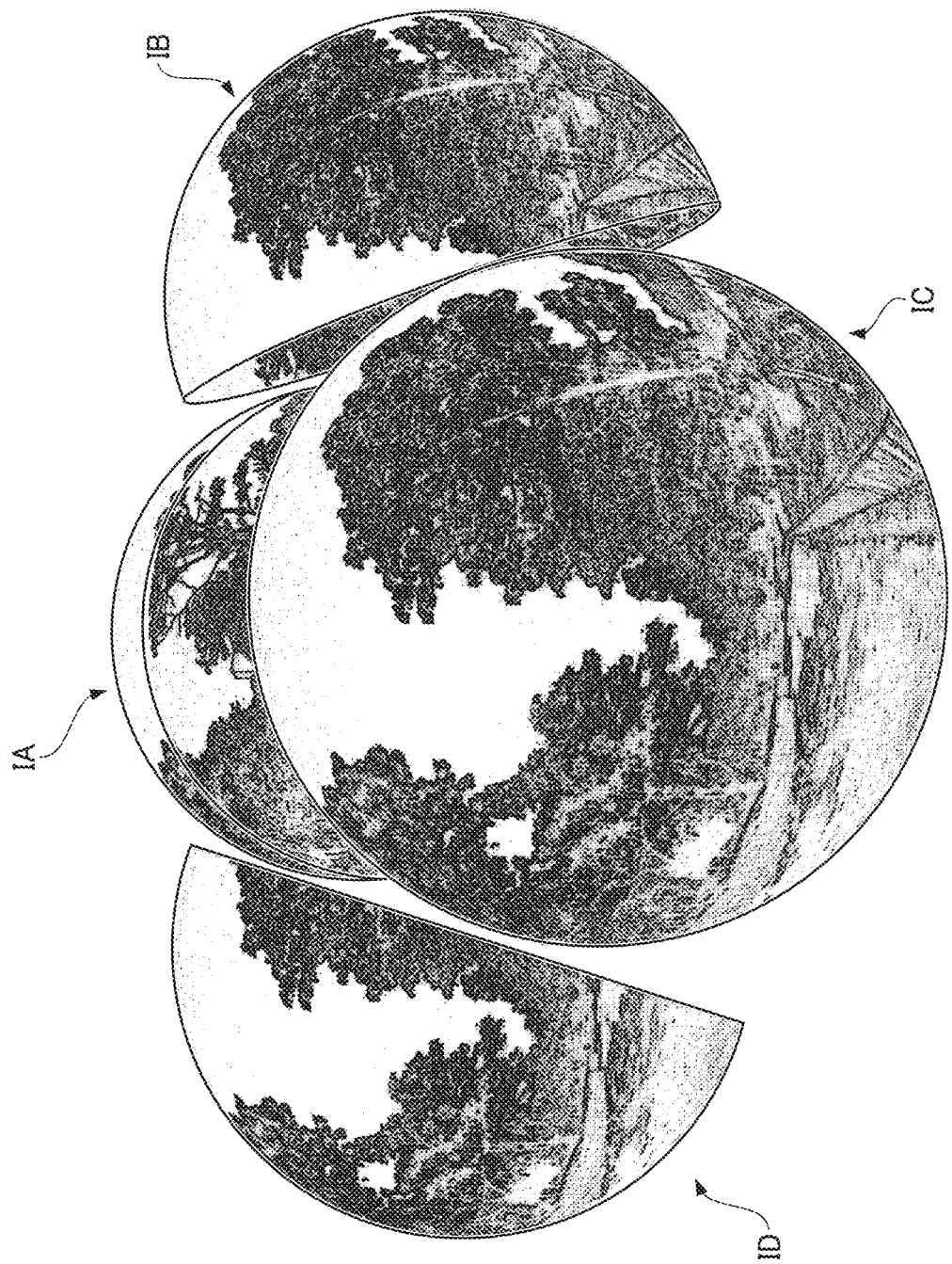
FIG. 26 is a three-dimensional illustration of image-capturing ranges of and hemispherical images captured by multiple imagers, according to the second variation of an embodiment.

Hereinafter, a second variation of an embodiment will be described with reference to FIGS. 24 to 26. In the above-described embodiments, multiple imagers 21 are apart from the center by a prescribed distance and arranged at intervals of an angle of 90° with respect to the center of the hard hat 23 within the horizontal plane, facing in different directions parallel to the horizontal direction. However, in other embodiments, all or some of the imagers 21 may face in directions other than the horizontal direction. FIGS. 24 to 26 are illustrations of a spherical-image capturing device 20 including four imagers 21 each facing obliquely upward.

Figure 24A:
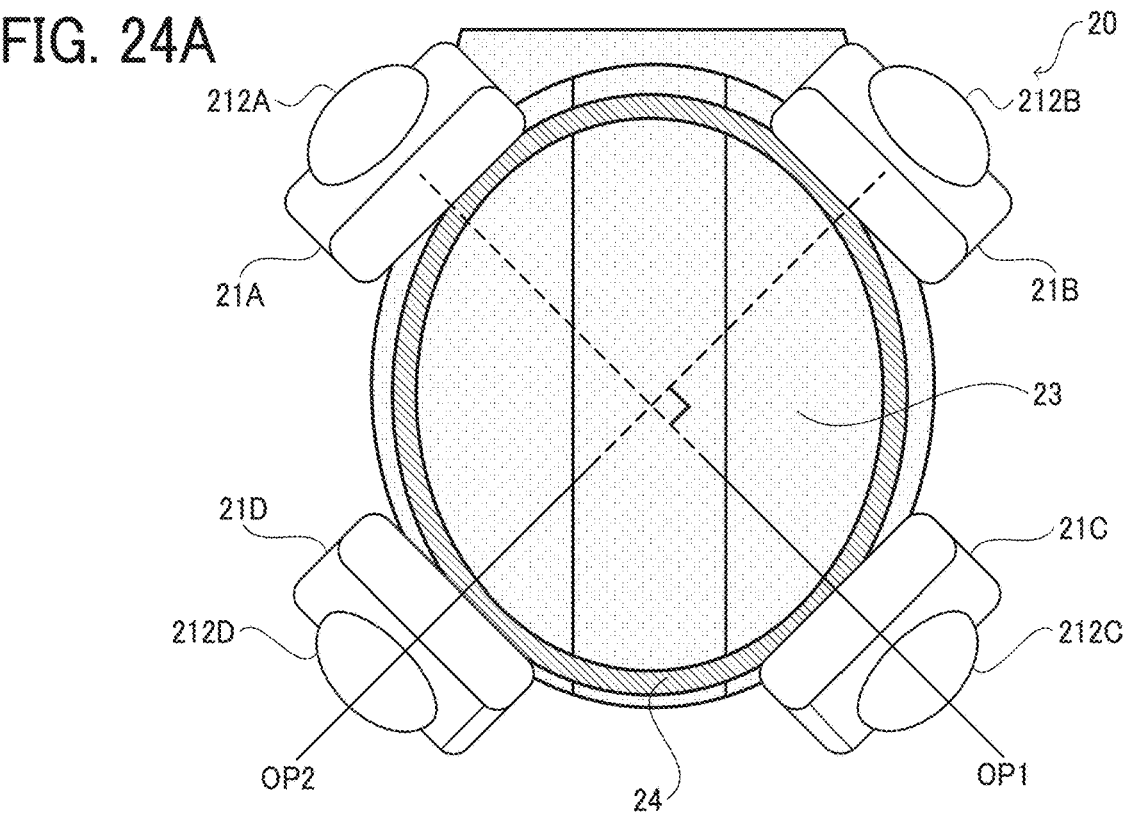
FIGS. 24A and 24B are illustrations of a spherical-image capturing device according to a second variation of an embodiment.
Figure 24B:
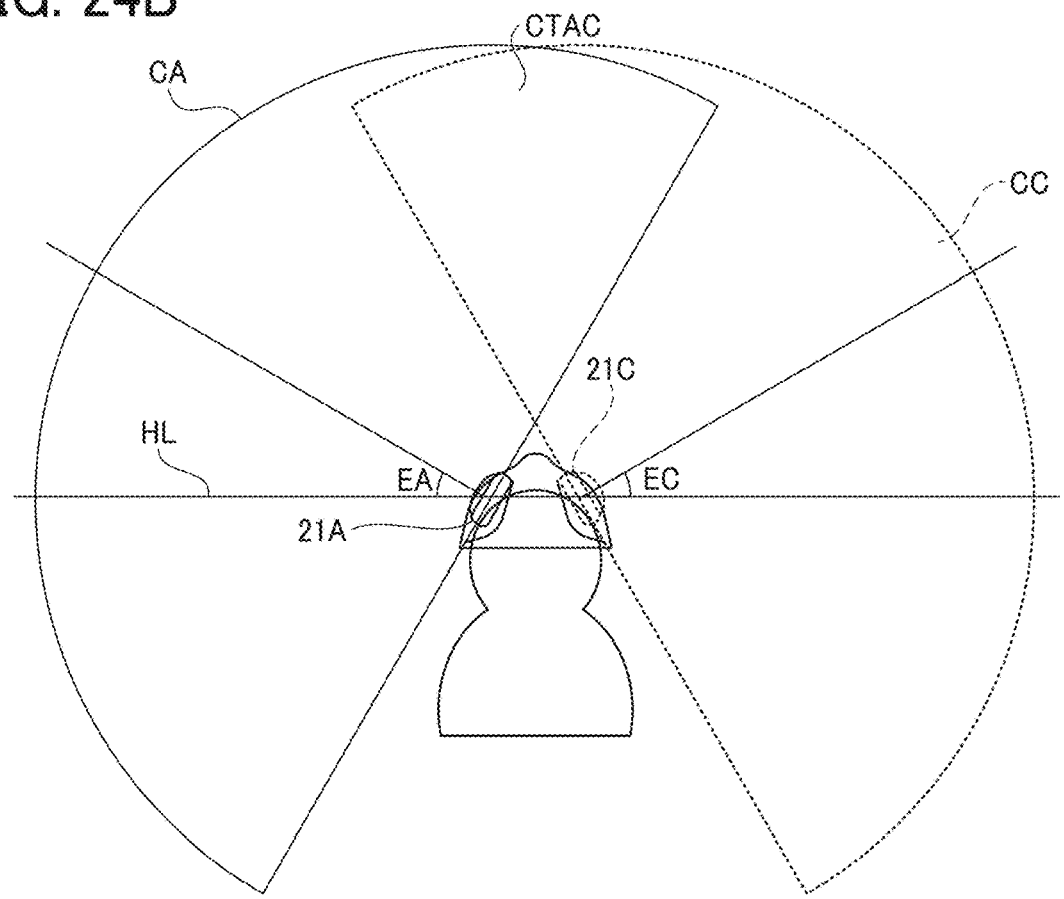

FIGS. 24A and 24B are illustrations of a spherical-image capturing device 20 according to a second variation of an embodiment. FIG. 24A is a top view of the spherical-image capturing device 20. FIG. 24B is an illustration of image-capturing ranges of two imagers 21A and 21C diagonally opposite to each other, in a vertical plane passing through the imager 21A and the imager 21C. Four imagers 21A, 21B, 21C, and 21D are fixed to the fixing frame 24 to be arranged around the outer periphery of the hard hat 23 at intervals of 90° with respect to the vertex of the hard hat 23, which is the center of the hard hat 23, each facing in a different direction. In FIG. 24B, the two imagers 21A and 21C are diagonally opposite to each other, facing in different directions at prescribed elevation angles EA and EC with reference to the horizontal directions, respectively. The elevation angles EA and EC are typically in a range from 10° to 30° to reduce or prevent a user wearing the hard hat 23 (the body of the user) from being captured while blind spots. The same applies to the other imagers 21B and 21D diagonally opposite to each other. Each of the imager 21B and 21D faces obliquely upward at a prescribed elevation angle.

Notably, for the terms "horizontal plane", "horizontal direction", and "elevation angle", the spherical-image capturing device 20 is assumed to be placed with a surface, on which multiple imagers 21 are arranged, coincident with the horizontal plane. However, the surface on which multiple imagers 21 are arranged may not be coincide with the horizontal plane and not aligned with the horizontal direction in the real world because of tilts of the head or the hard hat 23 during actual use.

A range CTAC in the upward direction, or above the head of the user is an overlap between the image-capturing range CA (indicated by solid line) of the first imager 21A and the image-capturing range CC (indicated by dotted line) of the third imager 21C orthogonally opposite to the first imager 21A. The same applies to the other imagers 21B and 21D diagonally opposite to each other. The image-capturing ranges of the imager 21B and 21D overlap with each other in the upward direction, or above the head of the user. Further, the image-capturing ranges of two adjacent imagers (a pair of 21A and 21B, a pair of 21B and 21C, a pair of 21C and 21D, and a pair of 21D and 21A) overlap with each other in the upward direction, in addition to the horizontal direction.

FIGS. 25 and 26 are three-dimensional illustrations of image-capturing ranges of and images captured by multiple imagers 21A, 21B, 21C, and 21D, according to the second variation of an embodiment. FIGS. 25 and 26 are illustrations of images IA, IB, IC, and ID captured by the imagers 21A, 21B, 21C, and 21D according to the second variation of an embodiment. The imagers 21A, 21B, 21C, and 21D each have a fish-eye lens with an angle of view of 180° and generate an image whose projection plane is hemispherical. In FIG. 25, the lower portion M of the entire sphere is missing. The user wearing the hard hat 23 is in the downward side of the hard hat 23, whose image including the user is not to be captured.

In the second variation as well, the image transformation rendering unit 360 maps images captured by four imagers 21A, 21B, 21C, and 21D onto a spherical object, and extracts an image to be displayed, from the images mapped onto the spherical body by perspective projection using the virtual camera, thus generating an output image to be displayed. Similarly with the above-described embodiments, the image transformation rendering unit 360 involves switching at least a main image to be used between multiple images captured by the four imagers 21, to generate an output image S. To avoid such a situation, the image transformation rendering unit 360 more preferably maps multiple images captured by four imagers 21 onto a spherical object while overlaying the multiple images in a prescribed order. In the predetermined order, the main image is lastly rendered onto the spherical object. This configuration determines or switches the rendering order according to the display range and determines the lastly rendered image as the main image. In addition, some configurations in which the image-capturing direction of an imager 21 is obliquely upward exhibit the same effects as those of the embodiments in FIGS. 1 to 19 because the difference from the embodiments in FIGS. 1 to 19 is merely the image-capturing direction vector of each imager 21.

Third Variation

Figure 27:
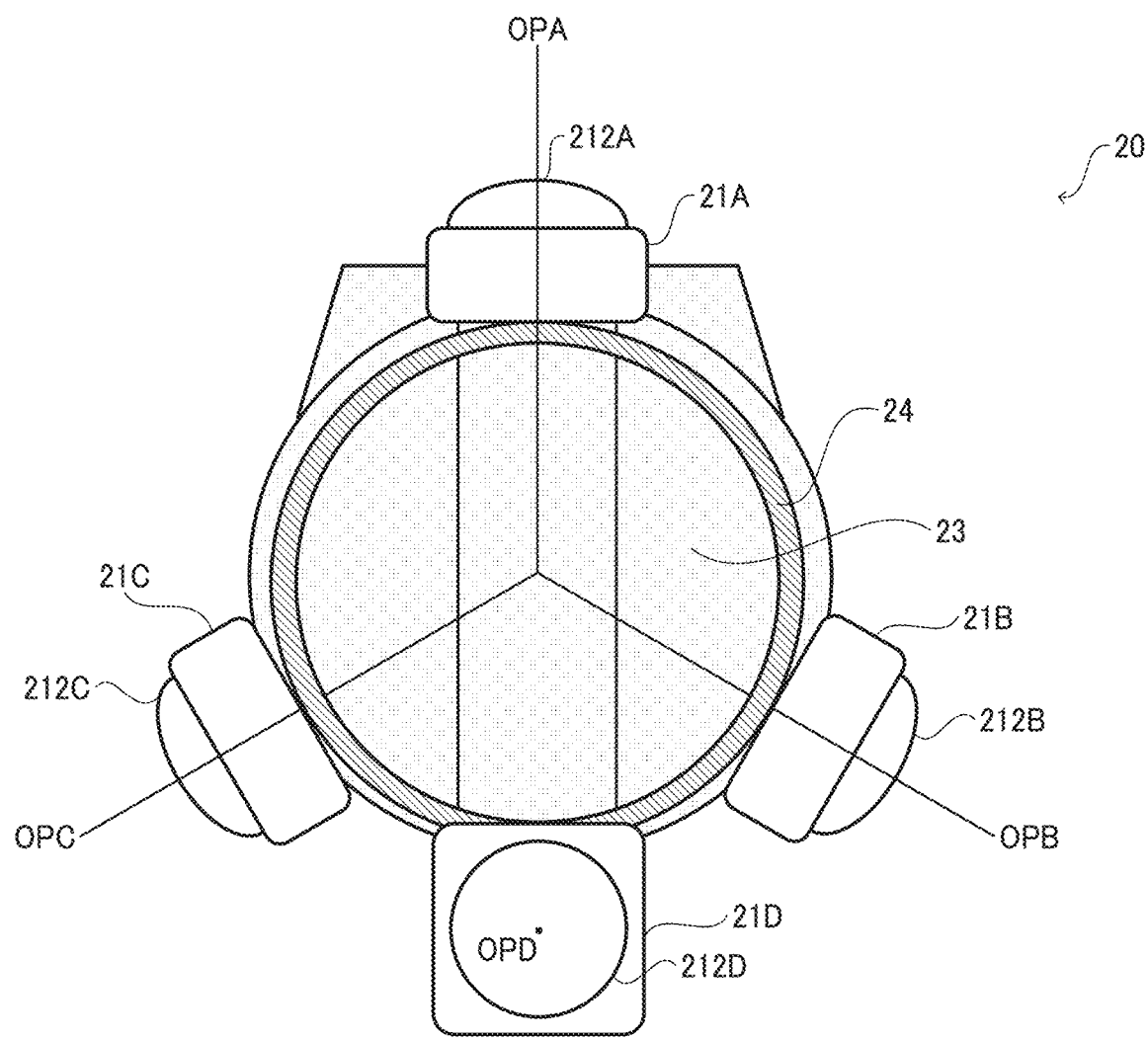
FIG. 27 is an illustration of a spherical-image capturing device according to a third variation of an embodiment.
Figure 28:
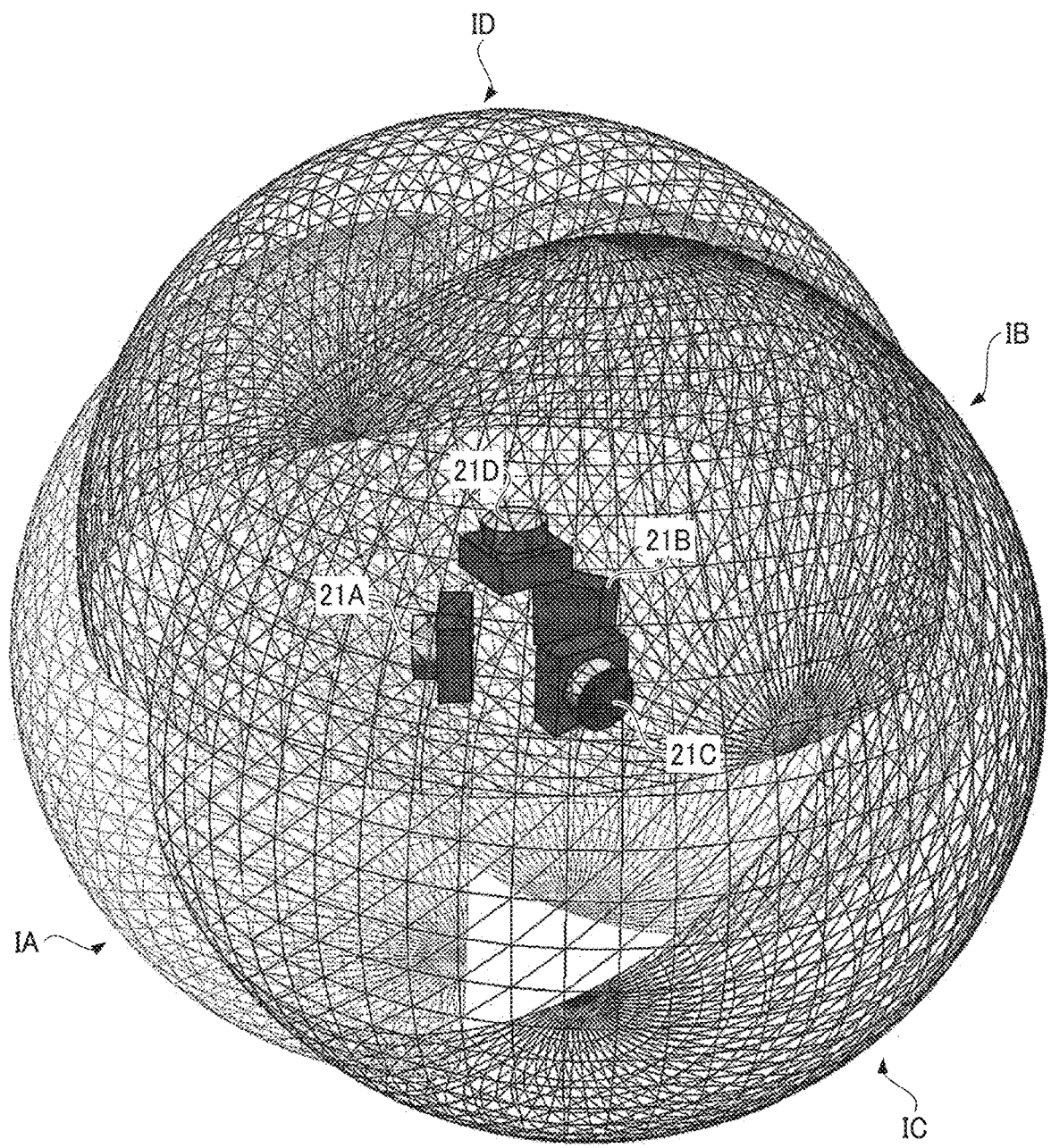
FIG. 28 is a three-dimensional illustration of image-capturing ranges of multiple imagers, according to the third variation of an embodiment.
Figure 29:
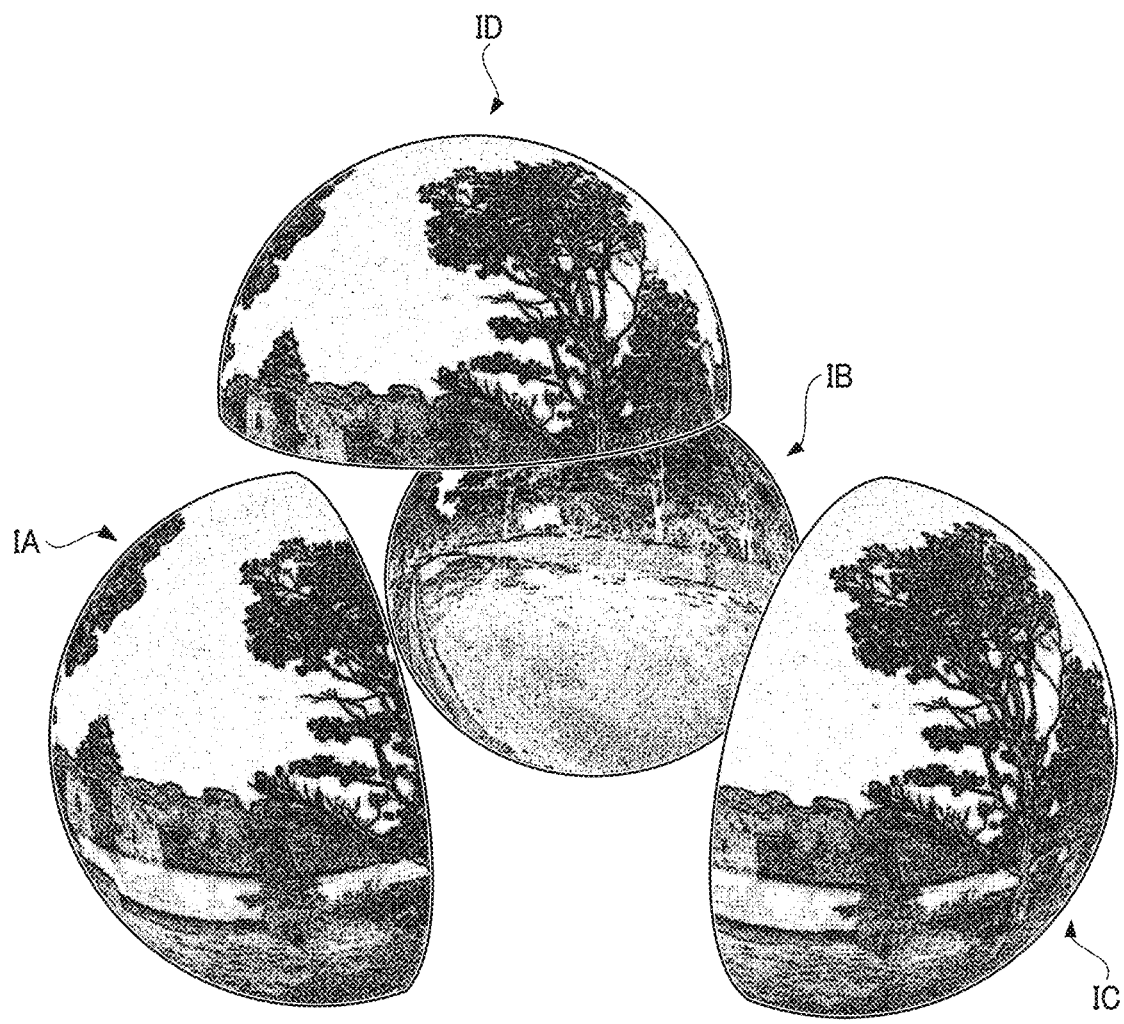
FIG. 29 is a three-dimensional illustration of image-capturing ranges of and hemispherical images captured by multiple imagers, according to the third variation of an embodiment.

Hereinafter, a third variation of an embodiment will be described with reference to FIGS. 27 to 29. In the above-described embodiments, multiple imagers 21 are apart from the center by a prescribed distance and arranged at intervals of an angle of 90° with respect to the center of the hard hat 23 within the horizontal plane, facing in different directions parallel to substantially the horizontal direction (the horizontal direction or a direction upward by a prescribed elevation angle with reference to the horizontal direction). However, the amount of change in the image-capturing direction is not limited to 90°, and the image-capturing direction may be a direction largely deviated from the horizontal direction. FIGS. 27 to 29 are illustrations of a spherical-image capturing device 20 including three imagers 21A to 21C arranged at intervals of 120° within the horizontal plane, and additional imager 21D facing upward.

FIG. 27 is an illustration of the spherical-image capturing device 20 according to the third variation. FIG. 27 is a top view of the spherical-image capturing device 20. Three imagers 21A, 21B, and 21C are fixed onto the fixing frame 24 and arranged around the outer periphery of the hard hat 23 at intervals of 120° with respect to the top of the hard hat 23, which is the center of the hard hat 23, each facing in a different direction. The image-capturing directions of the three imagers 21A, 21B, and 21C are outward in the horizontal direction. The additional imager 21D is on the rear side (the front side or the top) of the hard hat 23, facing directly upward.

FIGS. 28 and 29 are three-dimensional illustrations of image-capturing ranges of and images captured by multiple imagers 21A, 21B, 21C, and 21D, according to the third variation of an embodiment. FIGS. 28 and 29 are illustrations of images IA, IB, IC, and ID captured by the imagers 21A, 21B, 21C, and 21D, respectively, according to the third variation of an embodiment. The imagers 21A, 21B, 21C, and 21D each have a fish-eye lens with an angle of view of 180° and generate an image whose projection plane is hemispherical. The upper portion of the entire sphere is preferentially covered by the additional imager 21D. This variation is advantageous for applications in which upward-directional image-capturing range is to be captured.

Other Variations

Figure 30A:
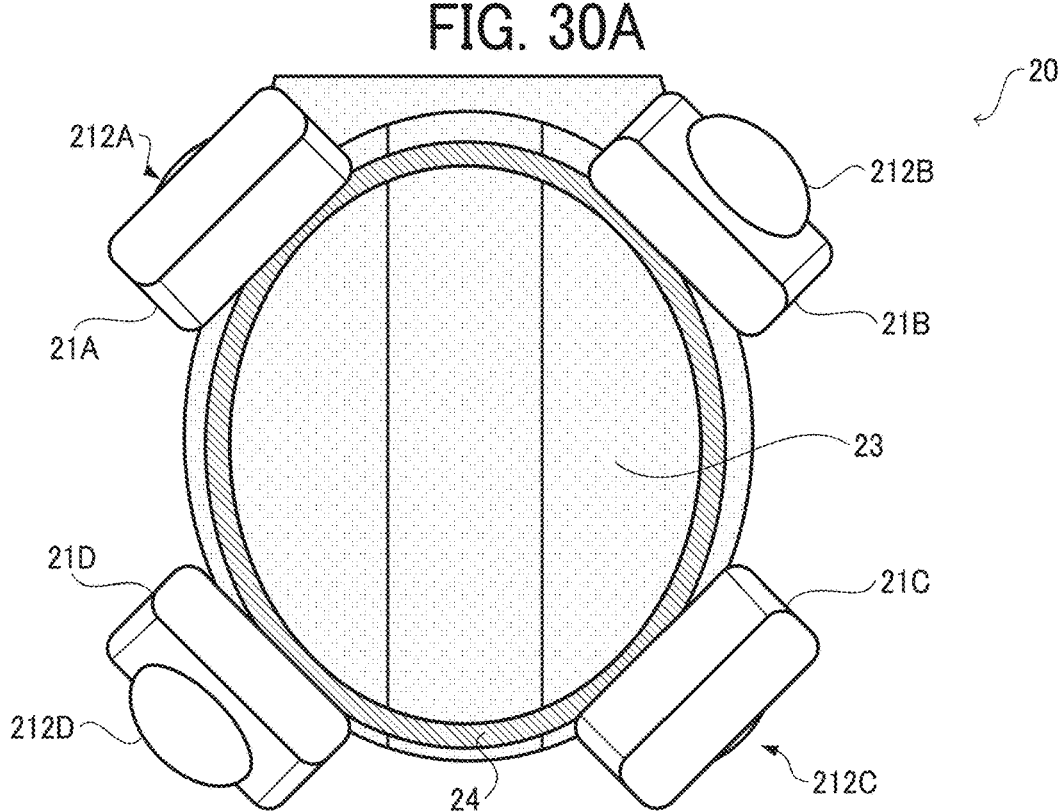
FIG. 30A is an illustration of a spherical-image capturing device according to a fourth variation of an embodiment.

Hereinafter, various other variations of an embodiment will be described with reference to FIGS. 30A, 30B, and 31. As described above, multiple imagers 21 may be arranged facing upward and downward alternately. FIG. 30A is an illustration of a spherical-image capturing device 20 according to a fourth variation in which four imagers 21A to 21D are arranged alternately facing obliquely upward at a prescribed elevation angle and obliquely downward at a predetermined depression angle. In FIG. 30A, a range captured by the first imager 21A and a range captured by the third imager 21C diagonally opposite to the first imager 21A overlap with each other at the lower side of the hard hat 23. In contrast, a range captured by the second imager 21B and a range captured by the fourth imager 21D diagonally opposite to the first imager 21A overlap with each other at the upper side of the hard hat 23 (i.e., above the head).

Figure 30B:
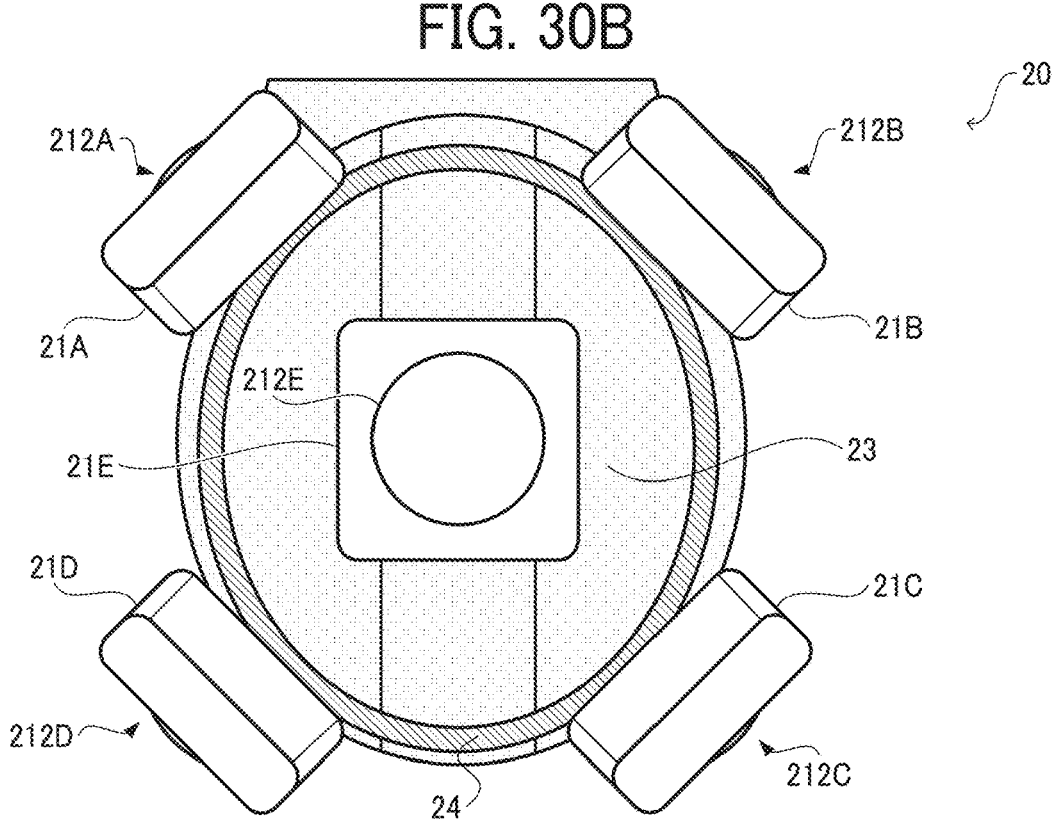
FIG. 30B is an illustration of a spherical-image capturing device according to a fifth variation of an embodiment.

FIG. 30B is an illustration of a spherical-image capturing device 20 according to a fifth variation of an embodiment, including four imagers 21A to 21D arranged obliquely downward at a predetermined depression angle and one additional imager 21E. The additional imager 21E is on the top of the hard hat 23, facing directly upward. The upper portion of the entire sphere is preferentially covered by the additional imager 21E, whereas the lower portion is preferentially covered by the four imagers 21A to 21D. This variation is advantageous for an application in which all-directional image-capturing range is to be captured.

Figure 31:
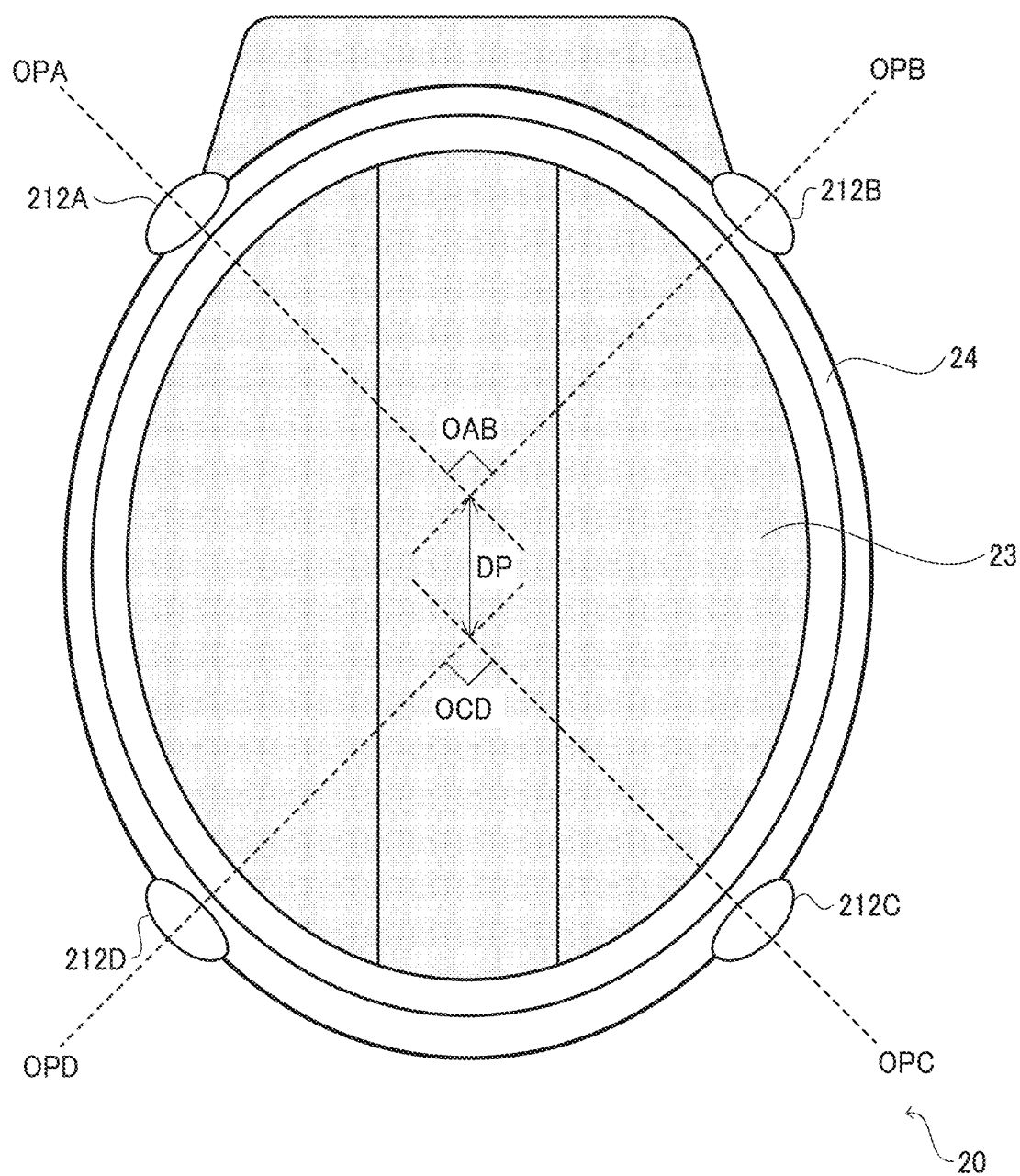
FIG. 31 is an illustration of a spherical-image capturing device according to a sixth variation of an embodiment.

FIG. 31 is an illustration of a spherical-image capturing device 20 according to a sixth variation of an embodiment. As described above, under the assumption that multiple imagers are mounted on the hard hat 23 such as a typical helmet of an elliptical shape, the optical axes of the imagers may not intersect at one point. The spherical-image capturing device 20 according to the sixth variation in FIG. 31 includes four image-forming optical systems 212A to 212D arranged on the fixing frame 24 at intervals of an angle of approximately 90° facing in different directions. Each image-forming optical system 212A to 212D faces obliquely upward at a predetermined elevation angle of, for example, 18°. In the spherical-image capturing device 20 according to the sixth variation, the imagers are integrated with the fixing frame 24 as a single integrated unit. With the front-to-back direction coincident with the major axis of the elliptical shape of the hard hat 23, the image-forming optical systems 212C and 212D at the front side of the hard hat 23 have their optical axes OPA and OPB intersecting with each other at an angle of 90°, and the other image-forming optical system 212C and 212D at the rear side of the hard hat 23 have their optical axes OPC and OPD intersecting with each other at an angle of 90°. The intersection point OAB of the optical axes OPA and OPB is offset from the intersection point OCD of the optical axes OPC and OPD in the front-to-rear direction by a predetermined distance DP. Notably, a plane formed by the optical axis OPA, the optical axis OPB, and the intersection point OAB may be different from a plane formed by the optical axis OPC, the optical axis OPD, and the intersection point OCD because the image-forming optical systems 212A to 212D each are arranged at a predetermined elevation angle.

In addition to the above-described variations, any other variations are conceivable. The processing according to the present embodiments is applicable in various configurations in which any desired number of (two or more) imagers are arranged facing outward in any different directions. Preferably, multiple imagers 21 are configured to generate multiple images, each imager 21 having an image-capturing range overlapping with that of at least another imager 21. Each image partly overlaps (an overlapping area) with at least another image.

The above-described embodiments provide an apparatus, a system, a method, and a recording medium storing program that enable browsing of an image having a wider angle of view, which is generated by combining multiple images without image processing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions. By storing a program in a recording medium, the program can be installed in multiple computers, and the image display function according to the present embodiments can be implemented.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The present disclosure further includes the following configurations:

Mode 1

An image display apparatus (10) includes: a reception unit to receive an designation of a display range for a display image that is based on multiple images captured in different image-capturing directions; a determination unit to select, from the multiple images, an image to be used for the display image based on the display range and the image-capturing directions of the multiple captured images; a generation unit to generate the display image based on the determined image and the display range; and an output unit to output the generated display image.

Mode 2

In the image display apparatus according to Mode 1, the generation unit performs projection processing on a three-dimensional object onto which at least the determined image is mapped, to generate the display image.

Mode 3

In the image display apparatus according to Mode 1 or 2, the determination unit determines a rendering order of the multiple images based on the display range and the image-capturing directions, and the determined image is rendered at the foreground in accordance with the rendering order.

Mode 4

In the image display apparatus according to Mode 3, the display range is defined by at least an orientation of a virtual camera. Further, the image display apparatus further includes a calculation unit to obtain inner product of an image-capturing direction vector based on the image-capturing directions of the multiple captured images and an orientation vector of the virtual camera defining the display range. The determination unit determines the rendering order according to the obtained inner product for each of the multiple images.

Mode 5

In the image display apparatus according to any one of Modes 1 to 3, the display range is defined by at least an orientation of a virtual camera. Further, the image display apparatus further includes a calculation unit to obtain inner product of an image-capturing direction vector based on the image-capturing directions of the multiple captured images and an orientation vector of the virtual camera defining the display range; and a limit-determination unit to determine whether the designated display range is within a display-limit range based on the obtained inner product for each of the multiple images.

Mode 6

In the image display apparatus according to Mode 5, the limit-determination unit determines whether the designated display range is within the display-limit range based on a displaying angle of view of the display range and an image-capturing-angle of view of the determined image, in response to a change in the display range. When the display range is not within the display-limit range, at least the display range is corrected to be shifted toward the display limit range, or corrected to be within the display limit range.

Mode 7

In the image display apparatus according to any one of Modes 1 to 3, each of the multiple images is a wide-angle image, a fish-eye image, or a spherical image based on the wide-angle image or the fish-eye image, and partly overlaps with at least another image.

Mode 8

An image-capturing display system includes: multiple imagers configured to capture multiple images in different image-capturing directions, each of the multiple images having a field of view overlapping with a field of view of at least another one of the multiple images; a reception unit to receive an designation of a display range for a display image based on multiple images captured in different image-capturing directions; a determination unit to select, from the multiple images, an image to be used for the display image based on the display range and the image-capturing directions of the multiple captured images; a generation unit to generate the display image based on the selected image and the display range; and an output unit to output the generated display image.

Mode 9

In the image-capturing display system according to Mode 8, the multiple imagers are arranged in a radial manner to be apart from each other.

Mode 10

In the image-capturing display system according to Mode 8 or 9, each of the imagers includes a fish-eye lens.

Mode 11

A method for displaying an image, performed by an image display apparatus, the method includes: receiving an designation of a display range for a display image based on multiple images captured in different image-capturing directions; selecting, from the multiple images, an image to be used for the display image based on the display range and the image-capturing directions of the multiple captured images; generating the display image based on the determined image and the display range; and outputting the generated display image.

Mode 12

A recording medium storing a computer-readable code for controlling a computer system to carry out a method including: receiving an designation of a display range for a display image based on multiple images captured in different image-capturing directions; selecting, from the multiple images, an image to be used for the display image based on the display range and the image-capturing directions of the multiple captured images; generating the display image based on the determined image and the display range; and outputting the generated display image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An apparatus comprising:
circuitry configured to:

select, from at least two images captured in different image-capturing directions and with image-capturing ranges overlapping with each other, an image to be at foreground as viewed from a virtual camera based on an orientation or an angle of view of the virtual camera and the image-capturing directions of the at least two images;

map the at least two images onto a three-dimensional object to generate a virtual image, in which the at least two images overlap with each other, having a wider angle of view than the at least two images;

perform perspective projection on the virtual image using the virtual camera, to generate a plane image, based on the selected image to be at the foreground, as a display image;

calculate an inner product of an image-capturing vector of each of the image-capturing directions of the at least two images and an orientation vector of the virtual camera;

overlap the at least two images based on the inner product calculated for each of the at least two images;

determine whether a display range for the display image is within a display-limit range, based on the inner product calculated for each of the at least two images;

determine, in response to a change in the display range, whether the display range is within the display-limit range, based on a displaying angle of view of the display range and an image-capturing angle of the image to be at the foreground;

correct the display range by shifting the display range based on a displaying angle of view to be within the display-limit range based on a determination that the display range is not within the display-limit range;

compare a greatest inner product among the inner products calculated, with a cosine value calculated based on an image-capturing angle of view and a diagonal angle of view of the display range; and perform no image processing when the greatest inner product is less than the cosine value, wherein each of the at least two images is a wide-angle of view, a fish-eye image, or a spherical image based on the wide-angle of view or the fish-eye image.

2. The apparatus according to claim 1,
wherein the at least two images mapped onto the three-dimensional object are captured by an image-capturing apparatus at a stationary position.

3. The apparatus according to claim 1,
wherein the circuitry is further configured to receive a change in display range for the display image,
wherein the change in display range involves a change in the orientation or the angle of view of the virtual camera.

4. A system comprising:
the apparatus according to claim 1; and
a display device to display the display image.

5. A system comprising:
an image-capturing apparatus configured to capture at least two images; and
the apparatus according to claim 1.

6. A system comprising:
an image-capturing apparatus configured to capture at least two images;
the apparatus according to claim 1; and
a display device to display the display image.

7. A method comprising:
selecting, from at least two images captured in different image-capturing directions and with image-capturing ranges overlapping with each other, an image to be at foreground as viewed from a virtual camera based on an orientation or an angle of view of the virtual camera and the image-capturing directions of the at least two images;

mapping the at least two images onto a three-dimensional object to generate a virtual image, in which the at least two images overlap with each other, having a wider angle of view than the at least two images;

performing perspective projection on the virtual image using the virtual camera, to generate a plane image, based on the selected image to be at the foreground, as a display image;

calculating an inner product of an image-capturing vector of each of the image-capturing directions of the at least two images and an orientation vector of the virtual camera;

overlapping the at least two images based on the inner product calculated for each of the at least two images;

determining whether a display range for the display image is within a display-limit range, based on the inner product calculated for each of the at least two images;

determining, in response to a change in the display range, whether the display range is within the display-limit range, based on a displaying angle of view of the display range and an image-capturing angle of the image to be at the foreground;

correcting the display range by shifting the display range based on a displaying angle of view to be within the display-limit range based on a determination that the display range is not within the display-limit range;

comparing a greatest inner product among the inner products calculated, with a cosine value calculated based on an image-capturing angle of view and a diagonal angle of view of the display range; and performing no image processing when the greatest inner product is less than the cosine value, wherein each of the at least two images is a wide-angle of view, a fish-eye image, or a spherical image based on the wide-angle of view or the fish-eye image.

8. The method according to claim 7,
wherein in the mapping of the at least two images on the three-dimensional object, the at least two images are captured by an image-capturing apparatus at a stationary position.

9. The method according to claim 7, further comprising receiving a change in display range for the display image,
wherein the change in display range involves changing the orientation or the angle of view of the virtual camera.

10. A non-transitory recording medium storing a plurality of instructions which, when executed by one or more processors, cause the processors to perform a method, comprising:

selecting, from at least two images captured in different image-capturing directions and with image-capturing ranges overlapping with each other, an image to be at foreground as viewed from a virtual camera based on an orientation or an angle of view of the virtual camera and the image-capturing directions of the at least two images;

mapping the at least two images onto a three-dimensional object to generate a virtual image, in which the at least two images overlap with each other, having a wider angle of view than the at least two images;

performing perspective projection on the virtual image using the virtual camera, to generate a plane image, based on the selected image to be at the foreground, as a display image;

calculating an inner product of an image-capturing vector of each of the image-capturing directions of the at least two images and an orientation vector of the virtual camera;

overlapping the at least two images based on the inner product calculated for each of the at least two images;

determining whether a display range for the display image is within a display-limit range, based on the inner product calculated for each of the at least two images;

determining, in response to a change in the display range, whether the display range is within the display-limit range, based on a displaying angle of view of the display range and an image-capturing angle of the image to be at the foreground;

correcting the display range by shifting the display range based on a displaying angle of view to be within the display-limit range based on a determination that the display range is not within the display-limit range;

comparing a greatest inner product among the inner products calculated, with a cosine value calculated based on an image-capturing angle of view and a diagonal angle of view of the display range; and performing no image processing when the greatest inner product is less than the cosine value, wherein each of the at least two images is a wide-angle of view, a fish-eye image, or a spherical image based on the wide-angle of view or the fish-eye image.

11. The non-transitory recording medium according to claim 10, wherein in the mapping of the at least two images on the three-dimensional object, the at least two images are captured by an image-capturing apparatus at a stationary position.

12. The non-transitory medium according to claim 10, wherein the method further includes receiving a change in display range for the display image, wherein the change in display range involves changing the orientation or the angle of view of the virtual camera.

* * * * *